US012700023B2

(12) United States Patent
Chuah

(10) Patent No.: US 12,700,023 B2
(45) Date of Patent: Aug. 4, 2026

(54) AUTOMATIC RETAIL DISPLAY MANAGEMENT

(71) Applicant: Khai Gan Chuah, Austin, TX (US)

(72) Inventor: Khai Gan Chuah, Austin, TX (US)

(73) Assignee: Khai Gan Chuah, Austin, TX (US)

( * ) Notice: Subject to any disclaimer, the term of this patent is extended or adjusted under 35 U.S.C. 154(b) by 0 days.

(21) Appl. No.: 18/685,481

(22) PCT Filed: Jun. 24, 2022

(86) PCT No.: PCT/US2022/073163
§ 371 (c)(1),
(2) Date: Feb. 21, 2024

(87) PCT Pub. No.: WO2023/028388
PCT Pub. Date: Mar. 2, 2023

(65) Prior Publication Data
US 2024/0354817 A1     Oct. 24, 2024

Related U.S. Application Data

(63) Continuation-in-part of application No. 17/453,843, filed on Nov. 6, 2021, now Pat. No. 11,416,803.
(Continued)

(51) Int. Cl.
*G06Q 30/02* (2023.01)
*G06Q 30/0241* (2023.01)
(52) U.S. Cl.
CPC ..... *G06Q 30/0281* (2013.01); *G06Q 30/0277* (2013.01)
(58) Field of Classification Search
CPC ....................... G06Q 30/0281; G06Q 30/0277
See application file for complete search history.

(56) References Cited

U.S. PATENT DOCUMENTS 4,466,054 A     8/1984   Shigemasa et al.
5,640,494 A     6/1997   Jabri et al.
(Continued)

FOREIGN PATENT DOCUMENTS

CA     3072445 A1 *   2/2019   .............. G06F 3/011
EP     2910151 A1     8/2015
(Continued)

OTHER PUBLICATIONS

Businesswire "Displaydata to Showcase Augmented Reality Navigation Demo with Aisle411 at NRF 2018" (2018) (https://www.businesswire.com/news/home/20180115005029/en/Displaydata-to-Showcase-Augmented-Reality-Navigation-Demo-with-Aisle411-at-NRF-2018) (Year: 2018).*
(Continued)

*Primary Examiner* — Sujay Koneru
(74) *Attorney, Agent, or Firm* — Definitive Patents, member Synchrony IP; Timothy D. Snowden; Yau H. Chan

(57)     ABSTRACT

Apparatus and associated methods relate to dynamically managing quality of a sample in a public display space. In an illustrative example, a sample quality profile (SQP) may be generated in response to a sample update signal. The sample update signal may, for example, originate from a physical product display location. The sample update signal may, for example include data from a sensor(s) configured to detect a physical attribute(s) corresponding to the sample. The SQP may, for example, correlate the at least one physical attribute with at least one sample quality metric(s) (SQM). A predetermined minimum quality criterion(s) (MQC) corresponding to the product, sample, and/or showcase may, for example, be retrieved and compared to the SQM. If the SQM does not meet the MQC, then a sample request signal may, for example, be generated. Various
(Continued)

embodiments may, for example, advantageously maintain an attractive product sample for display to potential customers.

15 Claims, 22 Drawing Sheets

Related U.S. Application Data

(60) Provisional application No. 63/256,890, filed on Oct. 18, 2021, provisional application No. 63/235,721, filed on Aug. 22, 2021.

(56) References Cited

U.S. PATENT DOCUMENTS

| | | | |
|---|---|---|---|
| 10,681,519 B1 | 6/2020 | Zalewski et al. | |
| 10,713,620 B2 | 7/2020 | Tucker et al. | |
| 10,977,907 B1 | 4/2021 | Zalewski et al. | |
| 11,042,928 B2 | 6/2021 | Chuah | |
| 11,720,955 B2 | 8/2023 | Chuah | |
| 2003/0163399 A1 | 8/2003 | Harper et al. | |
| 2005/0261928 A1* | 11/2005 | Skeadas | G06Q 30/02 |
| | | | 705/26.1 |
| 2006/0015449 A1 | 1/2006 | Underwood et al. | |
| 2006/0149640 A1 | 7/2006 | Gordon et al. | |
| 2007/0034694 A1 | 2/2007 | Jensen et al. | |
| 2008/0159634 A1 | 7/2008 | Sharma et al. | |
| 2009/0039107 A1 | 2/2009 | Sripada et al. | |
| 2009/0296378 A1 | 12/2009 | Demarest et al. | |
| 2010/0257017 A1 | 10/2010 | Mixson et al. | |
| 2010/0262282 A1 | 10/2010 | Segal et al. | |
| 2010/0324973 A1 | 12/2010 | D Ambrosio et al. | |
| 2011/0029997 A1* | 2/2011 | Wolinsky | G06Q 30/0201 |
| | | | 725/12 |
| 2012/0158522 A1 | 6/2012 | Nazer et al. | |
| 2012/0166271 A1 | 6/2012 | Wofford et al. | |
| 2012/0253926 A1 | 10/2012 | Chen et al. | |
| 2013/0144691 A1* | 6/2013 | Mehta | G06Q 30/0252 |
| | | | 705/14.4 |
| 2013/0226636 A1 | 8/2013 | Hathaway et al. | |
| 2013/0226826 A1* | 8/2013 | Hathaway | G06Q 30/02 |
| | | | 705/348 |
| 2013/0275256 A1 | 10/2013 | Emoff | |
| 2013/0346262 A1* | 12/2013 | Hadden | G06Q 10/087 |
| | | | 705/28 |
| 2014/0100942 A1 | 4/2014 | Konevic | |
| 2014/0149083 A1 | 5/2014 | Sellem | |
| 2014/0172641 A1 | 6/2014 | Sharma | |
| 2014/0278978 A1 | 9/2014 | O'Connor et al. | |
| 2015/0100463 A1 | 4/2015 | Drazin | |
| 2015/0199716 A1* | 7/2015 | Gerard | G06Q 30/0255 |
| | | | 705/14.53 |
| 2015/0317586 A1 | 11/2015 | Kassman | |

| | | | |
|---|---|---|---|
| 2016/0019717 A1 | 1/2016 | Yopp et al. | |
| 2016/0117744 A1 | 4/2016 | Oayda et al. | |
| 2016/0267570 A1 | 9/2016 | Hodges et al. | |
| 2016/0381332 A1 | 12/2016 | Stout et al. | |
| 2017/0262933 A1* | 9/2017 | Chuah | G06Q 10/083 |
| 2019/0089932 A1 | 3/2019 | Oostendorp et al. | |
| 2019/0171194 A1 | 6/2019 | Sato et al. | |
| 2019/0251622 A1* | 8/2019 | Wiedmeyer | G06Q 30/0643 |
| 2020/0143620 A1 | 5/2020 | Jafa et al. | |
| 2020/0233406 A1 | 7/2020 | Chien | |
| 2020/0302169 A1 | 9/2020 | Short et al. | |
| 2020/0320581 A1 | 10/2020 | Lee et al. | |
| 2021/0256771 A1 | 8/2021 | Nemeth et al. | |
| 2022/0192394 A1* | 6/2022 | Gady | A47F 11/10 |

FOREIGN PATENT DOCUMENTS

| | | | |
|---|---|---|---|
| JP | 2004362275 A | 12/2004 | |
| JP | 2014193218 A | 10/2014 | |
| JP | 2021043867 A | 3/2021 | |
| JP | 2021101386 A | 7/2021 | |
| WO | 2006031657 A2 | 3/2006 | |
| WO | 2006031657 A3 | 3/2006 | |
| WO | 2023028388 A1 | 3/2023 | |

OTHER PUBLICATIONS

Cagan, et al, A survey of computational approaches to three-dimensional layout problems, Computer-Aided Design 34.8 (2002): 597-611 (Year 2002).

Chapter II Demand filed in related International Application No. PCT/US2022/073163, dated Jun. 22, 2023, 63 pages.

Foo, Schubert, Online virtual exhibitions: Concepts and design considerations, DESIDOC Journal of Library & Information Technology 28.4 (2008: 22. (Year: 2008).

International Preliminary Report on Patentability in related International Application No. PCT/US2022/073163, dated Nov. 24, 2023, 45 pages.

International Search Report and Written Opinion of the International Searching Authority in related International Application No. PCT/US2022/073163, dated Oct. 13, 2022, 11 pages.

Karamshuk, Dmytro, et al. "Geo-spotting: mining online location-based services for optimal retail store placement." Proceedings of the 19th ACM SIGKDD international conference on Knowledge discovery and data mining. 2013. (Year: 2013), retrieved from the internet Aug. 30, 2021, https://arxiv.org/abs/1306.1704.

Notice of Informal Communication in related International Application No. PCT/US2022/073163, dated Jul. 13, 2023, 3 pages.

Response Under Rule 66 in related International Application No. PCT/US2022/073163, dated Sep. 18, 2023, 32 pages.

Office Action dated Jun. 2, 2026 in related Japanese application No. 2024-510627, 3 pages total (2 pages + 1 page English machine translation).

* cited by examiner

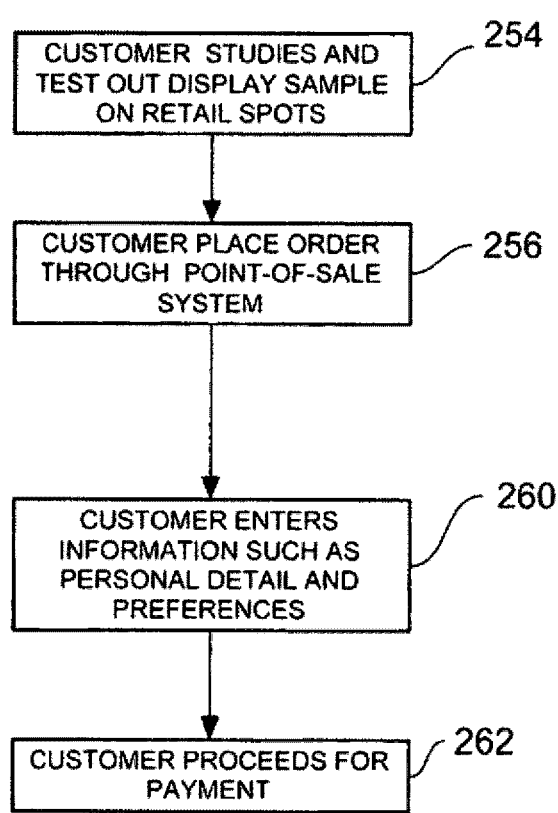
200
254
CUSTOMER STUDIES AND TEST OUT DISPLAY SAMPLE ON RETAIL SPOTS
256
CUSTOMER PLACE ORDER THROUGH POINT-OF-SALE SYSTEM
260
CUSTOMER ENTERS INFORMATION SUCH AS PERSONAL DETAIL AND PREFERENCES
262
CUSTOMER PROCEEDS FOR PAYMENT
FIG. 2

300

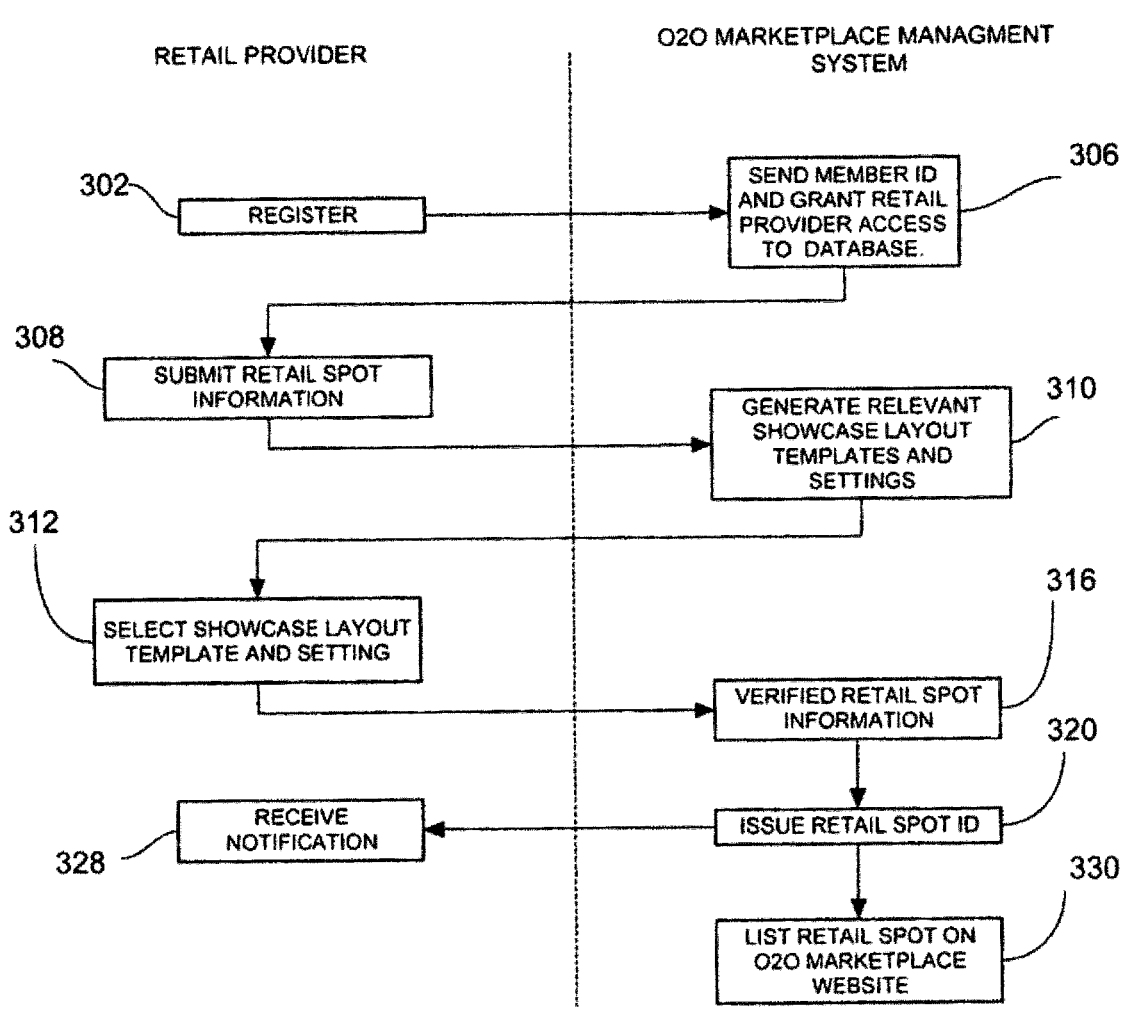

RETAIL PROVIDER

O2O MARKETPLACE MANAGMENT SYSTEM

302 — REGISTER

306 — SEND MEMBER ID AND GRANT RETAIL PROVIDER ACCESS TO DATABASE.

308 — SUBMIT RETAIL SPOT INFORMATION

310 — GENERATE RELEVANT SHOWCASE LAYOUT TEMPLATES AND SETTINGS

312 — SELECT SHOWCASE LAYOUT TEMPLATE AND SETTING

316 — VERIFIED RETAIL SPOT INFORMATION

320 — ISSUE RETAIL SPOT ID

328 — RECEIVE NOTIFICATION

330 — LIST RETAIL SPOT ON O2O MARKETPLACE WEBSITE

| MEMBER | O2O MARKETPLACE MANAGEMENT SYSTEM | WAREHOUSE | RETAIL FACILITY |
|---|---|---|---|

702

LOGIN

704

SELECT PRODUCT

705

SELECT RETAIL SPOT

706

CONFIGURE SAMPLE PROCESSING SETTING

ASSIGN WAREHOUSE ADDRESS

708

UPDATE SAMPLE INVENTORY

712

710

SHIP SAMPLE TO WAREHOUSE

NOTIFICATION

714

SAMPLE READY

713

AT SPECIFIC DATE, INSTRUCT WAREHOUSE TO SHIP SAMPLE

750

WAREHOUSE SHIP SAMPLE

752

SAMPLE RECEIVED AND DISPLAYED AT RETAIL SPOT

Genuine Leather Shoes

SALE! 20% OFF!

865

870

815

810

835

840

845

825

830

875

850

855

860

1100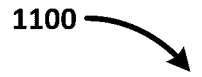

Start

Receive showcase registration   1105

Generate unique showcase ID (RID)   1110

Associate RID with available status   1115

RID matched to PID?   1120

NO

YES

Generate sample ID (SID) associated with PID & RID   1125

Generate SID shipping signal(s)   1130

Receive update associated with SID and displayed showcase ID (RID2)   1135

1145

Generate electronic message(s)

NO   RID = RID2?   1140

YES

Update SID to confirm association with RID   1150

End

Figure 12:
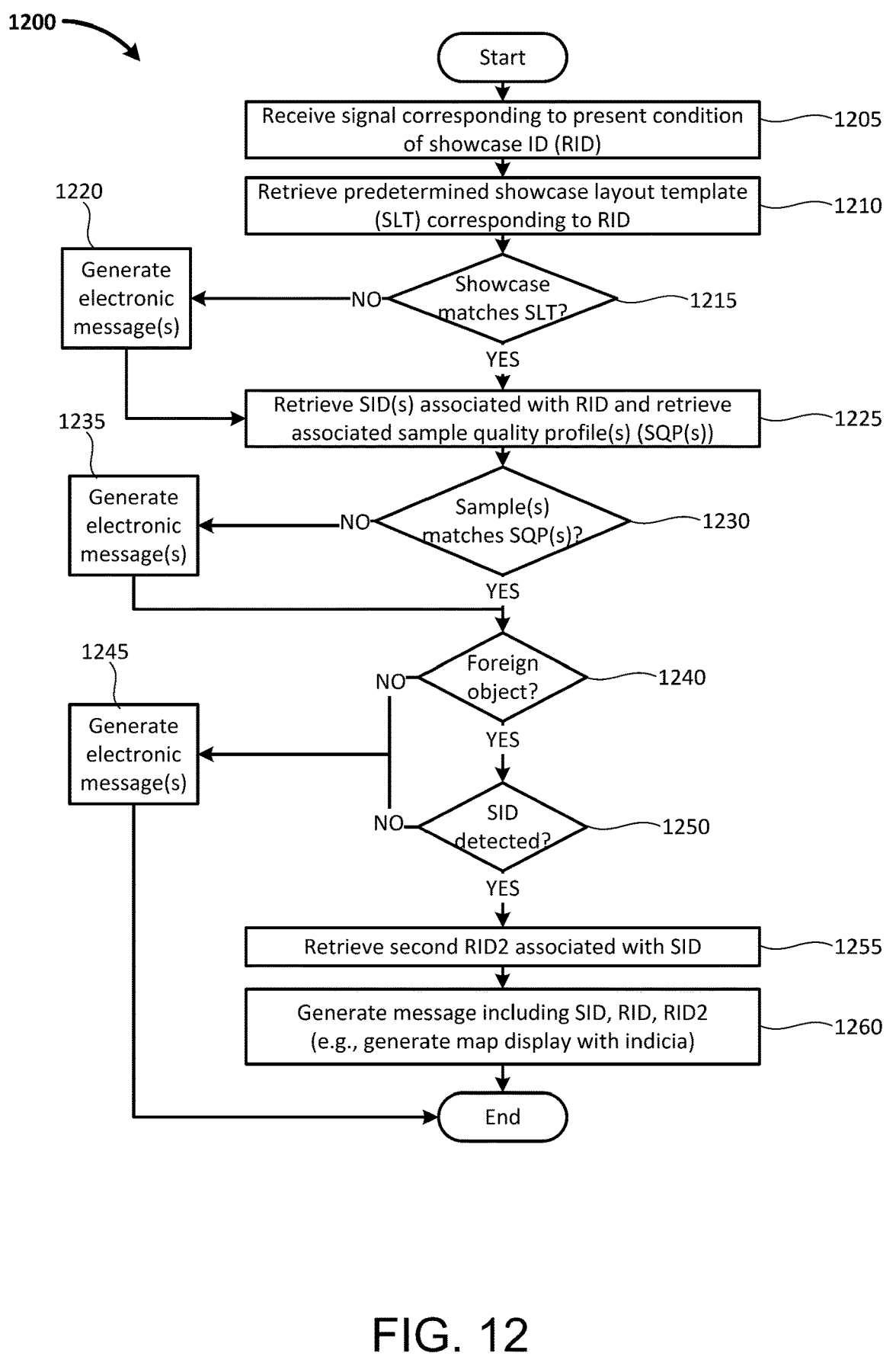

```
                              ┌─────────┐
                              │  Start  │
                              └─────────┘
                                   │
                                   ▼
          ┌────────────────────────────────────────────────┐
          │ Receive signal corresponding to present condition │──── 1205
          │            of showcase ID (RID)                  │
          └────────────────────────────────────────────────┘
                                   │
                                   ▼
          ┌────────────────────────────────────────────────┐
          │ Retrieve predetermined showcase layout template  │──── 1210
          │         (SLT) corresponding to RID               │
          └────────────────────────────────────────────────┘
                                   │
  1220                             ▼
  ┌──────────┐              ╱ Showcase  ╲
  │ Generate │◄──── NO ────╱  matches SLT? ╲──── 1215
  │electronic│              ╲             ╱
  │message(s)│               ╲          ╱
  └──────────┘                   │
       │                        YES
       │                         ▼
       │        ┌────────────────────────────────────────────────┐
       └───────►│ Retrieve SID(s) associated with RID and retrieve │──── 1225
  1235          │ associated sample quality profile(s) (SQP(s))    │
                └────────────────────────────────────────────────┘
  ┌──────────┐                   │
  │ Generate │                   ▼
  │electronic│◄──── NO ────╱ Sample(s)  ╲──── 1230
  │message(s)│              ╲ matches SQP(s)? ╲
  └──────────┘               ╲             ╱
       │                         │
       │                        YES
       │                         ▼
  1245 │                   ╱ Foreign  ╲
  ┌──────────┐       NO ──╱  object?   ╲──── 1240
  │ Generate │◄────┐      ╲           ╱
  │electronic│     │       ╲        ╱
  │message(s)│     │          │
  └──────────┘     │         YES
       │           │          ▼
       │           │    ╱   SID    ╲
       │           └NO─╱ detected?  ╲──── 1250
       │               ╲           ╱
       │                ╲        ╱
       │                   │
       │                  YES
       │                   ▼
       │     ┌────────────────────────────────────────────────┐
       │     │   Retrieve second RID2 associated with SID       │──── 1255
       │     └────────────────────────────────────────────────┘
       │                   │
       │                   ▼
       │     ┌────────────────────────────────────────────────┐
       │     │ Generate message including SID, RID, RID2        │──── 1260
       │     │ (e.g., generate map display with indicia)        │
       │     └────────────────────────────────────────────────┘
       │                   │
       │                   ▼
       │              ┌─────────┐
       └─────────────►│   End   │
                      └─────────┘
```

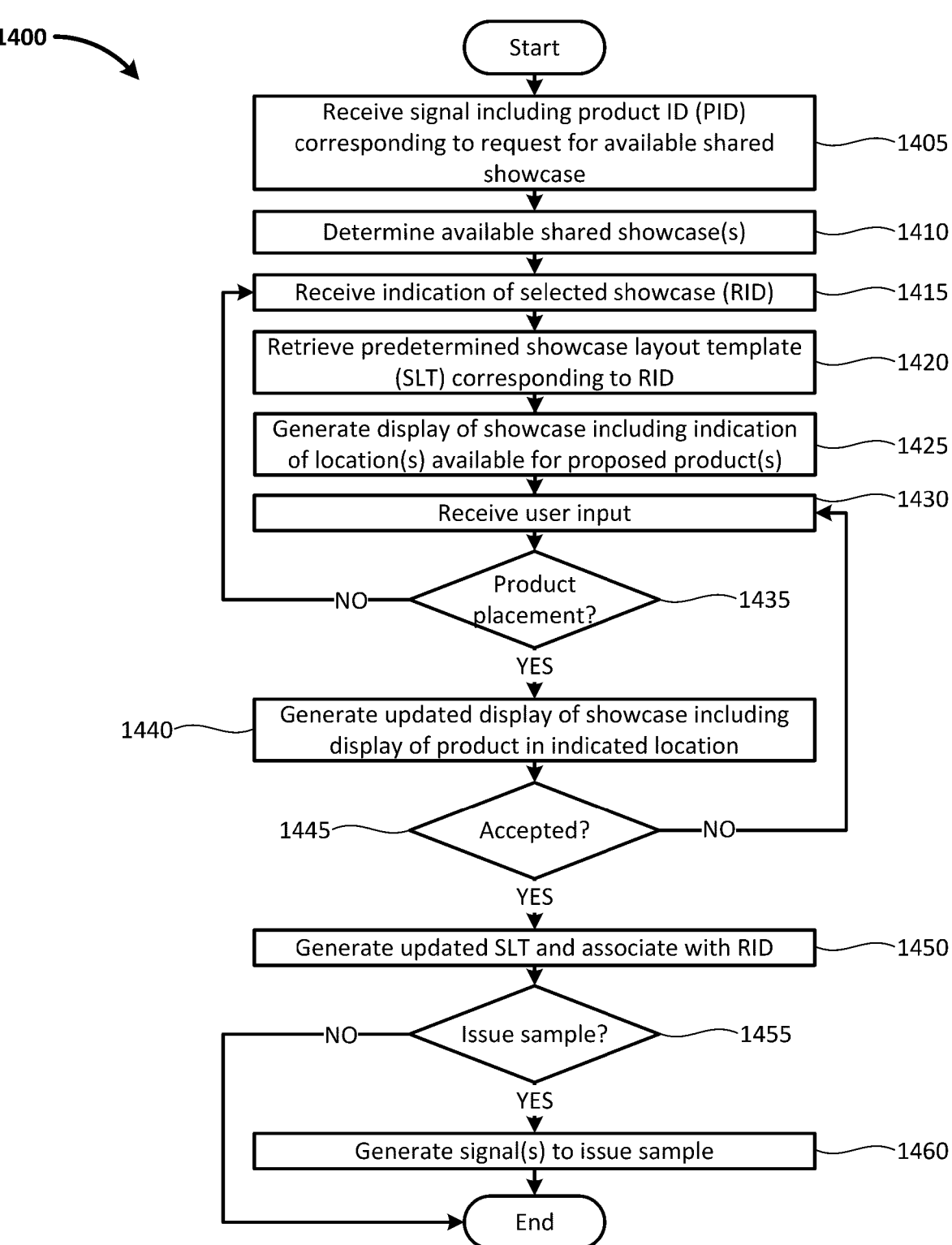

Start

Receive signal including product ID (PID) corresponding to request for available shared showcase — 1405

Determine available shared showcase(s) — 1410

Receive indication of selected showcase (RID) — 1415

Retrieve predetermined showcase layout template (SLT) corresponding to RID — 1420

Generate display of showcase including indication of location(s) available for proposed product(s) — 1425

Receive user input — 1430

Product placement? — 1435

NO

YES

1440 — Generate updated display of showcase including display of product in indicated location 1445 — Accepted? — NO

YES

Generate updated SLT and associate with RID — 1450

Issue sample? — 1455

NO

YES

Generate signal(s) to issue sample — 1460

End

1700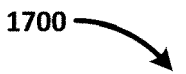

Start

Receive sales data corresponding to PID — 1705

Determine locations of sales corresponding to PID — 1710

Determine sales concentration regions over threshold(s) — 1715

Determine RID(s) within selected sales concentration region — 1720

1730

Send sample to retail location? ←NO— Active SID associated with RID? — 1725

NO

YES

YES

Sample:Sales meets predetermined criterion(s)? — 1735

NO

YES

Sample quality meets predetermined criterion(s)? — 1740

YES

NO

Generate new SID(s) and shipping signal(s) — 1745

End

FIG. 17

AUTOMATIC RETAIL DISPLAY MANAGEMENT

CROSS-REFERENCE TO RELATED APPLICATIONS

This application is a national stage application under 35 U.S.C. 371 of and claims the benefit of PCT application serial number PCT/US2022/073163, titled "Automatic Retail Display Management," filed by Khai Gan Chuah on Jun. 24, 2022, which is a Continuation-in-Part of and claims the benefit of U.S. application Ser. No. 17/453,843, titled "Automatic Retail Display Management," filed by Khai Gan Chuah on Nov. 6, 2021, which application claims the benefit of U.S. Provisional Application Ser. No. 63/235,721, titled "Offline to Online Management System," filed by Khai Gan Chuah on Aug. 22, 2021, and also claims the benefit of U.S. Provisional Application Ser. No. 63/256,890, titled "Automatic Retail Display Management," filed by Khai Gan Chuah on Oct. 18, 2021.

PCT application serial number PCT/US2022/073163 also claims the benefit of U.S. Provisional Application Ser. No. 63/235,721, titled "Offline to Online Management System," filed by Khai Gan Chuah on Aug. 22, 2021. PCT application serial number PCT/US2022/073163 also claims the benefit of U.S. Provisional Application Ser. No. 63/256,890, titled "Automatic Retail Display Management," filed by Khai Gan Chuah on Oct. 18, 2021.

This application incorporates the entire contents of the foregoing application(s) herein by reference.

This application may contain related subject matter and/or have a common inventor with: U.S. application Ser. No. 17/302,281, titled "Offline to Online Management System," filed by Khai Gan Chuah on Apr. 29, 2021; U.S. application Ser. No. 16/224,518, titled "Offline to Online Management System," filed by Khai Gan Chuah on Dec. 18, 2018; and U.S. application Ser. No. 15/065,857 titled "Offline to Online Management System" filed by Khai Gan Chuah on Mar. 10, 2016.

This application incorporates the entire contents of the foregoing application(s) herein by reference.

TECHNICAL FIELD

Various embodiments relate generally to automatic retail location management.

BACKGROUND

Customers may purchase products from a merchant. A customer may view and interact with products at a retail facility. A warehouse may store products for shipping to a retail facility. A manufacturer may supply products to a merchant for sale.

SUMMARY

Apparatus and associated methods relate to dynamically managing quality of a sample in a public display space. In an illustrative example, a sample quality profile (SQP) may be generated in response to a sample update signal. The sample update signal may, for example, originate from a physical product display location. The sample update signal may, for example include data from a sensor(s) configured to detect a physical attribute(s) corresponding to the sample. The SQP may, for example, correlate the at least one physical attribute with at least one sample quality metric(s)

(SQM). A predetermined minimum quality criterion(s) (MQC) corresponding to the product, sample, and/or showcase may, for example, be retrieved and compared to the SQM. If the SQM does not meet the MQC, then a sample request signal may, for example, be generated. Various embodiments may, for example, advantageously maintain an attractive product sample for display to potential customers.

Various embodiments may achieve one or more advantages. For example, some embodiments may advantageously enable a merchant to remotely manage a physical display at a retail provider's physical location. Various embodiments may, for example, advantageously promote efficient use of physical retail space for display of physical goods offered by remote merchants. Some embodiments may advantageously, for example, confirm actual display of a sample in an intended showcase. Various embodiments may, for example, advantageously reduce time and/or manual input needed to monitor sample display and/or assembly.

The details of various embodiments are set forth in the accompanying drawings and the description below. Other features and advantages will be apparent from the description and drawings, and from the claims.

BRIEF DESCRIPTION OF THE DRAWINGS

FIG. 2 is a flowchart that illustrates an exemplary purchase transaction process of a customer at a brick-and-mortar retail store utilizing an exemplary O2O Management System.

FIG. 3 is a flowchart that illustrates an exemplary process of submitting a retail spot to an exemplary O2O Management System by a retail provider.

FIG. 7 is a flowchart that illustrates the sample shipping service offered and handled by O2O Management System.

FIG. 11 is a flowchart depicting an exemplary process for registration of a product sample at a particular showcase.

FIG. 12 is a flowchart depicting an exemplary process for evaluation of a physical showcase based on a predetermined showcase layout template.

FIG. 14 is a flowchart depicting an exemplary process for configuring a product in a shared showcase.

FIG. 17 is a flowchart depicting an exemplary method for dynamically sending samples based on geographical sales concentration.

Like reference symbols in the various drawings indicate like elements.

DETAILED DESCRIPTION OF ILLUSTRATIVE EMBODIMENTS

Figure 1:
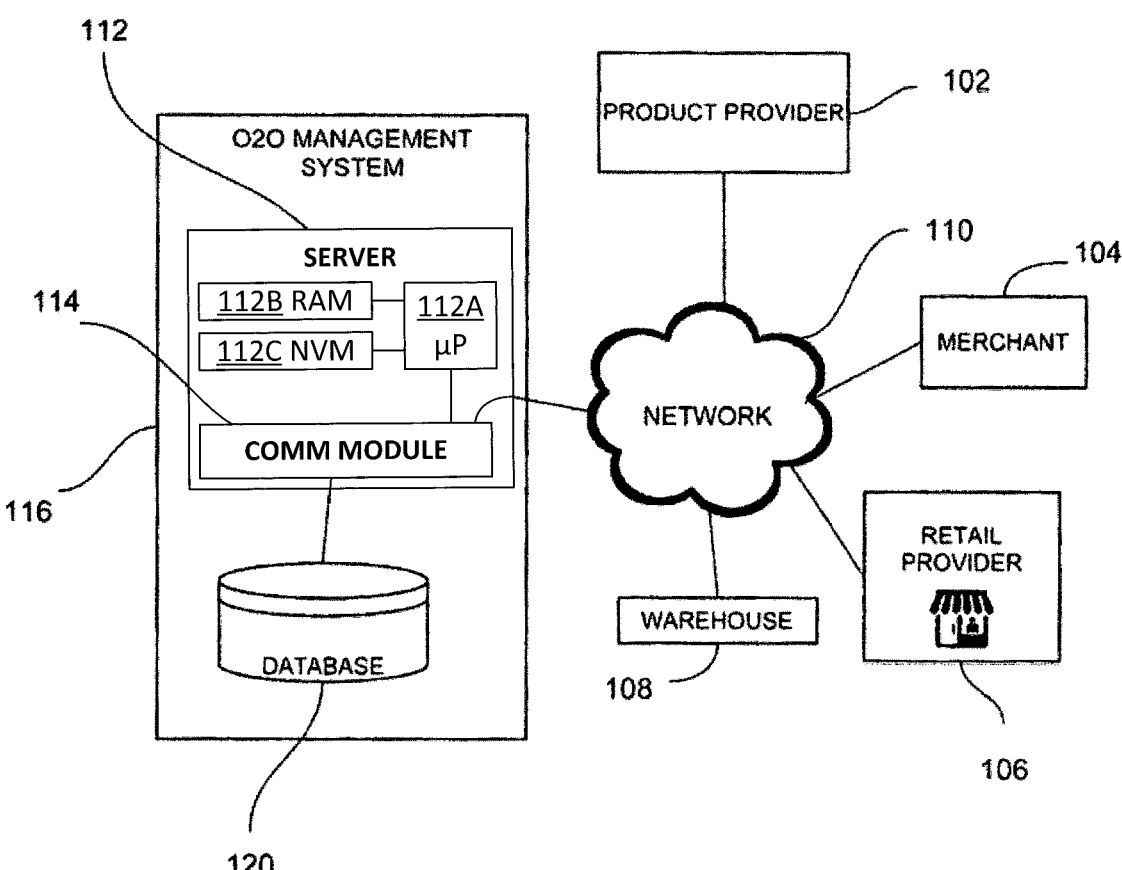
FIG. 1 is a block diagram of an exemplary O2O Management System.

In various embodiments a "merchant" may include at least one entity (e.g., individual, company) that sells one or more products. The products may, for example, be sold in a retail facility. A sales transaction may be completed when a customer receives a purchased item at his/her designated location (e.g., at the retail store, at a home address, at an office address).

In various embodiments a "retail facility" may include a physical site at which products are available (e.g., displayed) for a customer to view and/or purchase. A retail facility may, for example, include at least some portion of a building. A retail facility may include an open space such as a patio and/or sidewalk. In various embodiments a retail facility may be usable by a retail provider in facilitating a drop-shipping business. An item may, for example, be available for purchase at the retail facility, but the retail facility may not stock inventory (e.g., the actual purchased item may be (drop-) shipped from another location such as a warehouse).

In various embodiments a "retail provider" may include an entity (e.g., individual, company) that possesses authority to offer for lease a space of a retail facility for operation purposes. The retail facility may, for example, be an architectural facility. The retail facility may, for example, be a commercial facility. The retail facility may, for example, be non-commercial private property (e.g., residence, public gathering place, park).

In various embodiments a "retail spot" may include a space which may be configured to receive a product show-case. A product showcase may, for example, be configured to display one or more products in a retail facility. The product(s) displayed may, for example, be a sample(s) of product to purchase. In some embodiments, a retail spot may, by way of example and not limitation, be divided into segments. Each segment may represent a product showcase with specific dimensions. These showcases may, for example, be subleased to third parties via an O2O Manage-ment System. A retail spot may, by way of example and not limitation, include a structure within a retail facility such as trading post, kiosk, sales booth, wall, platform, store fixture, or some combination thereof. Store fixtures may include, by way of example and not limitation, shelves, table tops, and/or counters. A store fixture (and/or portion thereof) may, for example, have specific dimensions associated with at least one retail spot identification. In various embodiments a "retail spot identification" (RID) may denote a unique identifier for a particular retail spot.

In various embodiments a product may, for example, be identified by a "product identification" ("PID"). A PID may, for example, be configured as a unique identifier for a particular product.

In various embodiments a "showcase template" may include a distinct layout design of a retail spot. A showcase template may, by way of example and not limitation, include dimensions, display elements, interaction features, sensor elements, sensor locations, human-machine interface (HMI) elements, HMI element locations, or some combination thereof. In various embodiments a showcase template may, for example, include (predetermined) interaction parameters and/or sequences of display elements, sensor elements, and/or HMI elements. A showcase template may, for example, include images, audio, video, and/or other media for association with a showcase for a product(s). A showcase template may, for example, include a geometric orientation for a showcase and/or product (e.g., relative to the show-case).

In various embodiments an "open space retail spot" may include an (unfurnished) retail spot. The open space retail spot may, for example, be customized (e.g., custom designed) by a member of an O2O Management System. A "member" may, for example, include an entity who associ-ated with an O2O Management System. The member may, for example, register (e.g., 'sign up') with the O2O Man-agement System. In various embodiments a member may, for example, include a retail provider, merchant, warehouse, and/or product provider. A member may, for example, be provided with a "member ID." The member ID may, for example, (uniquely) identify an entity in a specific O2O Management System.

A "product provider" may, for example, include an entity (e.g., individual, company) who warehouses products. The product provider may, for example, be a supplier. The product provider may, for example, engage in drop-shipping business.

In various embodiments "drop shipping" may include transferring a customer's order at a retail location to a third party (e.g., manufacturer, vendor, supplier, wholesaler, dis-tributor, other retailer). The third party may, for example, initiate shipment of the ordered item (directly) to the cus-tomer. Drop shipping, may, in some cases, allow a merchant to avoid cost associated with stocking items in its own inventory.

FIG. 1 is a block diagram of an exemplary O2O Man-agement System. In a depicted networked merchandising system 100, a product provider 102, a merchant 104, a retail provider 106, and a warehouse 108 communicate via a network 110 with an exemplary O2O Management System 116. As depicted, the O2O Management System 116 includes a server 112. The server 112 includes a micropro-cessor 112A (labeled "uP"), a random-access memory mod-ule 112B (labeled "RAM" and including one or more RAM circuits) and a non-volatile memory module 112C (labeled "NVM" and including one or more NVM circuits). The microprocessor 112A may include, for example, one or more processor components (e.g., individual microprocessor chips). The microprocessor 112A may, for example, be configured to execute at least one program of instructions tangibly embodied on the non-volatile memory module 112C. Accordingly, operations may be performed to implement one or more methods disclosed herein (e.g., such as disclosed at least with reference to FIGS. 2-7 and 10-11).

Various embodiments may, for example, advantageously enable the merchant 104 to remotely manage a physical display at the retail provider 106 physical location. The physical display may include a physical product remotely provided by the product provider 102. The physical product may, for example, be delivered from the warehouse 108. Accordingly, various embodiments may advantageously promote efficient use of physical retail space for display of physical goods offered by remote merchants.

The server 112 is provided with a communication module 114. The communication module 114 includes one or more circuits which connect the network 110 to the O2O Management System 116. For example, the communication module may include wired and/or wireless communication circuits. For example, the communication module 114 may be configured to generate and/or receive electronic messages through the network 110. Accordingly, the product provider 102, the merchant 104, the retail provider 106, and/or the warehouse 108 may communicate via the network 110 with the O2O Management System 116 by the communication module 114. In various embodiments the product provider 102, the merchant 104, the retail provider 106, and/or the warehouse 108 may, for by way of example and not limitation, operate one or more computing devices (e.g., smartphone, laptop, tablet, computer, server) to interact with the communication module 114 via the network 110.

In various embodiments the communication module 114 may be configured to generate one or more human-readable interfaces (e.g., in response to signals from the microprocessor 112A). For example, the communication module 114 may generate a (dynamic) website interface for the O2O Management System 116. The network 110 may, for example, include a secured internet network. The secured internet network may use a secure protocol such as https. A merchant 104, retail provider 106, warehouse 108 or product provider 102 may thereby interact with the O2O Management System 116.

The O2O Management System 116 further includes a database 120 (e.g., one or more databases embodied on one or more tangible electronic data storage devices). The database 120 may, by way of example and not limitation, store parameters, product information, retail information, sample information, or some combination thereof. As depicted, the database 120 is in communication with the microprocessor 112A via the communication module 114. In some embodiments, for example, the database 120 may, for example, be in electrical communication with the microprocessor 112A without interposition of the communication module 114.

In various embodiments disclosed herein, actions indicated as being taken by the merchant 104, retail provider 106, warehouse 108, and/or product provider 102 may, for example, be performed by or through, as applicable, a web browser(s) and/or mobile web apps on a computer and/or smart device. Actions indicated as being taken by the O2O Management System 116 may, for example, be performed by or through, as applicable, the O2O Management System 116 server 112 (server/servers) and associated software components executed on the microprocessor 112A.

FIG. 2 is a flowchart that illustrates an exemplary purchase transaction process of a customer at a brick-and-mortar retail store utilizing an exemplary O2O Management System. As depicted in the method 200, a customer studies and tests out a sample(s) displayed at a retail spot(s) (step 254). The retail spot may, for example, be physically located in a retail facility (e.g., a store). Each retail spot may, for example, be associated (e.g., tagged, labeled with a unique Retail Identification (RID). Each sample representing a product may, for example, be tagged and/or labeled with unique Product Identification (PID) and/or UPC code. Each product (e.g., inventory available for a customer to purchase) may, for example, be tagged and/or labeled with the PID. The sample may, for example, be provided with at least one (unique) Sample Identifier (SID). The SID may, for example, uniquely identify the sample. The SID may, for example, be associated with a (unique) combination of the PID and the RID.

An on-site purchase transaction is performed (step 256) by the customer presenting the merchandise at a point-of-sale (POS) system such as, for example, by scanning and/or by manually keying in the PID and/or UPC code(s). The customer may, by way of example and not limitation, present an actual item of the product represented by the sample. The customer may, for example, present a code representing the product (e.g., to initiate a drop-shipping order, after having inspected the sample). The customer may, for example, present a token representing the product (e.g., electronic token such as a bar code, QR-code; a physical token such as a product tag). At the POS, the transaction information such as payment method, delivery method (e.g., preferred carrier, shipping speed, local pickup), or some combination thereof. In the depicted example, the customer's personal details are entered on the POS system (step 260). The transaction may be completed when payment is retrieved (step 262). For example, payment may be automatically processed from information entered in a previous step (e.g., account information, credit card information). Payment may, for example, be presented by the customer (e.g., cash, check). The customer may, for example, pay on the spot and/or via remote (e.g., internet) payment service.

The POS system may, for example, be self-serviced. The POS system may, for example, be operated by store assistants. The POS system may, by way of example and not limitation, include a self-service kiosk. The POS system may, for example, include an online shopping site. The POS system may, for example, include an app running on a mobile device. The POS system may, for example, connected to the O2O Management System 116 (e.g., through a secured internet connection). The transaction information may, for example, be submitted to the O2O Management System 116 via the network 110.

The customer may, for example, select a product supplier from the list of product providers offered by the marketplace of O2O Management System 116. In some embodiments the O2O Management System 116 may, by way of example and not limitation, automatically assign a product provider 102 for the transaction without requiring the customer to make any selection. For example, the O2O Management System 116 may automatically determine a product provider 102 based on a product profile (e.g., perishable goods, shipping size, weight). The product provider 102 may, for example, be automatically determined based on a customer profile (e.g., location, preferences). The product provider 102 may, for example, be automatically determined based on a warehouse profile (e.g., location, inventory, shipping speed). The product provider 102 may, for example, be automatically determined based on a retail provider profile (e.g., location, inventory, preferences). The product provider 102 may, for example, be automatically determined based on a merchant profile (e.g., preferences, pre-negotiated contracts, payment arrangements, quality requirements).

Once a purchase transaction has completed, a selected product provider 102 may, for example, be notified by the O2O Management System 116 to ship the merchandise to the customer's designated shipping address. The monetary transaction may be managed by the O2O Management System 116. The transaction may, for example, be deposited to a bank account designated by O2O Management System and/or an appropriate member of the O2O Management System. The O2O Management System 116 may, for example, deduct appropriate costs (e.g., sales commission, transaction fees, membership fees). The O2O Management System 116 may issue payment accordingly to its members (e.g., retail provider 106, merchant 104, product provider 102, warehouse 108).

FIG. 3 is a flowchart that illustrates an exemplary process of submitting a retail spot to an exemplary O2O Management System by a retail provider. In the depicted exemplary method 300, a retail provider 106 registers (step 302) its information with the O2O Management System marketplace (e.g., via communication module 114). The retail provider 106 may, for example, submit a furnished retail spot. The retail provider 106 may, for example, submit an unfurnished retail spot. The retail spot may, by way of example and not limitation, include a corner of a building, a (portion of a) wall, a (portion of a) patio, other physical site suitable for display of at least one product, or some combination thereof. In various embodiments an unfurnished retail spot may, for example, be assigned an attribute (e.g., metadata) of "open-space."

Upon registering, the retail provider 106 receives a member ID (step 306) and proceeds to submit its retail spot information to the O2O Management System 116 (step 308). The retail spot information of a retail facility may be provided by the retail provider 106. In various embodiments retail sport information may include, by way of example and not limitation, location (e.g., latitude/longitude coordinates, address), product category, number of showcases and/or retail spots available, showcase dimensions (e.g., Length× Width×Height), a maximum product weight allowance for each retail spot (e.g., of specific fixtures), terms & conditions, preferred visual patterns and/or colors, open-space (e.g., Yes or No) attribute, or some combination thereof. Based on the information received, the O2O Management System 116 will generate a list of relevant showcase layout templates (step 310) for the retail provider 106 to select and build on spot (step 312).

In various embodiments the O2O Management System 116 may generate a list of relevant showcase layout templates using at least one library of predetermined templates. In some embodiments the O2O Management System 116 may, for example, generate a list of relevant showcase layout templates using at least one custom-designed showcase layout template. In some embodiments the O2O Management System 116 may, for example, generate a list of relevant showcase layout templates using at least one automatically designed template. The list may, for example, be generated according to attributes of an (associated) product and/or sample, retail spot information, or some combination thereof.

In some embodiments the O2O Management System 116 may accept a personalized showcase design setting from at least one member (e.g., if the retail spot has been assigned as open space in the attribute). As an exemplary illustration, a merchant, product provider (e.g., manufacturer, distributor) may prefer a unique brand characteristic to be applied to each retail spot at a retail facility bearing its product(s). For example, a shoe manufacturer may require unique display attributes to be associated with its shoes. The shoe manufacturer may, for example, require that the display be associated with other shoes. The manufacturer may, for example, require that the display not be associated with other shoes. The manufacturer may, for example, require that unique colors, geometries, patterns, images (e.g., logos, advertisements), sounds, smells, arrangements (e.g., orientation of samples, display fixtures), or some combination thereof be applied to its showcases. A showcase attribute profile may, for example, be associated with the manufacturer, associated product(s), associated merchant(s), associated retail provider(s), or some combination thereof.

The O2O Management System 116 verifies the retail spot information and/or the member complies with one or more setup guidelines (step 316). The setup guidelines may, for example, be provided by the O2O Management System 116, by a merchant, by a product provider, or some combination thereof. The setup guidelines may, for example, include at least one showcase attribute profile. Once the retail spot information and/or member is verified, a RID will be issued (step 320) and a notice of confirmation (step 328) will be sent to the retail provider 106.

Once the retail spot has listed, it is made available on a marketplace of the O2O Management System (step 330). Merchants and/or product providers may discover (e.g., browsing, searching, auto-suggestion by the O2O Management System 116) for placement of products (e.g., by a rental and/or commission agreement with the retail provider). For example, members may discover an available retail spot via a website interface. Accordingly, a retail spot may, for example, be advantageously utilized by the O2O Management System 116, by product providers, and/or merchants as an outlet and/or storefront for their products.

The O2O Management System 116 may, for example, conduct retail spot design layout checking from time to time. The layout verification process may include, by way of example and not limitation, image submission by a member and/or manual inspection by authorized personnel to the retail facility. For example, in some embodiments a showcase layout template may include placement of one or more sensors. The sensors may, for example, include at least one optical sensor (e.g., camera). The optical sensor may capture images of the displayed product (e.g., a sample) and/or the retail spot (e.g., the showcase). Image analysis may be (automatically) performed on the images. The image analysis may, for example, compare a showcase attribute profile and/or a product attribute profile (e.g., of a properly assembled and/or displayed product) to the images. If the analysis indicates that the product and/or retail spot do not meet a (predetermined) profile, the O2O Management System 116 may, for example, generate and transmit at least one electronic message (e.g., to the merchant 104, the product provider 102, the retail provider 106).

Once committed to the O2O Management System 116 (e.g., by a signed contract), the retail provider 106 may be required to fulfill various retail services (e.g., on a regular basis) in relation to at least one PID. The retail provider 106 may, for example, be required to display a product sample(s) according to an RID and/or SID assigned, keep a sample(s) in order/tidy, report to the O2O Management System 116 if there are samples missing and/or damaged, request sample replacements as necessary (e.g., upon sample quality declining below a minimum sample quality criterion), send sales report to O2O Management System, or some combination thereof. In some embodiments the retail provider 106 may, for example, be responsible for managing sales transaction at the retail location associated with the PID. For example, the retail provider 106 may provide point-of-sale system including, by way of example and not limitation, store assistants, self-service kiosk, online shopping site or apps on mobile devices, or some combination thereof, to facilitate the customer purchase transaction. Further activities related to retail store operation (e.g., notifications regarding holiday closure days, store operating hours) may be provided by the retail provider 106. The retail provider 106 may, for example, (manually and/or automatically) submit a store report to the O2O Management 116 (e.g., on a regular basis).

Figure 4:
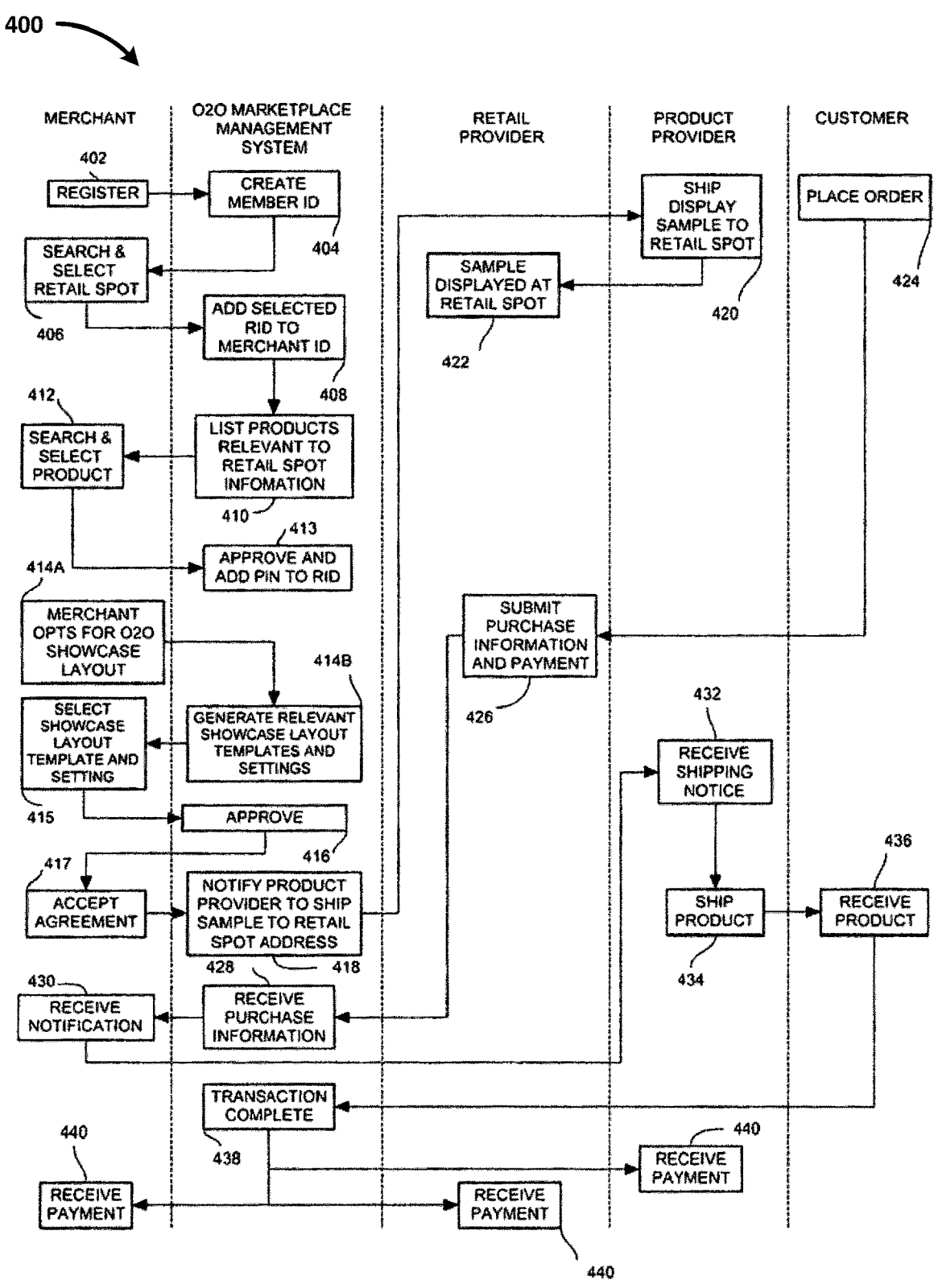
FIG. 4 is a flowchart illustrates an exemplary process of a merchant selling a third-party product using an exemplary O2O Management System at an exemplary selected retail spot.

FIG. 4 is a flowchart illustrates an exemplary process of a merchant selling a third-party product using an exemplary O2O Management System at an exemplary selected retail spot. In the depicted exemplary method 400, a merchant 104 registers (step 402) information to the O2O Management System marketplace. Upon registration, the merchant 104 receives a member ID (step 404) from the O2O Management System 116. The merchant 104 may proceed to access available retail spots (e.g., globally, nationally, in a defined geographic region). The merchant 104 searches and selects a relevant (e.g., desired) retail spot (step 406) information. Relevant retail spot information may include, by way of example and not limitation, retail sector, product category, store location, retail spot dimension (Length× Depth× Height), maximum weight of each showcase fixture, lease terms & conditions, or some combination thereof. Once the information is provided, associated retail spots may be displayed. The merchant 104 may select a desired retail spot identified by an associated (unique) RID.

The merchant 104 may be prompted to provide and/or select a showcase layout associated with the selected retail spot. The merchant 104 may, for example, be prompted for a showcase layout template in response to selecting an open-space retail spot. In various embodiments the merchant 104 may have an option to select a standardized showcase layout offered by the O2O Management System 116. The merchant may, for example, be provided an option to provide a custom and/or third-party provided showcase layout. Once the O2O Management System 116 verifies and approves the customized setting of a particular retail spot, the merchant's information may be associated with the selected RID (step 408).

A matching algorithm proceeds to retrieve a list of products which may be suitable for the retail spot based on the retail spot attributes (e.g., stored in the database 120) (step 410). The list of products may, for example, be associated with corresponding PIDs. In various embodiments the O2O Management System 116 matching procedure may, for example, compare the attributes of the RID with the PID. As an exemplary illustration, a retail spot in Austin, Texas in the baby product category, with a showcase dimension of 2'×2,' may be selected by the merchant. Products associated with a baby product category may, for example, be selected. The products may, for example, be selected according to suitability of display in a 2'×2' space (e.g., the product size, associated showcase attribute profile parameters). The products may, for example, be selected based on geographical location (e.g., availability of warehouses for drop-shipping, shipping costs from product locations, demographics, sales potential in the location, climate of the location). For example, hot weather baby products may be selected based on the climate of the location. Music-related and/or cowboy-related baby products may be selected based on the location (e.g., shoppers in Austin may have a high propensity for music and/or cowboy related products).

Next, the merchant 104 selects the desired product from the list of products provided by the O2O Management System 116. When the merchant 104 selects a product from the list (step 412), the PID is associated with the merchant's selected RID (step 413). In various embodiments the sequence of retail spot and product selection may be rearranged. For example, in some embodiments a merchant 104 may select a product before selecting a retail spot later. In some such embodiments, one or more retail spots may be discovered (e.g., manually filtered, auto suggested) based on one or more attributes of a selected product(s). For example, an apple themed picnic basket that is red, brown, and green, with a size of 3'×4'×1' may be selected. Retail spots may be suggested based on associated categories (e.g., dining product, outdoor product, camping product). Retail spots may be suggested based on size. Retail spots may be suggested based on showcase attributes (e.g., color, apple-themed). Retail spots may be suggested based on surrounding products (e.g., with matching and/or complimentary attributes). Retail spots may, for example, be suggested based on location (e.g., New-York (the "Big Apple") retail spots may be suggested based on the apple theme, a retail spot in a park may be suggested based on picnicking).

Once the paring is completed, the merchant 104 will decide one or more showcase layout options. If the selected showcase has never been setup at the retail facility (e.g., the retail space is an open-space retail spot), the merchant 104 can either submit his own retail spot design setting to O2O Management System 116 (not shown in FIG. 4 flow chart) and/or the merchant 104 may have the option to accept a standardized showcase template offered by the O2O Management System 116 (step 414A). Based on the information received, the O2O Management System 116 will generate a list of relevant showcase layout templates (step 414B) for the merchant 104 to select and build at retail facility. When the showcase layout has been selected and finalized by the merchant (step 415), the O2O Management System 116 may verify and/or proceed to approve the selection (step 416). The O2O Management System 116 may generate an agreement for the merchant. Once the merchant 104 accepts the agreement (step 417) (e.g., including making payment for the retail spot), the O2O Management System 116 will inform the product provider 102 (step 418) to ship at least one associated sample to the selected retail spot (step 420). When the retail facility receives the sample, it will be displayed at the retail spot (step 422). In some embodiments, the merchant 104 may contact a product provider 102 and request a sample to be shipped to the selected retail spot. In some embodiments, the O2O Management System 116 may handle the sample shipping process on behalf of merchant. For example, samples may be stored at an O2O Management System 116 designated warehouse 108. A signal (e.g., electronic message) may be generated by the O2O Management System 116 to cause the sample to be shipped to the retail spot.

In various embodiments a product may, for example, be assigned and/or linked to unlimited number of retail spots. Some embodiments may allow more than one merchant to compete for a single retail spot. Allocation of the retail spot may, for example, be done by an arbitrary process (e.g., using a random number generator and comparing the number to the merchant's member ID and/or PID and/or the RID). Allocation of the retail spot may, for example, be performed by an auction system. The auction may, for example, be managed by the O2O Management System 116.

When a customer purchases an item (step 424), the purchase information and payment is submitted by the retail provider 106 (step 426) to the O2O Management System 116. Upon receiving the payment (step 428), the merchant 104 receives notification (step 430) from the O2O Management System 116. The merchant 104 informs the product provider 102 (e.g., by automatically generated electronic message, such as by the O2O Management System 116) to ship the purchased merchandise to the customer. The merchant 104 may, for example, receive notification of the number of items sold (e.g., via email and/or in a user account). The product provider 102 receives the shipping notice (step 432) and ships out the product(s) to the designated address (step 434). When the customer receives the product (step 436), the sales transaction is completed (step 438). The monetary transaction may be managed by the O2O Management System 116. The O2O Management System 116 issues payment (e.g., to the merchant, product provider 102, and/or retail provider 106) (step 440). Payment may, for example, be issued at an end of a (predetermined) billing cycle. Payment may, for example, be issued immediately.

Figure 5:
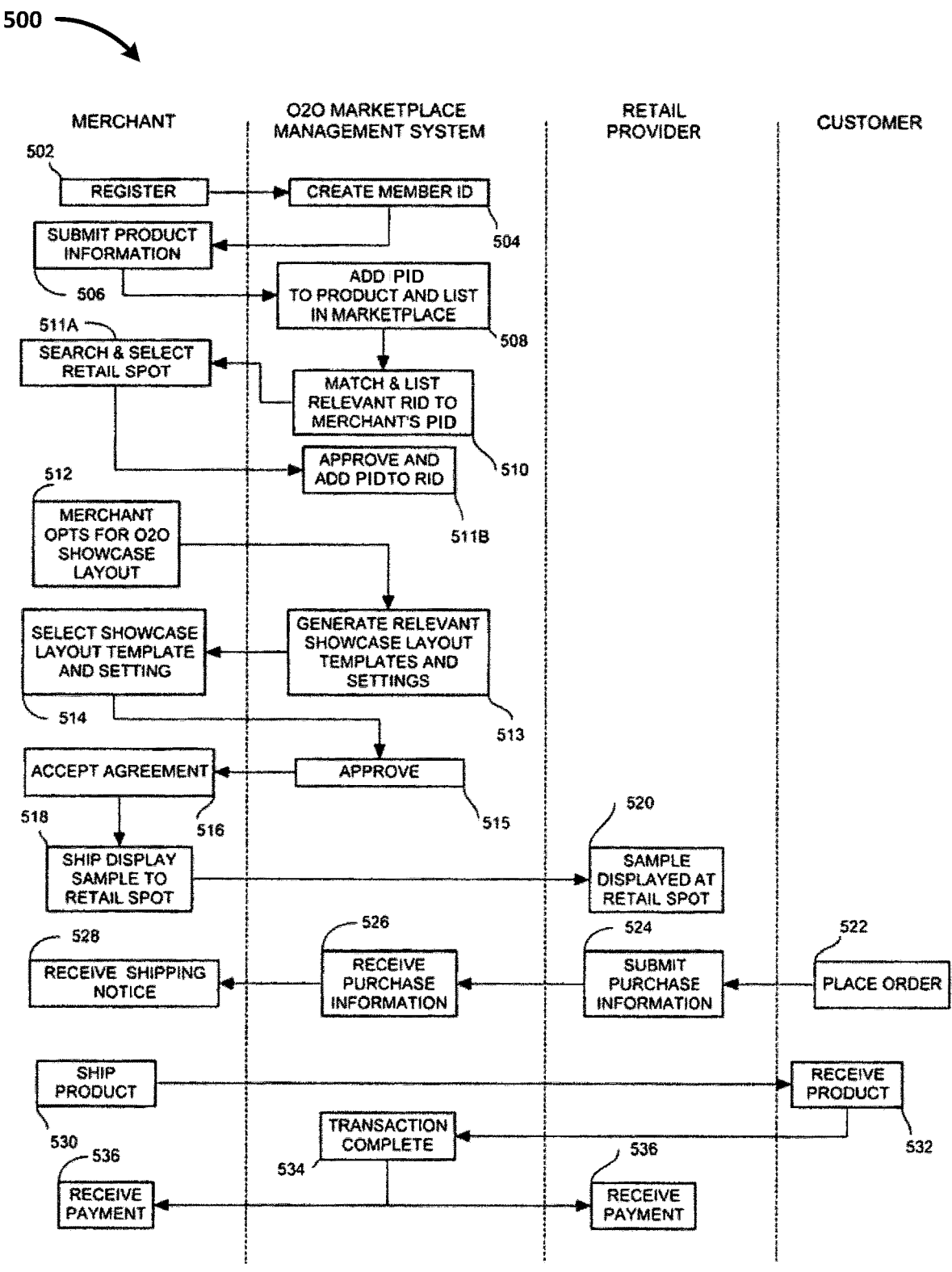
FIG. 5 is a flowchart that illustrates an exemplary process of a merchant selling their own product using an exemplary O2O Management System at an exemplary selected retail spot.

FIG. 5 is a flowchart that illustrates an exemplary process of a merchant selling their own product using an exemplary O2O Management System at an exemplary selected retail spot. In the depicted exemplary method 500, a merchant 104 is also a product provider 102. A merchant 104 registers (step 502) their information with the O2O Management System marketplace (e.g., via communication module 114, such as by a website interface). Upon registration, a member ID is issued (step 504) and the merchant 104 proceeds to add new product(s) to the O2O Management System 116 (step 506). The product information may include, by way of example and not limitation, product images, description, model number, universal product code (UPC), size, weight, cost, manufacturer name, suggested retail price (MSRP), shipping cost, or some combination thereof. The O2O Management System 116 assigns a PID for each product listed on the marketplace website (step 508).

The O2O Management System 116 may, for example, match the PID with a list of relevant RIDs (e.g., in the database 120). The matching process may, for example, be based on comparison of attributes of the retail spot and merchant's product carried out by a computer software algorithm of the O2O Management System 116 (step 510). As an exemplary illustration, a product may have the following attributes: category: plush toy, dimension (length×wide×height): 8"×5"×6", weight: 1 lbs, preferred sales region: Texas, preferred lease terms: less than 1 year. The product may be matched to at least one retail spot in Dallas, Texas with retail spot attributes including category: baby toys, showcase dimension (length×width×height): 9"×9"×9", maximum weight 3 lbs, lease term of six months. In various embodiments, for example, various attributes, such as disclosed elsewhere herein (e.g., with reference to product, showcase, sample, and/or retail spot attributes) may be compared.

Next, the merchant 104 proceeds to access the database(s) which listed the retail spots available (e.g., globally). After the merchant 104 selects a desired retail spot (step 511A), the O2O Management System 116 will review and validate the merchant's request and assign the selected retail spot to the merchant's selected product (e.g., by pairing the RID with the PID) (step 511B). In various embodiments, for example, one product may be assigned and linked to an unlimited number of retail spots.

Once the pairing is completed, the merchant 104 selects at least one showcase layout (e.g., as disclosed at least with reference to FIG. 4). If the selected showcase has never been setup at retail facility (e.g., open-space retail spot), for example, the merchant 104 may submit their own retail spot design setting to the O2O Management System 116 (not shown in FIG. 5). The merchant 104 may, for example, accept at least one standardized showcase template offered by the O2O Management System 116 (step 512). Based on the information received, O2O Management System 116 generates a list of relevant showcase layout templates (step 513) (e.g., as disclosed at least with reference to FIG. 4). The retail provider 106 may, for example, select and build (e.g., construct, deploy, install, setup, assemble) at least one showcase layout at the retail facility. When the showcase layout has been selected and finalized by the merchant 104 (step 514), the O2O Management System 116 will approve the selection (step 515). The O2O Management System 116 may, for example, generate an agreement for the merchant.

Once the merchant 104 accepts the agreement (step 516) and makes the payment to O2O, the paired RID and merchant's PID will be listed in the O2O Management System 116 marketplace (e.g., on a website). The O2O Management System 116 may, for example, conduct retail spot design layout checking from time to time (e.g., by image analysis such as disclosed at least with reference to FIG. 3). The layout verification process may include, by way of example and not limitation, image submission by the member(s) and/or manual inspection of the retail facility by authorized personnel. Once the showcase is ready, the merchant 104 ships the sample to the location of the retail spot (step 518) and the sample is displayed at the showcase (step 520). In some embodiments the O2O Management System 116 may, for example, handle the sample shipping process on behalf of merchant. In this case, the samples may, for example, be stored at one or more O2O Management System 116 designated warehouse 108 and shipped out by the O2O Management System 116. If there is more than one merchant 104 competing for a single retail spot, the allocation of retail spot can be done, for example, by arbitrary process and/or auction system (e.g., by the O2O Management System 116).

When a customer purchases an item (step 522), the purchase information and payment are submitted by the retail provider 106 (step 524) to the O2O Management System 116. Upon receiving the purchase information (step 526), the O2O Management System 116 informs the merchant 104 (step 528) and the merchant 104 ships out the products to the designated address (step 530). The merchant 104 may, for example, receive notification stating, for example, the number of items sold (e.g., via email and/or in their business account). When the customer receives the product (step 532), the sales transaction is completed (step 534). The monetary transaction may, for example, be managed by the O2O management system (e.g., as disclosed at least with reference to FIG. 4)

Figure 6:
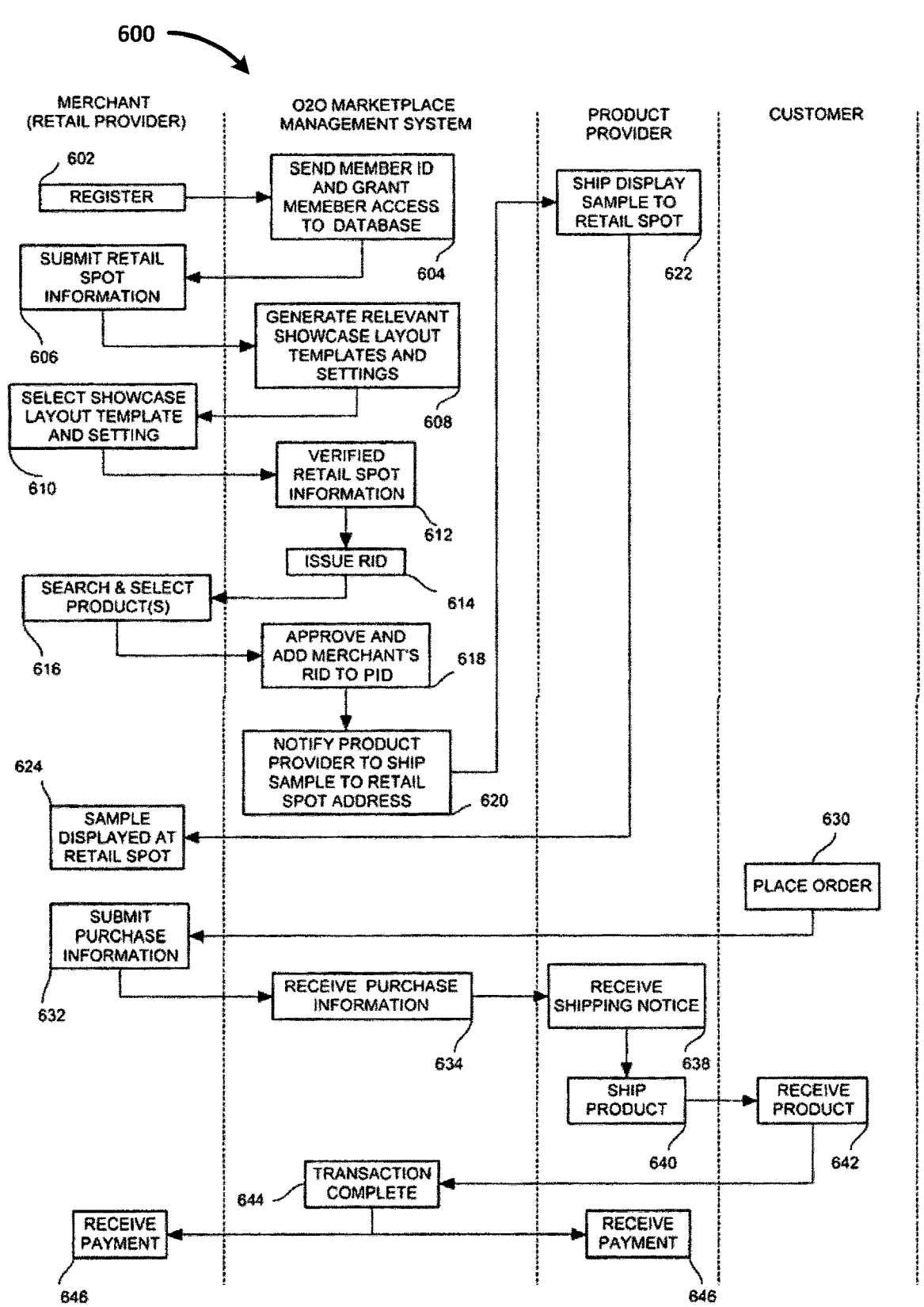
FIG. 6 is a flowchart that illustrates an exemplary merchant setup process at a retail spot at a retail facility via an exemplary O2O Management System.

FIG. 6 is a flowchart that illustrates an exemplary merchant setup process at a retail spot at a retail facility via an exemplary O2O Management System. In the depicted exemplary method 600, the merchant 104 is also a retail provider 106. A merchant 104 registers (step 602) their information with the O2O Management System 116. Upon registration, the merchant 104 receives a member ID (step 604). The merchant 104 submits the retail spot information to the O2O Management System 116 (step 606). Based on the information received, the O2O Management System 116 generates a list of relevant showcase layout templates (step 608) for the merchant 104 to select and build at retail facility (step 610). The merchant 104 may, for example, have the option to submit their own showcase design setting to O2O Management System (e.g., if the retail spot has an open-space attribute). In various embodiments the O2O Management System 116 can further construct, build, ship, and/or set up the physical showcase for the merchant at the designated retail facility.

Once the O2O Management System 116 verifies the retail spot information is in compliance with the setup guidelines (step 612), a RID will be issued (step 614) and the notice of confirmation will be sent to the merchant. In various embodiments the sequence of issuing the RID and showcase setup may be altered. Once the retail spot has been listed, it is made searchable on the O2O Management System 116 marketplace (e.g., via the communication module 114 such as by a website). Next, the merchant 104 selects the desired product at the O2O Management System (step 616). The O2O Management System 116 matching procedure compares the attributes of the retail spot (e.g., associated with the RID) with the attributes of one or more products (e.g., each associated with a PID). The matching algorithm retrieves a list of products that matches the retail spot attributes. The matching algorithm may, for example, locates one or more product providers available to drop-ship the product to the merchant's customers.

Once the RID has been paired with at least one PID (step 618), the O2O Management System 116 informs the product provider 102 (step 620) to ship the sample to the address of the retail/spot (step 622). When the sample arrives at the retail facility, it is displayed by the merchant 104 at assigned retail spot (step 624). In some embodiments the merchant 104 may, for example, contact the product provider 102 and request a sample to be shipped to selected retail spot. The O2O Management System 116 may, for example, handle the sample shipping process on behalf of the merchant. In this case, the samples may, for example, be stored at one or more O2O Management System designated warehouse 108 and shipped out in response to an electronic message(s) from the O2O Management System 116.

Once committed to the O2O Management System 116, the merchant 104 is obligated to fulfill retail services (e.g., on a regular basis) until the contract is expired. When a customer purchases at item (step 630), the purchase information and payment are submitted by the merchant 104 (step 632) to the O2O Management System 116. Upon receiving the purchase information (step 634), the O2O Management System 116 will send a shipping notice to the product provider 102 (step 638) and the product provider 102 proceeds to ship out the products to the designated address (step 640). When the customer receives the product (step 642), the sales transaction is completed (step 644). The monetary transaction may, for example, be managed by the O2O management system 116. The O2O Management System 116 issues the payment to the merchant 104 and the product provider 102 (step 646).

FIG. 7 is a flowchart that illustrates the sample shipping service offered and handled by O2O Management System. In the depicted exemplary method 700, a member accesses (step 702) the O2O Management System 116 (e.g., by logging in to a user control panel, such as via the communication module 114). The member selects a product (step 704). When the associated PID has been selected, the member proceeds to select the target retail spot (step 705). In various embodiments, for example, more than one retail spot may be selected.

Next, the member configures one or more attributes associated with the sample (step 706). The attributes may, for example, be stored in one or more sample attribute profile (SAP). The SAP(s) may, for example, be associated with the PID, the SID, the RID, the merchant ID, or some combination thereof. Attributes of the SAP may, by way of example and not limitation, include quantity per shipment, date for a sample to be shipped, delivery method, sample mode (e.g., one time, recurring, schedule), or some combination thereof.

Once the setting and configuration has been completed, the O2O Management System 116 sends the warehouse address (step 708) to the member. The member proceeds to ship the sample(s) (step 710) to its designated warehouse. The O2O Management System 116 is informed when the warehouse 108 receives the product(s) (step 712). At this stage, the sample handling service is ready (step 713), and a notification is sent out to the member by the O2O Management System 116 (step 714). When a sample shipment trigger (e.g., generated in response to one or more attributes of the SAP and/or defined by the SAP) is activated (step 750), the O2O Management System 116 sends notification to the warehouse 108. The sample shipment trigger may, for example, be a predefined date and/or schedule (as shown in the depicted exemplary method 700). The warehouse 108 ships out the sample to the address of the retail facility (step 752). The sample arrives at the retail facility and is displayed by retail the retail provider 106 at the assigned retail spot (step 754).

Figure 8:
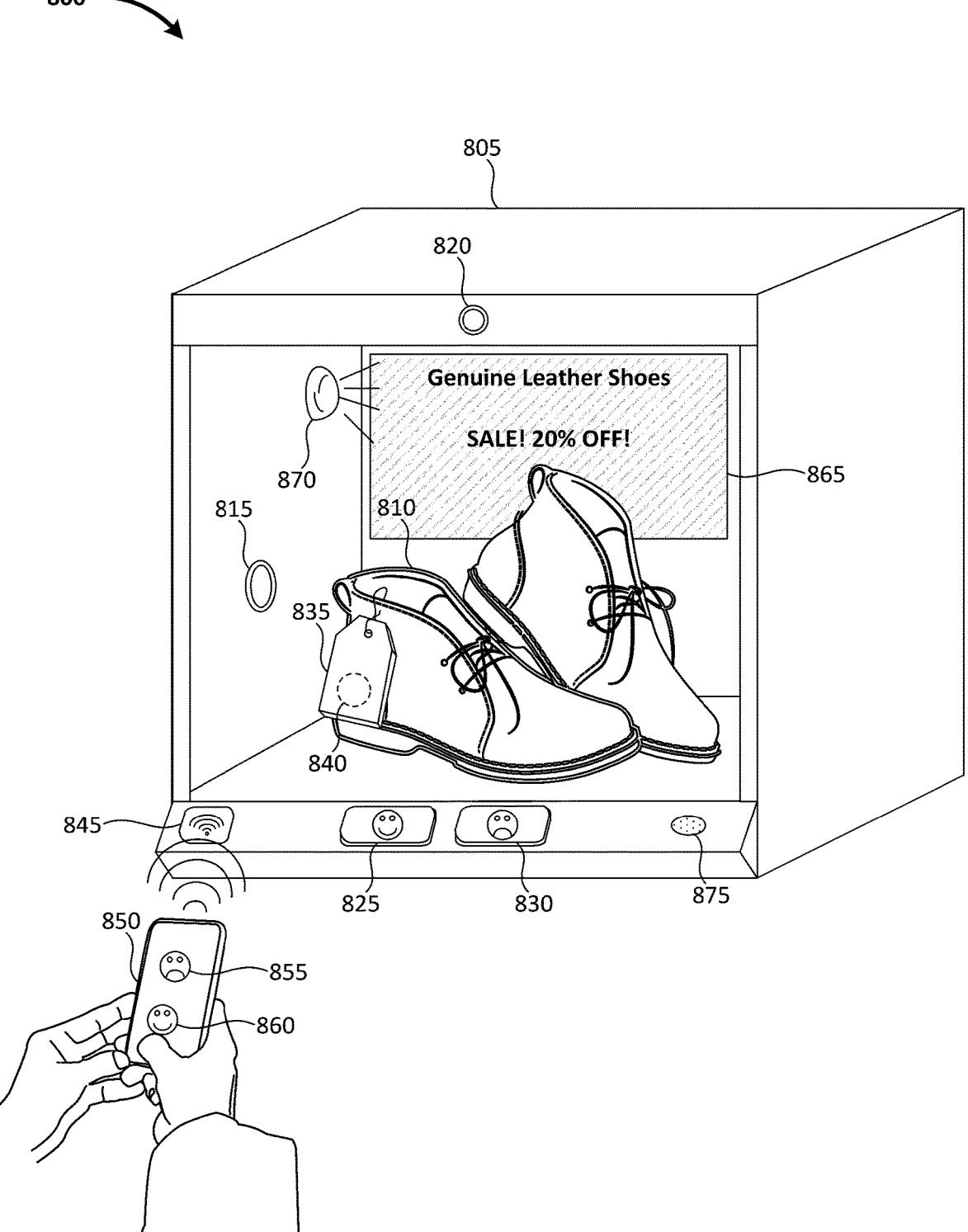
FIG. 8 depicts an exemplary product sample displaying in an exemplary showcase at an exemplary retail spot.

FIG. 8 depicts an exemplary product sample displaying in an exemplary showcase at an exemplary retail spot. In the depicted exemplary use case scenario 800, a product showcase 805 is provided in an exemplary retail location. A product sample 810 is disposed in the product showcase 805. As depicted, the product sample 810 is a pair of shoes. In various embodiments the product sample may, by way of example and not limitation, be an actual product sample (as depicted), a flyer, advertisement, video, miniaturized product representation, or some combination thereof.

In the depicted example, the product showcase 805 is provided with a first sensor 815. The first sensor 815 may, for example, include a proximity sensor. The proximity sensor may, for example, be configured to detect presence of the product sample 810. The proximity sensor may, for example, be configured to detect presence of another object (e.g., a customer's hand). The first sensor 815 may, for example, include a motion sensor. The motion sensor may, for example, be configured to detect motion of the product sample 810 and/or other object(s) (e.g., a customer's hand). The first sensor 815 may, for example, include an optical sensor (e.g., an image capture device such as an imaging sensor). The optical sensor may, for example, capture an image of the product sample 810, the product showcase 805, and/or other object(s) (e.g., a customer's hand). In various embodiments the first sensor 815 may be configured to capture information indicative of sample quality, showcase quality, user interaction with the product showcase 805 and/or the product sample 810, or some combination thereof.

The product showcase 805 is further provided, in the depicted example, with a second sensor 820. The second sensor 820 may, for example, include a motion sensor, proximity sensor, optical sensor, or some combination thereof. The second sensor 820 may, for example, be configured to capture information (e.g., motion, proximity, imagery) regarding a customer's interaction with the product showcase 805 and/or the product sample 810. For example, the second sensor 820 may capture information regarding a face of a customer. The second sensor 820 may, for example, capture information regarding motion of a customer (e.g., passing by the product showcase 805, approaching the product showcase 805). The second sensor 820 may, for example, capture gestures of a customer. The second sensor 820 may, for example, capture information regarding a gaze of a customer (e.g., relative to the product sample 810 and/or the product showcase 805).

The product showcase 805 is further provided with a first input member 825 and a second input member 830. As depicted, the first input member 825 indicates positive sentiment ('smiling' face) regarding the product sample 810 and/or the product showcase 805, and the second input member 830 indicates negative sentiment ('frowning' face). The first input member 825 and/or the second input member 830 may, for example, be configured to elicit and/or receive customer input regarding a reaction of the customer to the product showcase 805 and/or the product sample 810.

The product sample 810 is provided with a marking element 835. The marking element 835 may, for example, be a product tag. The marking element may, for example, display product information (e.g., price, PID, UPC code, QR code, barcode, description, attributes such as size and/or color) to a customer. In the depicted example, the marking element 835 is provided with a remote communication element 840. The remote communication element 840 may, by way of example and not limitation, include a radiofrequency ID (RFID) circuit, a near frequency wireless telecommunication circuit (e.g., Bluetooth), or some combination thereof. The remote communication element 840 may, for example, be configured to interact with a sensor in the product showcase 805 and/or a (portable) device of a user (e.g., customer, staff). In some embodiments, for example, the first sensor 815 may include an RFID reader. The RFID reader may interact with the remote communication element 840 to determine a PID and/or (unique) SID of the product showcase 805 when the product sample 810 is present in the product showcase 805. Removal of the product sample 810 from the product showcase 805 may induce the first sensor 815 to generate a corresponding signal(s). Disposal of the product sample 810 into the product showcase 805 may, for example, induce the first sensor 815 to generate a corresponding signal(s). Accordingly, in various embodiments, for example, signal(s) may advantageously be generated in response to interaction of users (e.g., customers, staff) with the product showcase 805 and/or product sample 810.

The product showcase 805 is provided, in the depicted example, with a communication module 845. The communication module 845 may, for example, include a wireless communication circuit(s). The wireless communication circuit may, for example, be configured to interact with (portable) devices of users. For example, a mobile computing device 850 (e.g., smartphone, tablet, scanner) of a user may interact with the communication module 845. The mobile computing device 850 may, for example, receive a PID, SID, and/or RID via the communication module 845. The mobile computing device 850 may, for example, communicate with the O2O Management System 116 to receive further information related to the product, sample, and/or retail spot. The user may, for example, initiate a transaction. In the depicted example, the user is presented with a first dynamic input element 855 and a second dynamic input element 860 representing positive and negative sentiment, respectively. For example, the dynamic input elements may be generated on the mobile computing device 850 in response to the user scanning a QR code on the marking element 835 and/or the mobile computing device 850 interacting with the communication module 845. The dynamic input elements may prompt the user to indicate their reaction to the product showcase 805 and/or product sample 810. Accordingly, information regarding user interaction with and/or reaction to the product showcase 805 and/or product sample 810 may be advantageously collected.

The product showcase 805 is further provided with a display 865. The display 865 may, for example, be static (e.g., a label). The display 865 may, for example, be dynamic (e.g., an electronic display unit such as a display screen). The display 865 may, for example, be configured to (dynamically) present visual media (e.g., text, images, video). The display 865 may, for example, be configured to be operated in response to interaction with the product showcase 805 and/or product sample 810 (e.g., as determined via the first sensor 815, second sensor 820, first input member 825, second input member 830, communication module 845, or some combination thereof).

The product showcase 805 is further provided with an indicator module 870. The indicator module 870 may, for example, include at least one light emitter. The indicator module 870 may, for example, (as depicted) illuminate the display 865. The indicator module may, by way of example and not limitation, be operated in response to user input, such as disclosed at least with reference to the display 865.

The product showcase 805 is further provided with an audio module 875. The audio module 875 may, for example, be configured to emit (predetermined) audio and/or receive audio input. The audio module 875 may, for example, be operated in response to user input (e.g., as disclosed at least with reference to the display 865). The audio module 875 may, for example, be configured to detect user input (e.g., spoken speech, tones of interaction, audible motion).

Figure 9:
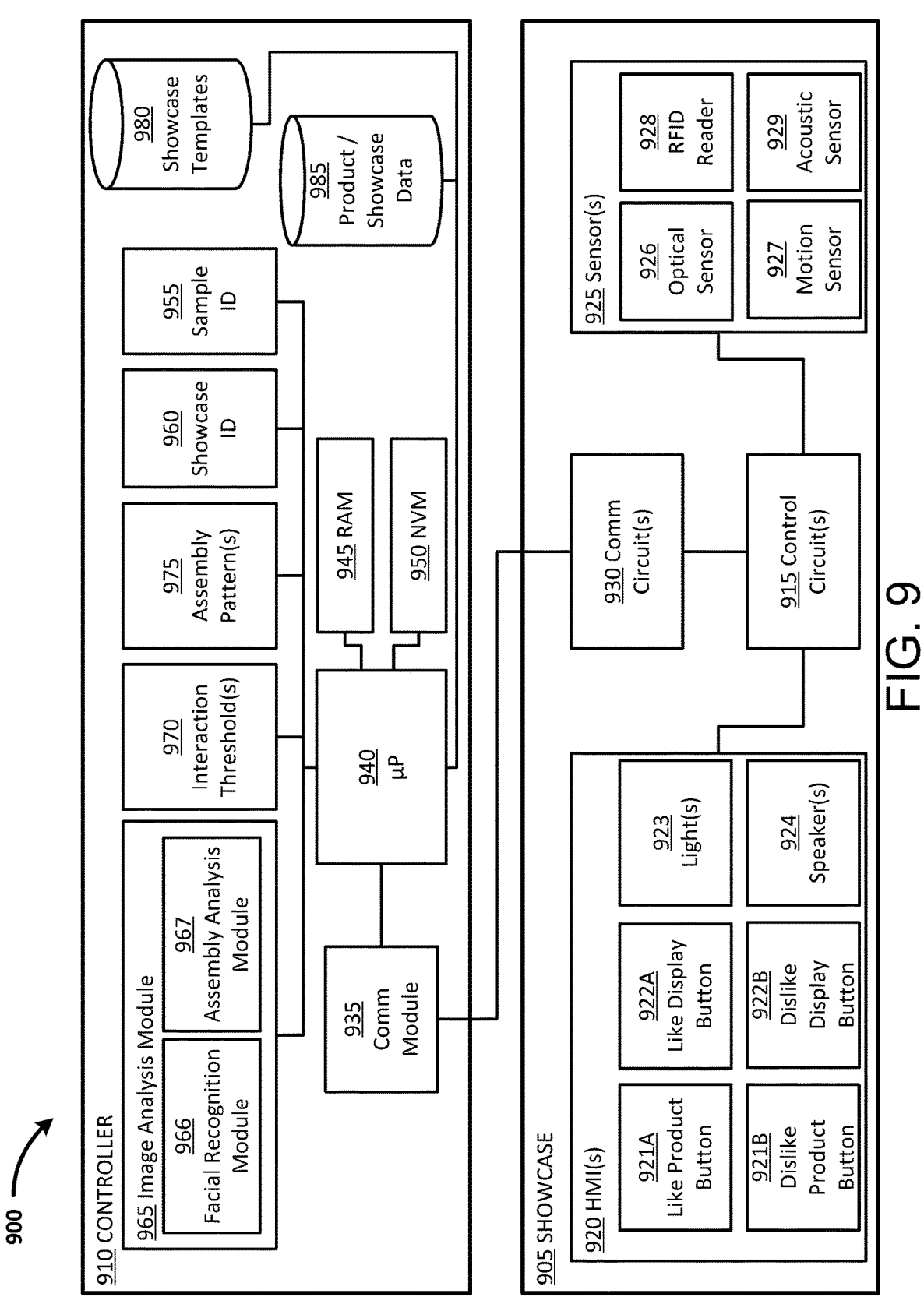
FIG. 9 is a block diagram depicting an exemplary O2O Management System configured to dynamically manage product sample quality.

FIG. 9 is a block diagram depicting an exemplary O2O Management System configured to dynamically manage product sample quality. In various embodiments the O2O Management System 116 may, for example, include an autonomous sample shipping process(es). From time to time, for example, a retail spot's sample may experience wear and tear, damage, and/or loss. When a showcase sample needs to be replaced, the O2O Management System 116 may ship out a new sample to the retail facility. This process can be done, for example, in response to a manual request. The process may, for example, be automatically initiated. The process may, for example, be automatically initiated based on a predetermined schedule (e.g., a specific time frame set by the member such as 30 days). The process may, for example, be automatically initiated based on incoming sample data, sales data, and/or interaction data compared to one or more sample thresholds (e.g., user predetermined, dynamically predetermined). The sample management may advantageously assure that the product sample displayed at retail spot remains fresh and attractive to customers.

In the depicted exemplary system 900, a showcase 905 is operably coupled to a controller 910. The showcase 905 may, for example, include at least part of the product showcase 805. The controller 910 may, by way of example and not limitation, include at least part of the O2O Management System 116. For example, the controller 910 may be at least partially embodied on at least one server remote from the showcase 905. In some embodiments the controller 910 may be in the retail facility. In some embodiments the controller 910 may be at least partially embodied in the showcase 905.

The showcase 905 includes a control circuit 915. The control circuit 915 may, for example, include one or more processors, random access memory modules, and/or non-volatile memory modules in operable communication with one another. The control circuit 915 is operably (e.g., electromagnetically, electrically, and/or mechanically) coupled to a human-machine interface module 920 (labeled "HMI" in FIG. 9). In the depicted example, the human-machine interface module 920 includes a like product button 921A, a dislike product button 921B, a like display button 922A, and a dislike display button 922B. In various embodiments the buttons 921A-922B may, for example, be embodied such as is disclosed at least with reference to first input member 825, second input member 830, first dynamic input element 855, and/or second dynamic input element 860 of FIG. 8. The human-machine interface module 920 includes a light module 923 (e.g., indicator module 870). The human-machine interface module 920 includes a speaker module 924 (e.g., audio module 875). In some embodiments the human-machine interface module 920 may not be limited to elements depicted in FIG. 9. In some embodiments, for example, the human-machine interface module 920 may include an app (e.g., operating on a smartphone). In some embodiments, by way of example and not limitation, the human-machine interface module 920 may not include physical buttons. In some embodiments, for example, the human-machine interface module 920 may not include elements requiring physical contact by a human. For example, some embodiments may include a wireless interface module (e.g., RFID, Bluetooth, Zigbee).

The control circuit 915 is further operably coupled to a sensor module 925. The sensor module 925 includes, in the depicted example, an optical sensor 926 (e.g., first sensor 815, second sensor 820). The sensor module 925 include a motion sensor 927 (e.g., first sensor 815, second sensor 820). The sensor module 925 includes an RFID reader 928 (e.g., first sensor 815). The sensor module 925 includes an acoustic sensor 929 (e.g., audio module 875).

The control circuit 915 is further operably coupled to at least one communication circuit 930. The at least one communication circuit 930 may, for example, provide wired and/or wireless communication between the controller 910 and the showcase 905. As depicted, the at least one communication circuit 930 is operably coupled to a communication module 935 of the controller 910.

The communication module 935 of the controller 910 is operably coupled to a processor 940 (e.g., one or more microprocessors, labeled "uP"). The processor 940 is operably coupled to a random-access memory module 945 (labeled "RAM"). The processor 940 is operably coupled to a non-volatile memory module 950 (labeled "NVM"). The non-volatile memory module 950 may, for example, contain one or more program of instructions that, when executed by the processor 940 cause operations to be performed to effect one or more methods disclosed herein. For example, the program(s) of instructions may monitor the showcase 905 and/or a sample therein and manage quality of the sample and/or the showcase based on the signals received from the showcase 905.

The processor 940 is operably coupled to a sample ID module 955. The sample ID module 955 may, for example, be embodied on a RAM and/or NVM module. The sample ID module 955 may contain a (unique) SID for the sample in the showcase 905.

The processor 940 is operably coupled to a showcase ID module 960. The showcase ID module 960 may, for example, be embodied on a RAM and/or NVM module. The showcase ID module 960 may contain a (unique) RID for the showcase 905.

In the depicted example, the processor 940 is operably coupled an image analysis module 965. The image analysis module 965 may, for example, be configured to operate on optical signals (e.g., captured images such as from the first sensor 815 and/or the second sensor 820). As depicted, the image analysis module 965 includes a facial recognition module 966. The facial recognition module 966 may, for example, be configured to detect human bodies and/or portions thereof (e.g., faces). The facial recognition module 966 may, for example, be configured to detect facial expressions. The facial recognition module 966 may, for example, be configured to determine eye gaze direction. Accordingly, user interaction with the sample and/or showcase may be advantageously determined.

As depicted, the image analysis module 965 includes an assembly analysis module 967. The assembly analysis module 967 may, for example, be configured to detect the product sample 810, the product showcase 805, and/or attributes thereof. The assembly analysis module 967 may, for example, be configured to detect geospatial attributes of a sample and/or showcase. Accordingly, (proper) assembly and/or display of a sample and/or showcase may be advantageously determined.

As depicted, the processor 940 is operably coupled to an interaction threshold module 970. The interaction threshold module 970 may, for example, be embodied on a RAM and/or NVM module. The interaction threshold module 970 may, for example, contain one or more thresholds and/or other criterion/criteria related to interactions of users with the showcase 905 and/or the associated sample.

As depicted, the processor 940 is operably coupled to an assembly pattern module 975. The assembly pattern module 975 may, for example, be embodied on a RAM and/or NVM module. The assembly pattern module 975 may, for example, contain one or more assembly patterns associated with the sample in the showcase 905. For example, an assembly pattern may contain one or more geospatial indicia related to proper assembly of the product. An assembly pattern may, by way of example and not limitation, include measurements. An assembly pattern may, for example, include patterns (e.g., geospatial patterns). An assembly pattern may, for example, include point clouds (e.g., in two- and/or three-dimensional space). An assembly pattern may, for example, include, contrast patterns. An assembly pattern may, for example, include CAD files. An assembly pattern may, for example, include three-dimensional and/or two-dimensional shapes. An assembly pattern may, for example, include image files (e.g., one or more image files, image sequences).

In the depicted example, the processor 940 is operably coupled to a showcase template datastore 980. The showcase template datastore may, for example, include one or more showcase templates. The showcase templates may, for example, be associated with the showcase 905 and/or the controller 910.

In the depicted example, the processor 940 is operably coupled to a product/showcase datastore 985. The product/showcase datastore 985 may, for example, include one or more data structures (e.g., files) associated with products, samples, showcases, or some combination thereof. For example, the product/showcase datastore 985 may include PID(s), RID(s), SID(s), associations therebetween, associated product data, associated retail spot data, associated sample data, or some combination thereof.

Figure 10:
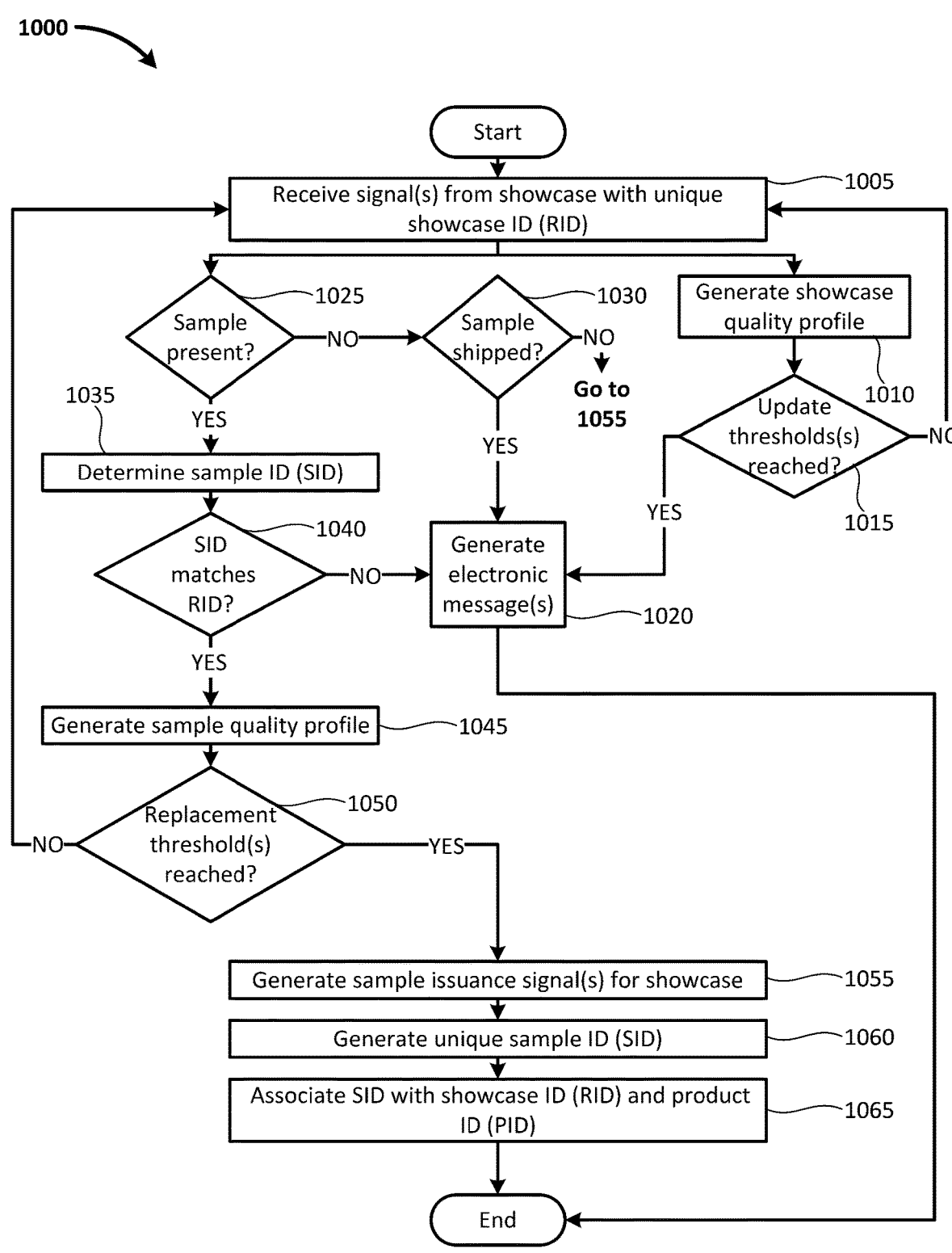
FIG. 10 is a flowchart depicting an exemplary process for dynamically managing product sample quality.

FIG. 10 is a flowchart depicting an exemplary process for dynamically managing product sample quality. In the depicted exemplary method 1000, the method begins in step 1005 when at least one signal is received from a showcase (e.g., product showcase 805, showcase 905) with a unique RID. The depicted exemplary method 1000 may, by way of example and not limitation, be configured to be performed by the controller 910 and/or the control circuit 915. The signal(s) may, for example, correspond to (input) signals from at least one input element (e.g., of human-machine interface module 920, sensor module 925, first input member 825, second input member 830, audio module 875, first sensor 815, second sensor 820, communication module 845, first dynamic input element 855, second dynamic input element 860). The signal(s) may, for example, correspond to interaction of one or more users with the showcase and/or a sample therein. The signal(s) may, for example, be real time, a digest (e.g., conglomerated reports), or some combination thereof. The showcase may, for example, generate and transmit (regular) data files to a controller.

In response to the signal(s) received in the step 1005, a showcase quality profile is generated in a step 1010. The showcase quality profile may, for example, include one or more metrics indicative of showcase quality generated as a function of the signal(s) received. For example, the showcase quality profile may be based off number of glances at the showcase, duration of gaze at the showcase, ratio of number of people who engaged the showcase with number of people who passed by the showcase, or some combination thereof. If one or more showcase update thresholds and/or other criteria are determined to be reached in a decision point 1015, then an electronic message is generated in a step 1020. The electronic message(s) may, for example, be provided to a merchant, product provider, warehouse, retail provider, or some combination thereof. If the threshold(s) and/or other criteria are determined not to be reached in the decision point 1015, then the method may, as depicted, return to the step 1005. In some embodiments, for example, the method may continue to progress down another branch regardless of a "NO" determination in the decision point 1015.

An update criterion may, for example, provide an objective indicia of acceptable quality of a showcase. The criterion may, for example, include a static threshold (e.g., minimum number of people who look at the showcase per unit time, minimum ratio of purchases to passersby per unit time). The criterion may, for example, include a dynamic threshold (e.g., minimum ratio of number of people who engaged the showcase in a first unit of time to people who engaged the showcase in a second (previous) unit of time). The criterion may, for example, include objective criterion (e.g., non-numeric) such as, for example, a (predetermined) image classification result (e.g., comparing at least one image of the showcase to images of showcases classified as acceptable and/or images of showcases classified as unacceptable).

In further response the signal(s) received in the step 1005, if a sample is determined to not be present in a decision point 1025, and if a (replacement) sample is determined to be shipped in a decision point 1030, then a corresponding electronic message(s) is generated in the step 1020. For example, the sample may be determined to be present based on a number of interactions (e.g., determined by motion, image analysis, audio analysis). The sample may be determined to be present based on proximity detection. The sample may be determined to be present based on RFID detection. The sample may be determined to be present based on image analysis. The sample may be determined to be present based on weight sensing.

The replacement sample may, for example, be determined to be shipped based on data received from the O2O Management System 116. If the replacement sample is not shipped, then the depicted exemplary method 1000 proceeds to a step 1055 (discussed hereafter).

If the sample is determined to be present in the decision point 1025, then the sample ID (SID) is determined in a step 1035. The SID may be determined, by way of example and not limitation, from image analysis, RFID signal, or some combination thereof. If the SID does not match the RID in a decision point 1040, then at least one corresponding electronic message is generated in the step 1020.

If the SID is determined to match the RID in the decision point 1040, then a sample quality profile is generated in a step 1045. The sample quality profile may, for example, include one or more metrics indicative of sample quality generated as a function of the signal(s) received. For example, the sample quality profile may be based off number of glances at the sample, duration of gaze at the sample, ratio of number of people who engaged the sample with number of people who passed by the sample, or some combination thereof.

If one or more sample replacement thresholds and/or other criteria are not determined to be reached in a decision point 1050, then the depicted exemplary method 1000 returns to the step 1005. A replacement criterion may, for example, provide an objective indicia of acceptable quality of a sample. The criterion may, for example, include a static threshold (e.g., minimum number of people who look at the sample per unit time, minimum ratio of purchases to passersby per unit time). The criterion may, for example, include a dynamic threshold (e.g., minimum ratio of number of people who engaged the sample in a first unit of time to people who engaged the sample in a second (previous) unit of time). The criterion may, for example, include objective criterion (e.g., non-numeric) such as, for example, a (predetermined) image classification result (e.g., comparing at least one image of the sample to images of samples classified as acceptable and/or images of samples classified as unacceptable).

If the replacement threshold is determined to be reached in the decision point 1050, then a sample issuance signal(s) is generated in a step 1055 (e.g., to a warehouse, merchant, and/or product provider). The sample issuance signal corresponds to the showcase represented by the RID. A (new) unique SID is generated for a new (replacement) sample in a step 1060. The new SID is then associated with the RID and the PID (of the previous SID) in a step 1065.

FIG. 11 is a flowchart depicting an exemplary process for registration of a product sample at a particular showcase. In a depicted exemplary method 1100, a showcase registration signal(s) is received in a step 1105. The signal(s) may, for example, be received from the retail provider 106. In response to the signal(s) received in the step 1105, a unique RID is generated in a step 1110. The RID is then associated with an available status in a step 1115. If an RID is not matched to a PID in a decision point 1120 (e.g., as disclosed at least with reference to FIG. 4), then the depicted exemplary method 1100 returns to the step 1115.

If the RID is matched to a PID in the decision point 1120, then an SID is generated in a step 1125. The SID is associated with the PID and the RID (e.g., in the database 120, the product/showcase datastore 985). An SID shipping signal(s) is then generated in a step 1130 (e.g., for a warehouse, merchant, product provider).

An update signal(s) is received in a step 1135. The update signal(s) are associated with the SID and a displayed showcase ID (RID2). The displayed showcase ID corresponds to a physical showcase at which the sample identified by the SID is displayed. The signals(s) may, for example, be transmitted by a showcase (e.g., product showcase 805, showcase 905 such as by the control circuit 915 via the at least one communication circuit 930), by the retail facility, or some combination thereof. The signal may, for example, be automatically transmitted by a showcase in response to detection of a product in the showcase. The signal may, for example, be transmitted in response to detection of a (new) SID in the showcase.

If the RID2 is determined not to correspond to the RID (e.g., they are not the same) in a decision point 1140, then at least one electronic message is generated in a step 1145. The message(s) may, for example, be provided to a merchant, warehouse, retail provider, and/or product provider. The message may, for example, be configured to prompt delivery of the sample to the intended showcase, removal of the sample from the showcase, update of the records (e.g., corresponding the SID to the RID2 such as if the sample is approved to remain at the unintended showcase), shipment of a sample to the intended showcase, or some combination thereof.

If the RID2 is determined to correspond to the RID (e.g., they are the same) in the decision point 1140, then the SID is updated (e.g., in the database 120, in the product/showcase datastore 985) in a step 1150 to confirm the association of the SID with the RID. Accordingly, actual display of the sample in the intended showcase may, for example, be advantageously confirmed.

In some embodiments the signal(s) may further include at least one indication of assembly of the sample. The signal(s) may, for example, include image data of the product. Image analysis may, for example, be performed to determine if the sample is correctly displayed (e.g., according to a product display profile and/or showcase attribute profile). The image analysis may, for example, compare a sequence of images (e.g., at different angles) of the sample to a point cloud and/or sequence of images of a correctly assembled product. The images may, for example, be provided by the retail provider and/or automatically captured and/or transmitted by the showcase. A controller may, for example, notify a merchant, retail provider, and/or product provider associated with the SID (e.g., via an associated PID and/or RID) if the sample may not be correctly assembled and/or displayed. For example, the analysis may generate a confidence interval in correct assembly and/or display. If the confidence level is below a (predetermined) threshold, then a warning notification may, for example, be generated. Accordingly, proper display and/or assembly of the sample may be automatically monitored. Such embodiments may, for example, advantageously reduce time and/or manual input needed to monitor sample display and/or assembly.

FIG. 12 is a flowchart depicting an exemplary process for evaluation of a physical showcase based on a predetermined showcase layout template. A method 1200 may, by way of example and not limitation, be performed by at least one controller (e.g., processor 940, control circuit 915) according to a predetermined program(s) of instructions. In the method 1200, a signal is received, in a step 1205. The signal corresponds to a present condition of a showcase. The showcase may, as depicted, be identified by a showcase ID (RID). The signal may, by way of example and not limitation, include optical data. For example, the signal may include image data (e.g., video, still image(s)). In some embodiments the signal may include geometric data. For example, the signal may include at least one point cloud. In some embodiments the signal may include optical intensities. In some embodiments the signal may include ultrasonic data corresponding to distance. In various embodiments the signal may, for example, include a multi-dimensional (e.g., 2D, 3D) representation of a current state of the showcase.

In a step 1210, a predetermined showcase layout template (SLT) is retrieved, the SLT corresponding to the RID. For example, the SLT may be retrieved in response to receiving the signal in the step 1205. The SLT may, for example, be retrieved based on at least one database correlating the SLT to the RID.

In a decision point 1215, if the showcase is determined not to match the SLT, then an electronic message is generated in a step 1220 and the method 1200 proceeds to a step 1225. For example, the showcase may be determined not to match the SLT based on a comparison of the signal to the SLT. The SLT may, for example, define certain predetermined dimensions. The predetermined dimensions may, for example, correspond to a presence and/or position of one or more products in the showcase. In some embodiments the SLT may, for example, define a visual appearance of the showcase. A display may, for example, be generated based on the SLT and the signal. The display may, for example, be presented to a user. A user may be prompted to provide an input indicating if a current state of the showcase as represented on the display in response to the signal matches a predetermined configuration of the showcase as represented on the display in response to the SLT. In some embodiments, image analysis (e.g., object recognition, Fourier transform) may be applied to the signal. A result of the image recognition may, for example, be compared to the SLT (e.g., an image analysis on the SLT, a predetermined image analysis result defined by the SLT).

The electronic message may, for example, be configured to generate a display corresponding to a prompt for action to a user to restore the showcase to matching the SLT. In some embodiments the electronic message may be configured to generate a display comparing the SLT and the current state of the display (e.g., based off of the signal). In some embodiments the electronic message may, for example, be configured to generate a visual indication of a non-compliant portion(s) of the showcase (e.g., based off of a comparison of the signal to the SLT).

Accordingly, the electronic message(s) may indicate that the showcase itself is unacceptable. For example, damage may have occurred to the physical showcase. A component of the showcase may, for example, have quit working (e.g., light bulb, electronic display unit). The electronic message(s) may, for example, indicate a portion of the showcase detected as not matching with the SLT.

If it is determined in the decision point 1215 that the showcase (in its current state as represented by the signal received in the step 1205) matches the SLT, the method 1200 proceeds directly to the step 1225.

An SID(s) is retrieved in the step 1225. The SID may be retrieved based on an association of the RID with the SID. For example, the SID may be associated with a specific sample currently displayed and/or intended for display in the showcase identified by the RID. As depicted, a sample quality profile(s) (SQP(s)) associated with the SID(s) is retrieved. An SQP associated with the SID may, for example, define one or more attributes associated with the SID. For example, the SQP may define location of the sample within the showcase. The SQP may, for example, define one or more quality attributes (e.g., visual condition).

If it is determined, in a decision point 1230, that the sample does not match the SQP(s), then at least one electronic message is generated in a step 1235 and the method 1200 proceeds to a decision point 1240. The electronic message(s) may, for example, be configured to generate a notice to one or more responsible parties (e.g., retail facility manager, merchant, retail facility staff). For example, it may be detected that the sample associated with the SID is disarranged within the showcase. A child may, for example, have inspected the sample and returned it to the showcase in an orientation not suitable for display (e.g., sideways, lying down). The electronic message may, for example, include an indication (e.g., visual) of the current state of the sample (e.g., based on the signal) and/or the (predetermined) acceptable state of the sample (e.g., based on the SQP(s)).

If it is determined, in the decision point 1230, that the sample does match the SQP(s), then the method 1200 proceeds directly to the decision point 1240.

If it is determined in the decision point 1240 that a foreign object is not detected in the showcase, then an electronic message is generated in a step 1245 and the method 1200 ends. For example, if a sample and does not match the SQP(s), then the electronic message may be configured to generate a corresponding display(s). If a sample is not present, the electronic message may, by way of example and not limitation, be configured to generate a corresponding display(s).

As an exemplary illustration, a shopper may have set down a beverage in the showcase to inspect a sample. The shopper may, for example, have forgotten to retrieve the beverage. The beverage may, for example, be partially consumed and so may repel other shoppers and/or be unsightly and/or unsanitary. As an exemplary illustration, a shopper may have picked up a first sample from a first showcase to inspect. The shopper may, for example, have compared it to a second sample in a second showcase. The shopper may, for example, have forgotten which sample went in which showcase, and have left the first sample in the second showcase.

If it is determined, in the decision point 1240, that a foreign object is in the showcase, then the method 1200 proceeds to a decision point 1250. For example, the signal (received in the step 1205) may correspond to a foreign object being present. As an exemplary illustration, image analysis may detect an object currently present in the showcase which does not correspond to a sample. Samples which should be in the showcase may, for example, be associated with the RID and/or defined by the SLT.

For example, in the exemplary illustration with the forgotten beverage, it may be determined in the decision point 1240 that a foreign object (e.g., not corresponding to an SLT and/or SQP associated with the RID and/or associated SID(s)) is in the showcase. It may be determined in the decision point 1250 that no SID is detected corresponding to the foreign object. Accordingly, an electronic message may be generated in a step 1245. The electronic message(s) may, for example, be configured to generate a display including an indication of a foreign object and an identification of the showcase. In some embodiments the display may include a visual indication of the foreign object (e.g., picture, video).

In the exemplary illustration of the misplaced sampled, it may be determined in the decision point 1240 that a foreign object is in the showcase. It may be determined in the decision point 1250 that an SID corresponding to the foreign object is detected (e.g., by image recognition, by QR code recognition, by barcode recognition, by RFID recognition).

When an SID is determined to be detected in the decision point 1250, then a second RID (RID2) associated with that SID is retrieved in a step 1255. A message is generated, in a step 1260. The message may, for example, include the SID, the RID, the RID2, or some combination thereof. For example, the message may be configured to generate a display to a user indicating a current location of the misplaced sample (in the showcase corresponding to the RID). The display may include an intended location of the sample (e.g., in the showcase corresponding to the RID2). The display may, for example, include an image of the showcases (s) and/or the samples. The display may, for example, include a map indicating a position of the sample corresponding to the SID1, the showcase corresponding to the RID, the showcase corresponding to the RID2, or some combination thereof.

Various embodiments may advantageously enable (automatic) maintenance of a physical showcase(s) and/or associated sample(s) according to one or more predetermined data structures (e.g., SLT, SQP). Various embodiments may advantageously reduce staff time and/or mistakes associated with locating misplaced samples, misarranged samples, degraded showcases, and/or foreign objects. Various embodiments may advantageously improve shopper experience, such as by enabling a more consistent showcase and/or sample quality to be maintained.

In some embodiments, a sample may be determined to be missing (e.g., by one or more of steps 1205-1230) from an associated showcase. Some such embodiments may, by way of example and not limitation, cause a signal(s) to be generated, in response to detecting the missing sample. The signal(s) may be configured to cause other showcases to be evaluated for a foreign object (e.g., surrounding showcases, all showcases in the store). Some embodiments may, for example, provide for a progressive search of surrounding showcases at ever-increasing distances. A current state of the showcases may, for example, be automatically determined (e.g., by image capture and analysis, distance measurement, proximity detection, RFID detection, near-field communication (NFC)), such as be at least some portion of the method 1200. If the sample is discovered in another showcase, a message(s) may be generated (e.g., as disclosed at least with reference to steps 1255-1260) to alert appropriate personnel of the misplaced item. Accordingly, various embodiments may advantageously (automatically) augment and/or conduct a search for a missing sample. In some embodiments, non-showcase locations may be included in the search. For example, image feed may be analyzed from security cameras (e.g., of halls, checkout counter, warehouse, break room). Accordingly, such embodiments may advantageously assist in locating a missing sample in a non-showcase location.

Figure 13:
FIG. 13 depicts an exemplary dynamic interface for a user to configure a product with respect to at least one showcase layout and/or physical showcase.

FIG. 13 depicts an exemplary dynamic interface for a user to configure a product with respect to at least one showcase layout and/or physical showcase. In an exemplary scenario 1300, a display 1305 is operated to generate a dynamic interface. As depicted, the display 1305 is currently displaying a first showcase layout 1315. The first showcase layout includes display of multiple products. In the depicted example, the first showcase layout 1315 is configured around a common product (shoes).

In this exemplary illustration, a merchant may, for example, have configured a sample of a hiking boot 1310 to be displayed in a showcase with a pair of dress shoes 1320. In the depicted example, the hiking boot 1310 was configured to be displayed in a sub-showcase above the dress shoes 1320. In some embodiments the first showcase layout 1315 may, for example, represent a shared showcase. In some embodiments, each distinct product space may correspond to an individual showcase. The first showcase layout 1315 may, for example, display surrounding showcase(s) to the user for context. The surrounding showcase(s) may, for example, not be editable by the user first showcase layout 1315 unless the user is the owner of the showcases.

A lower display region (e.g., sub-showcase) is configured to display the pair of dress shoes 1320. For example, the dress shoes 1320 may correspond to the product sample 810 as depicted with respect to FIG. 8. The dress shoes 1320 may, for example, be configured by a merchant to be displayed in a showcase such as product showcase 805 as disclosed at least with reference to FIG. 8.

The merchant of the hiking boot 1310 may, for example, desire to move, or additionally place, a sample in another showcase. For example, the merchant may wish to display the hiking boot 1310 sample with products related to a similar activity. In the depicted example, a shared showcase 1325 is configured around a theme (camping). The shared showcase 1325 may be displayed based on an availability of a retail display space 1330 for product display. The shared showcase 1325 may, for example, be displayed based on a theme (e.g., selected by a user, automatically suggested based on product attributes) associated with the product. For example, a machine learning model may be applied to the hiking boot 1310. The machine learning model may determine that the hiking boot 1310 is associated with a hiking activity attribute. The machine learning model may determine that hiking has a strong association (e.g., high confidence interval) associated with camping. A controller may select the 1325 based on the presence of other products associated with camping and the availability of the retail display space 1330. As depicted, a showcase layout of the shared showcase 1325 already includes a backpack 1335 and a tent 1340.

If the user determines to display the hiking boot 1310 in the retail display space 1330, then the user may operate an input mechanism (e.g., represented on screen by a hand icon 1345). The user may, for example, select the hiking boot 1310. A navigation interface icon 1350 may appear, as depicted in the exemplary scenario 1300. The user may, for example, interact with the navigation interface icon 1350 to move the hiking boot 1310 between showcase layouts and/or to arrange the hiking boot 1310 within a showcase layout. For example, the user may move the hiking boot 1310 from the first showcase layout 1315 to the retail display space 1330. In another example, the user may 'copy' the hiking boot 1310 to the retail display space 1330 (corresponding, for example, to placing the hiking boot 1310 in an additional retail display location). The user may, for example, operate the navigation interface icon 1350 to rotate the hiking boot 1310 into a desired orientation for display.

The user may input a signal(s) (e.g., by an input element(s) such as a virtual button, not shown) associated with completion of placing and/or arranging the hiking boot 1310. A showcase layout may be generated and stored corresponding to the new display location and/or arrangement. In some embodiments, sample shipment may be initiated to a new retail facility (e.g., as disclosed at least with reference to FIGS. 10-11). In some embodiments, an electronic message(s) may be generated and transmitted to a retail facility to effect the placement and/or re-arrangement of the corresponding sample(s).

FIG. 14 is a flowchart depicting an exemplary process for configuring a product in a shared showcase. A method 1400 may, by way of example and not limitation, be performed by at least one controller (e.g., processor 940, control circuit 915) according to a predetermined program(s) of instructions. In the method 1400, a signal is received in a step 1405. The signal may include, as depicted, a product ID (PID). The signal may correspond to a request for an available shared showcase. For example, the signal may be received in response to input from a user requesting available shared showcases for a specific product, such as disclosed at least with reference to FIG. 13.

One or more available shared showcases are determined in a step 1410. Available shared showcases may, for example, be determined based on one or more attributes of the PID. Available shared showcases may, for example, be determined based on one or more attributes of the showcases. In various embodiments available shared showcases may, for example, be determined based on application of one or more machine learning models to the product data (e.g., retrieved based on the PID) and/or showcases with available display space. The available shared showcases may be displayed to the user. In some embodiments and available shared showcase may be automatically selected. For example, the showcase may be automatically selected based on predetermined attributes set by the user. The showcase may be automatically select based on a confidence interval (e.g., maximum) of matching between the product attributes and the showcase attributes. The automatically selected showcase(s) may, for example, be displayed to the user for confirmation.

An indication of a selected showcase (e.g., selection, confirmation of suggestion) is received from the user in a step 1415. The indication may, for example, be received in response to a prompt from an (interactive) display generated and presented to the user in the step 1410. The signal may correspond to an RID of the selected showcase.

A predetermined showcase layout template (SLT) is retrieved based on the RID in a step 1420. For example, the SLT may be determined by an 'owner' of the SLT. The owner of the SLT may, for example, be a primary merchant in the showcase. For example, the owner of the SLT may have contacted for the entire showcase and may sublease portions of the showcase to other vendors. In some embodiments the SLT may be (pre) determined by consensus between multiple merchants and/or the actual owner of the physical showcase.

A display of the showcase is generated, in a step 1425, including an indication of one or more location(s) available for the proposed product(s). For example, in the exemplary scenario 1300 as disclosed at least with reference to FIG. 13, the display 1305 may be generated including an indication that the shared showcase 1325 has a retail display space 1330 available as a proposed location for the hiking boot 1310. In some embodiments, a proposed arrangement of the product being placed may be automatically generated and proposed. For example, an automatic (e.g., machine learning) process may determine one or more suggested arrangements of the product(s) in the available space. In some embodiments the automatic process may be applied to the product attributes, display preferences of the merchant, attributes of the showcase, display preferences of other merchants in the showcase, display preference of the owner of the physical showcase, or some combination thereof. In some embodiments the automatic process may be applied to historical customer behavior (e.g., for the showcase, for the product).

User input is received in a step 1430. In some embodiments, a visual display of the showcase, the product, currently displayed products in the shared showcase, or some combination thereof, may be presented to the user. In some embodiments the visual display may be presented as an interactive display. For example, the user may be able to manipulate a visual representation of the product(s) being placed in the visual representation of the available showcase.

If it is determined, in a decision point 1435, that the product will not be placed in the showcase, then the method 1400 returns to the step 1415 (e.g., the user may select a different available showcase to evaluate).

If it is determined, in the decision point 1435, that the product will be placed in the showcase, then an updated display of the showcase is generated in a step 1440. The display, in the depicted example, includes a display of the product in the indicated location. For example, in the exemplary scenario 1300 disclosed at least with reference to FIG. 13, the hiking boot 1310 may be depicted in the retail display space 1330.

If it is determined in a decision point 1445 that the product display (e.g., location, arrangement) is not accepted, then the method 1400 returns to the step 1430 to receive further user input. For example, input may be received corresponding to repositioning and/or other display attributes of the product in the showcase.

Once it is determined in the decision point 1445 that the product display in the selected showcase is accepted, then an updated SLT is generated in a step 1450. The updated SLT may be generated based on the accepted product location. The updated SLT is associated with the RID. The updated SLT may be associated with the PID (identified in the step 1405). In some embodiments an electronic message(s) may be generated (e.g., to notify placement, movement, and/or rearrangement of a sample according to the updated SLT). The updated SLT may be saved. The updated SLT may supersede a previous SLT corresponding to the RID.

If it is determined, in a decision point 1455, not to issue a sample (e.g., a sample already exists, an existing sample is being rearranged, the showcase is a virtual showcase, the SLT is not yet applied to a physical showcase, the product is to be virtually displayed in a showcase), then the method 1400 ends. If it is determined, in the decision point 1455, to issue a sample (e.g., a new physical display location is selected), a signal(s) is generated in a step 1460. The signal(s) is configured to cause a sample to be issued (e.g., as disclosed at least with reference to FIG. 11).

Various embodiments may advantageously allow (re) placement of a product in a shared showcase. Various embodiments may advantageously provide a dynamic interface for virtual placement of the product in the showcase.

Figure 15:
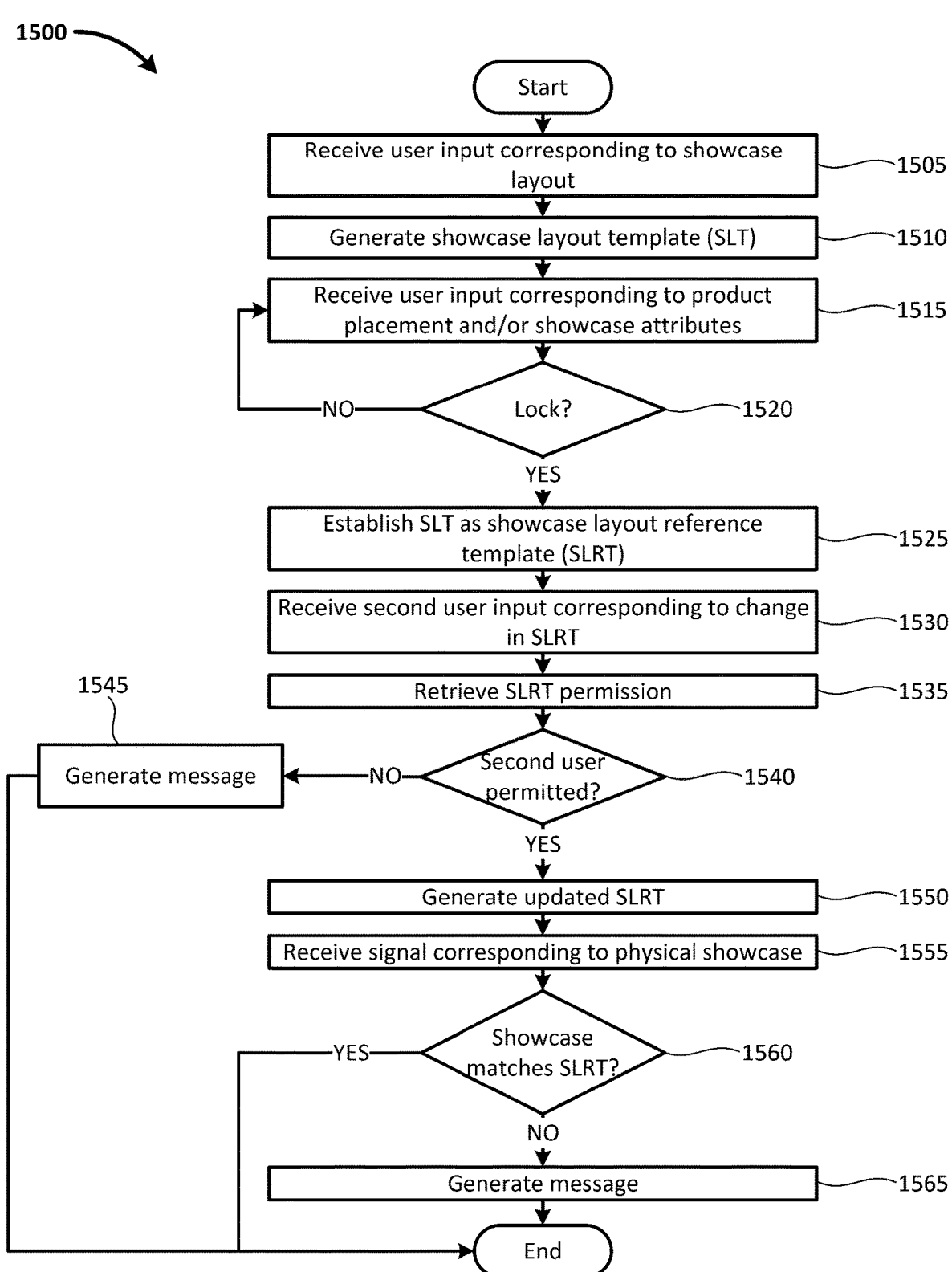
FIG. 15 is a flowchart depicting an exemplary process for generating and/or maintaining a showcase layout reference template.

FIG. 15 is a flowchart depicting an exemplary process for generating and/or maintaining a showcase layout reference template. A method 1500 may, by way of example and not limitation, be performed by at least one controller (e.g., processor 940, control circuit 915) according to a predetermined program(s) of instructions. In the method 1500, user input is received, in a step 1505, corresponding to a showcase layout. The input may, for example, be provided via an interface to generate a showcase layout. The input may, for example, indicate a new showcase layout. The input may, for example, correspond to updating an existing showcase layout. The showcase layout may have reference to one or more physical showcase. The showcase layout may, for example, have reference to a generic showcase layout which may be selected and applied to a physical showcase at a later time.

A showcase layout template (SLT) is generated in a step 1510. A (visual) display may, for example, be generated. The display may, for example, be dynamic. The display may be provided in an interactive interface. User input is received, in a step 1515, corresponding to product placement and/or showcase attributes. For example, the input may be received as a definition of a showcase layout. The input may, for example, correspond to acceptance of a previously defined showcase layout. For example, a user may visually arrange a showcase layout via an interactive interface (e.g., as disclosed at least with reference to FIG. 13). The SLT may, for example, define attributes of the showcase layout. For example, the SLT may include product ID(s). The SLT may, for example, include product position. The SLT may, for example, include visual, spatial, audio, and/or interactive attributes of the showcase layout.

If it is determined, in a decision point 1520, not to lock the SLT, then the method 1500 returns to the step 1515 to receive further user input. For example, the user may have made changes but not be ready to complete the SLT. The user may, for example, wish to further edit the SLT. Once it is determined, in the decision point 1520, to lock the SLT, the SLT is established, in a step 1525, as a showcase layout reference template (SLRT). For example, the user may indicate that the SLT is finalized. The SLT may be locked as an SLRT in response to the input. The user may, for example, be established as the owner of the SLRT. In some embodiments the SLRT may be associated with one or more users who have permission to view and/or edit the SLRT. For example, the permitted users may be determined by the user during creation of the SLRT. The permitted users may, for example, be predetermined (e.g., by role settings). The permitted users may, for example, be determined at a subsequent time to creating the SLRT.

A second user input is received, in a step 1530, corresponding to a (proposed) change to the SLRT. The second user input may, for example, correspond to a proposed change by another user (e.g., a user seeking to add a product to a shared showcase corresponding to the SLRT). The second user input may, for example, correspond to alteration of the SLRT (e.g., display attributes, interaction attributes).

An SLRT permission(s) (e.g., file, metadata) is retrieved in a step 1535. If it is determined, in a decision point 1540, that the user corresponding to the second user input is not permitted to alter the SLRT, then a message(s) is generated in a step 1545, and the method 1500 ends. For example, the (electronic) message(s) may notify the user that they are not permitted. The message(s) may be configured to notify an owner and/or permitted user(s) of the SLRT that a proposed change was submitted by an unauthorized user. For example, the message(s) may be configured to prompt a permitted user(s) to review the proposed change(s).

If it is determined, in the decision point 1540, that the user is permitted to alter the SLRT, then an updated SLRT is generated, in a step 1550, according to the second user input received in the step 1530. For example, the second user may be the first user. The second user may be authorized by the first user.

In the depicted example, a signal is received, in a step 1555, corresponding to a physical showcase. The physical showcase may be identified by a corresponding RID. The SLRT may be associated with the RID. For example, the physical showcase may be configured to adhere to the SLRT. The signal may, for example, correspond to a current state of the physical showcase (e.g., as disclosed at least with reference to FIG. 12).

If it is determined, in a decision point 1560, that the showcase matches the SLRT, then the method 1500 ends. If it is determined, in the decision point 1560 that the showcase does not match the SLRT (e.g., as disclosed at least with reference to FIG. 12), then a (electronic) message(s) is generated in a step 1565. For example, the message may be configured to cause restoration of the showcase to the SLRT. In some embodiments the message may be configured to cause evaluation and/or updating of the SLRT. For example, if the SLRT does not match the showcase, but the showcase is acceptable, then an updated SLRT corresponding to the current state of the showcase may be generated. The SLRT and the updated SLRT may, for example, be associated with the RID and/or PID(s). For example, the SLRT and the updated SLRT may be associated. In some embodiments, a machine learning model may be applied to generate an automatic SLRT based on multiple approved showcase configuration(s) (e.g., historically accepted configurations, prescriptive configurations).

Various embodiments may advantageously generate an SLRT for one or more physical showcases. Some embodiments may advantageously monitor a physical showcase(s) relative to one or more associated SLRTs. In some embodiments, the SLRT may, for example, act as a reference for monitoring and/or maintaining the physical showcase(s). In some embodiments, the SLRT may advantageously be copied as a starting point for another SLT. In some embodiments, the SLRT(s) may be updated based on acceptable variations from an (initial) prescribed SLRT. Such embodiments may advantageously reduce cost of maintaining a showcase while maintaining a desired shopping experience.

Figure 16:
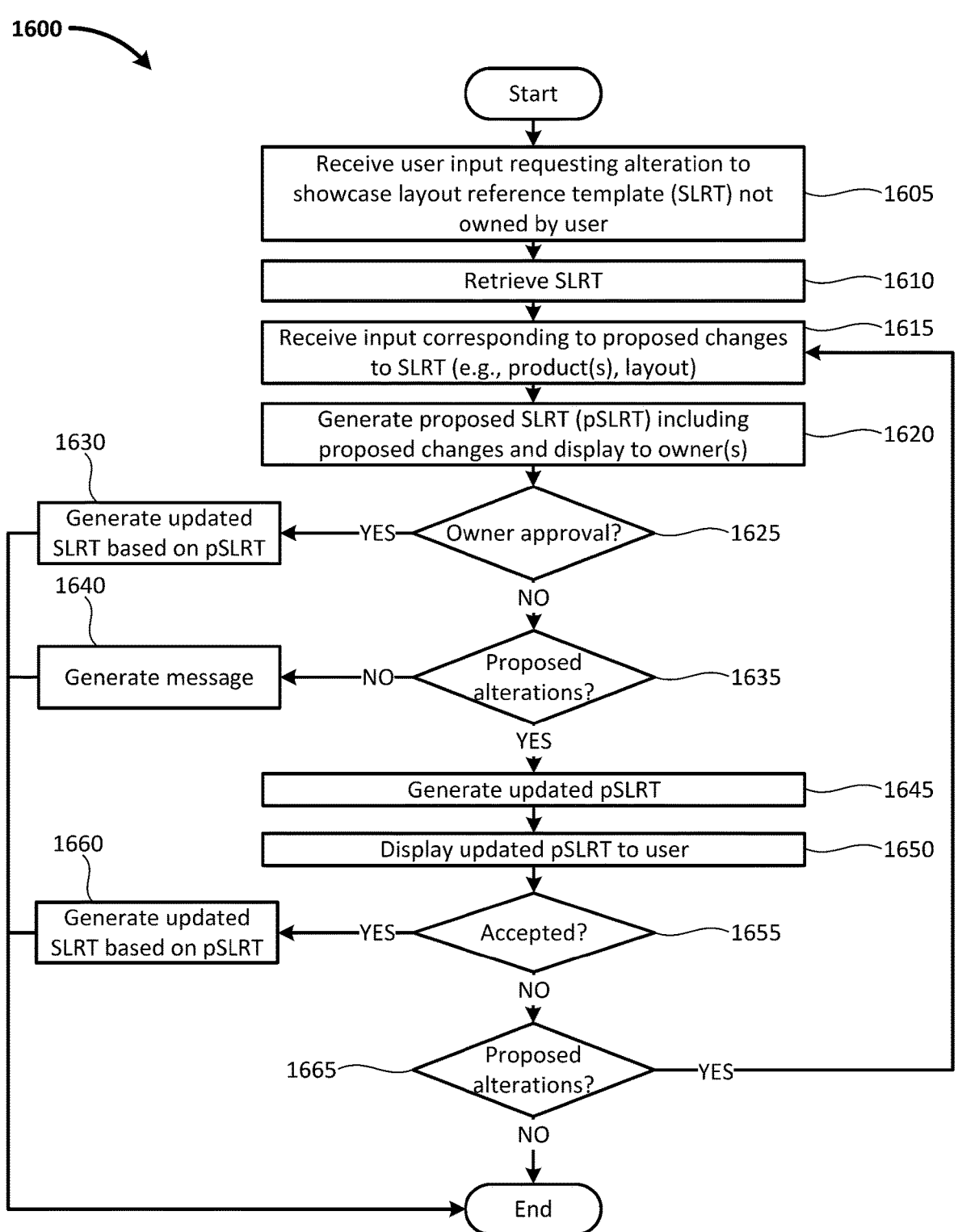
FIG. 16 is a flowchart depicting an exemplary process for altering a showcase layout reference template by a third party.

FIG. 16 is a flowchart depicting an exemplary process for altering a showcase layout reference template by a third party. A method 1600 may, by way of example and not limitation, be performed by at least one controller (e.g., processor 940, control circuit 915) according to a predetermined program(s) of instructions. In the method 1600, user input is received, in a step 1605, corresponding to a request for alteration to an SLRT. In the depicted example, the SLRT is not owned by the user making the request. For example, in the exemplary illustration disclosed at least with reference to FIG. 13, the user may be requesting alteration of an SLRT for the shared showcase 1325 to place the hiking boot 1310 in the retail display space 1330.

In response to the user input in the step 1605, the corresponding SLRT is retrieved in a step 1610. Input corresponding to the proposed changes is received in a step 1615. The proposed changes may include, by way of example and not limitation, a proposed addition and/or removal of a displayed product. The proposed changes may include, for example, an alteration to the layout (e.g., color, position, orientation, dynamic interface, signage).

A proposed SLRT (pSLRT) is generated, in a step 1620, including the proposed changes. A signal(s) is generated, the signal being configured to generate a display of the pSLRT for an authorized entity (e.g., permitted user) corresponding to the SLRT. For example, a visual indication of the proposed changes may be generated for the permitted user(s) corresponding to the SLRT. The display may prompt the permitted user(s) for input corresponding to an acceptance and/or rejection of the pSLRT. The display may be configured to prompt, in the case of rejection, to additional input corresponding to reasons for rejection and/or proposed further alterations that may be acceptable.

If the pSLRT is determined to be approved (e.g., in response to a signal received from the permitted user(s) in response to the pSLRT), in a decision point 1625, then an updated SLRT is generated, in a step 1630, based on the pSLRT, and the method 1600 ends. If the pSLRT is determined to not be approved, in the decision point 1625, then the method 1600 proceeds to a decision point 1635.

If it is determined, in the decision point 1635, that alterations are not proposed to the pSLRT by the permitted user(s), then a (electronic) message(s) is generated in a step 1640 and the method ends. For example, the message may indicate to the proposing user that the pSLRT was rejected. If it is determined, in the decision point 1635, that alterations are proposed to the pSLRT, then an updated pSLRT is generated in a step 1645. A display of the updated pSLRT is generated and presented to the user in a step 1650. For example, a visual representation of the updated pSLRT may be presented. A visual representation of the original pSLRT may be presented to the user (e.g., simultaneously, separately). In some embodiments, a visual representation of the proposed alteration(s) defined by the updated pSLRT may, for example, be included in the display.

If the updated pSLRT is determined, in a decision point 1655, to be accepted, then an updated SLRT is generated in a step 1660 based on the pSLRT (e.g., incorporating the changes to the original SLRT), and the method 1600 ends. For example, the updated SLRT may be stored and associated with the RID. The updated SLRT may, for example, be associated with at least some of the original PID(s) and/or a new PID(s). In some embodiments the updated SLRT may, for example, be associated with one or more (new, original) SIDs corresponding to PID(s) associated with the SLRT.

If the updated pSLRT is determined, in the decision point 1655, to not be accepted, the method 1600 proceeds to a decision point 1665. If it is determined, in the decision point 1665, that alterations are not proposed, then the method 1600 ends. The pSLRT may expire and/or be finally rejected. If it is determined, in the decision point 1665, that alterations are proposed (e.g., further alterations, such as by the original user to propose altering the SLRT, to the updated pSLRT provided by the permitted user), then the method 1600 proceeds to the step 1615 to receive input from the user corresponding to the proposed changes to the (updated) pSLRT. For example, the original user may have proposed placing a flashlight in a camping related SLRT corresponding to a shared showcase(s). The owner of the SLRT (e.g., a camping gear vendor renting associated physical showcase(s)) may, for example, have proposed a different placement of the flashlight and/or a different signage associated with the flashlight.

The original user may propose a further modification to the placement and/or signage. Accordingly, in this exemplary illustration, if the users agree in an iterative process, then the SLRT may be updated to incorporate the flashlight. If the users cannot agree, then the process ends, and the flashlight may not be added into the proposed showcase. Various embodiments may advantageously provide an (automatic) collaborative method to update an SLRT, such as related to a shared display(s).

In some embodiments proposed changes may, for example, be automatically accepted, rejected, and/or modified. For example, the proposed changes may be determined to be preapproved and/or pre-rejected according to a profile of a permitted user associated with the SLRT. In some embodiments the proposed changes may be automatically classified by a machine-learning (ML) model. For example, the ML model may be applied to the proposed changes, the SLRT, predetermined preference(s) of the permitted user(s), and/or historical behavior of the permitted user(s) (e.g., historically approved and/or rejected proposed changes). In some embodiments the ML model may generate suggested actions (e.g., approval, rejection, modification) with associated confidence intervals. In some embodiments, suggestions above a (predetermined) confidence interval threshold may, for example, be accepted. In some embodiments, suggestions below a (predetermined) confidence interval threshold may, for example, be sent for review by the permitted user(s). Various such embodiments may advantageously reduce labor and/or costs required to respond to proposed alterations to the SLRT.

FIG. 17 is a flowchart depicting an exemplary method for dynamically sending samples based on geographical sales concentration. In the depicted example, a method 1700 begins when sales data is received, in a step 1705, corresponding to a PID. The sales data may, for example, be manually input. In some examples, the sales data may be automatically received. The sales data may, by way of example and not limitation, be received from one or more online systems, retail providers, product providers, clearinghouses, merchants, or some combination thereof. The method 1700 may, for example, be performed by a computer system (e.g., the controller 910 as disclosed at least with reference to FIG. 9).

Locations of sales corresponding to the PID or determined from the sales data in a step 1710. For example, a (digital) heatmap may be generated of sales concentration. A database may, for example, be populated by the sales data including corresponding sales locations. In some implementations, location may, for example, be determined based on shipping address. Location may, for example, be determined based on billing address. In some examples, location may be determined, for example, based on device location (e.g., IP address, geolocation) of a device making a purchase.

Sales concentration region(s) in which sales are over a threshold(s) (e.g., predetermined, dynamically determined) are determined, in a step 1715, based on the location of the sales. Sales may, in some examples, be determined based on sales volume (e.g., price, quantity). Concentration regions may, for example, be determined based on sales per unit (e.g., area, population, product views). A threshold may, for example, be determined based on ranking (e.g., top 5), (minimum) sales volume, or some combination thereof. In some implementations, a threshold may be determined based on one or more sales occurring. In some implementations, a region may, for example, be predetermined (e.g., New York City metro, Austin Metropolitan Statistical Area (MSA)). In some implementations a region may, for example, be dynamically determined (e.g., sales concentration/area, sales concentration/population, grouping of sales by least squares minimization of distance between sales locations).

Based on the selected sales concentration regions, RID(s) of retail locations within the selected sales concentration regions are determined in a step 1720. For each of the selected RIDs, it is determined, in a decision point 1735, whether an SID associated with the PID is associated with the RID. If not, then it is determined in a decision point 1730, whether to send a sample to the retail location (e.g., whether the retail location is suitable for display of the PID, whether the retail location accepts the PID for display, whether a merchant associated with the PID accepts a suggested retail location for display). For example, a suggestion of the retail location may be made, for example, to a merchant associated with the PID. The retail location(s) suggested may, for example, be determined based on sales concentration region, distance to a nearest retail location having an active SID for the PID, and/or RID rating (e.g., average showcase quality, average sample quality, RID feedback ratings, sales rankings of RID for related products).

If it is determined in the decision point 1730 to send a sample, then a new SID(s) is generated, and shipping signal(s) are generated in a step 1745 to cause new sample(s) to be associated with the PID and the current RID(s) and shipped to the retail location(s). In some implementations, by way of example and not limitation, steps such as disclosed at least with reference to depicted exemplary method 1000 of FIG. 10, depicted exemplary method 1100 of FIG. 11, and/or method 1200 of FIG. 12 may be executed. If it is determined in the decision point 1730 not to send a sample, then the method 1700 ends.

If it is determined in the decision point 1725 that an active SID is associated with the RID, then it is determined in a decision point 1735 whether a sample to sales ratio (Sample: Sales) meets one or more predetermined criterion(s). For example, a predetermined criterion may be set by a merchant associated with the PID. A predetermined criterion may, for example, be set by a product provider associated with the PID (e.g., a manufacturer). The predetermined criterion may, by way of example and not limitation, be a minimum sample to sales ratio. In some implementations the criterion(s) may, for example, be dynamically predetermined (e.g., based on sales data).

If it is determined, in the decision point 1735, that the sample to sales ratio has not met the predetermined criterion(s), then the method 1700 proceeds to the step 1745 to cause new sample(s) to be shipped out to satisfy the predetermined criterion(s) related to the sample to sales ratio. If it is determined, in the decision point 1735, that the sample to sales ratio has met the predetermined criterion(s), then it is determined, in a decision point 1740, whether the current sample(s) quality meets a predetermined criterion(s). For example, in some implementations the quality may be determined as disclosed at least with reference to FIGS. 8-12.

If it is determined, in the decision point 1740, that quality of the current sample(s) does not meet a predetermined criterion(s), then the method 1700 proceeds to the step 1745 to send out a new sample(s). Otherwise, the method 1700 ends.

In some implementations, sales data may, by way of example and not limitation, be augmented or replaced with viewing data (e.g., customer online viewing, in person viewing). In some implementations, sales data may, by way of example and not limitation, be augmented or replaced with user experience data (e.g., monitored wait time for viewing, user feedback).

Various embodiments may advantageously solve a technical problem of enabling a computer system to automatically determine whether enough product samples are present in a geographical location. For example, the method 1700 may advantageously enable a computer system to automatically allocate physical samples to physical retail location(s) based on online purchasing data. As an illustrative example, the method 1700 may, for example, advantageously enable additional face shield samples to be automatically sent to a store in New York in response to an increase in in-person and/or online sales (e.g., corresponding to an outbreak of a disease, such as COVID-19). The additional face shield samples may, for example, advantageously prevent unnecessary increase in exposure time for users who are trying to determine which face shield to buy by reducing or eliminating a line to investigate the face shield in person.

In some implementations (not shown), by way of example and not limitation, if it is determined, in the decision point 1735, that the sample to sales ratio has met the predetermined criterion(s), then the method 1700 ends (e.g., without evaluating the decision point 1740).

In some implementations (not shown), by way of example and not limitation, the decision point 1735 and the decision point 1740 may be in a different sequence (e.g., decision point 1735 evaluated after decision point 1740). In some implementations (not shown), by way of example and not limitation, the decision point 1735 and the decision point 1740 may be evaluated in parallel.

In some implementations (not shown), by way of example and not limitation, the step 1710, step 1715, and/or step 1720 may be evaluated in a different order and/or in parallel. In some implementations, by way of example and not limitation, the step 1720 may be omitted.

Figure 18A:
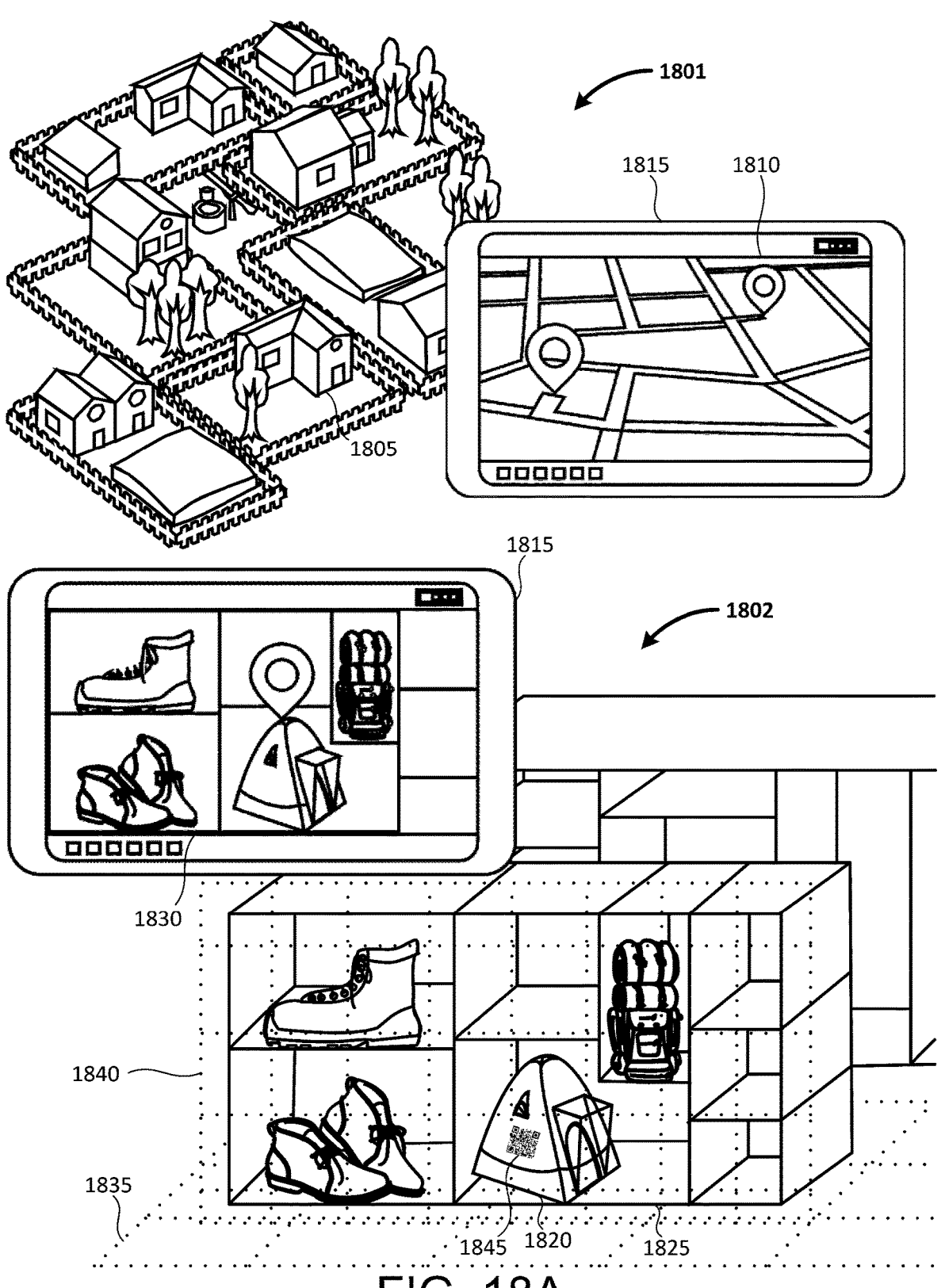
FIG. 18A depicts an exemplary inter-location and intra-location user navigation guide system in an illustrative use-case scenario.

FIG. 18A depicts an exemplary inter-location and intra-location user navigation guide system in an illustrative use-case scenario. A user may, for example, wish to view a product (e.g., a sample product) discovered online in person (e.g., at a physical retail location). The user may request guidance to find the physical product. In the depicted example, a user is being navigated in a physical inter-location environment 1801 to a physical retail location 1805. The physical retail location 1805 may, for example, be selected based on being associated with an active SID for a PID the user desires to see. An inter-location navigation display 1810 is provided on a device 1815 (e.g., a mobile computing device, a smartphone) guiding the user to the physical retail location 1805. For example, the inter-location navigation display 1810 may include a street map. The inter-location navigation display 1810 may, for example, be interactive and/or dynamic (e.g., providing real-time navigation guidance).

In the depicted example, once the user reaches the physical retail location 1805, the user may enter an intra-location environment 1802 (e.g., an inside of a store). The intra-location environment 1802 may, for example, be part of a large retail facility (e.g., a shopping mall). The user may, for example, wish to receive guidance through the physical retail location 1805 to the target product (sample). In the depicted example, an intra-location navigation display 1830 is provided on the device 1815, guiding the user through the physical retail location 1805 to the target product 1820.

As depicted, the target product 1820 is located in a physical showcase 1825. The physical showcase 1825 and/or the target product 1820 may, for example, be associated with an SLT. The physical showcase 1825 may be associated, for example, with coordinates within a first navigation framework 1835 (e.g., grid) within the physical retail location 1805. The target product 1820 may be associated, for example, with coordinates within a second navigation framework 1840 (e.g., grid) within the physical showcase 1825. For example, the target product 1820 may be associated with a specific SLT (e.g., corresponding to a single shelf) within the larger physical showcase 1825 (e.g., corresponding to an entire shelving and/or aisle).

The intra-location navigation display 1830 may be generated based on the first navigation framework 1835 and/or the second navigation framework 1840. The intra-location navigation display 1830 may, for example, be dynamic and/or interactive. For example, the intra-location navigation display 1830 may display a current location of the user within the first navigation framework 1835. The intra-location navigation display 1830 may, for example, provide sequential navigational instructions to reach the physical showcase 1825. Once the user reaches a geo-boundary (e.g., a predetermined distance from the 1825 corresponding to the physical showcase 1825 being in sight of the user), then the intra-location navigation display 1830 may switch from displaying the user location and/or target location within the physical retail location 1805 to displaying a view of the physical showcase 1825 and the target product 1820 within the physical showcase 1825, as shown in the depicted intra-location navigation display 1830.

In the depicted example, the target product 1820 is provided with a physical tag 1845. The physical tag 1845 may, for example, correspond to a PID and/or SID. For example, as depicted, the physical tag 1845 may be implemented as a QR code. The user may, for example, scan the physical tag 1845 to access product information and/or related actions (e.g., purchasing, commenting, sharing, providing feedback).

Various embodiments may advantageously provide a user guidance to a desired physical product that was discovered online. In some implementations, a single app and/or system may, for example, seamlessly transition from the inter-location navigation display 1810 to the intra-location navigation display 1830 based on the user location. In some implementations, a first app may provide the inter-location navigation display 1810 (e.g., a mapping app), for example. A second app may, for example, provide the intra-location navigation display 1830. The user may, for example, selectively activate the first app and/or the second app based on their current location.

In some implementations, a navigational framework may, for example, include a Cartesian coordinate system. In some implementations, a navigational framework may, for example, include a spherical and/or cylindrical coordinate system. As an illustrative example, a showcase may, for example, be 'built up' in 3 dimensions. For example, a retail showcase may have floor space, side walls (e.g., three), and a top cover. Each portion of the (physical) retail showcase may, for example, in a Cartesian coordinate system, be represented in association with X, Y, and Z planes. Accordingly, 'grids' (e.g., navigational frameworks) of a retail facility can be built up using a multiple level grid. For example, a multiple level grid may be 'layered', such as from a top plane surface level to a retail spot grid level, further down to showcase level, and even down, for example, to a sub-showcase level (e.g., a section within a showcase to have unique grid map, which may be useful for add-on modules (AOMs) such as disclosed at least with reference to FIG. 21). Accordingly, a multi-dimensional environment may, for example, advantageously be broken down into multiple layers of grids. For example, if the retail facility is huge and complex, addition layer of grids may be inserted. If, for example, the retail facility is of simple construction, one grid may, for example, be sufficient.

In some implementations, by way of example and not limitation, AOM(s) may, be applied to one or more upper levels of a navigation framework and/or top plane surface level. In some implementations, for example, AOM(s) may be applied to a sub-showcase level (e.g., to a specific portion of a showcase). For example, the O2O management system 116 may be configured to select one or more specific AOMs and apply that specific AOM(s) on all or a selected portion of retail spots. As an illustrative example, an entity (e.g., O2O management system 116 personnel, retailer, merchant) may choose to apply a specific AOM to the first 3 rows of retail spots at one or more retail locations (e.g., each retail spot may have one or more showcases). Accordingly, various embodiments may advantageously allow granular control over application of AOMs to specific products, showcases, retail locations, or some combination thereof. For example, the AOMs may advantageously be applied by linking application of an AOM to one or more specific coordinates in one or more navigational frameworks.

In some implementations, each layer of grids may include and/or be associated with attributes (e.g., through an SLT, through RID, through SID, through PID, through associated data structures and entries). Such attributes may, for example, be associated with specific functions (e.g., product detail, sample detail, showcase space leasing pricing, environment, product category, price structure of a grid square and/or location of a showcase within a retail facility). As an illustrative example, the attribute(s) may, for example, include association(s) with, parameters for, and/or attributes of AOM(s) (e.g., as disclosed at least with reference to FIG. 21).

For example, each grid may be divided into many grid squares. Intersection of grid lines may, for example, be represented by coordinates (e.g., [x,y,z]). Coordinates may, for example, further represent address/location specific points. When multiple layers of grids are involved, for example, a physical position within the store may represent a coordinate made up of different layer of grids (e.g., [Layer1 (X,Y,Z), Layer2 (X,Y,Z), Layer3 (r,θ,φ)].

As an illustrative example, a grid address construction can be in a format where multiple layers of grid data combine to create a serial of grid data, such as the following example: Coordinates of a physical location within a retail facility=Grid_retail_facility_ID.Grid_level(1) coordinate+Grid_level(x) coordinate+ . . . , where X>1.

In some implementations, when an SLT (e.g., associated with a coordinate(s) in a physical location) is updated (e.g., moved), the updated product coordinate of grid location may be reported to the O2O management system 116. Accordingly, physical location(s) of products and/or showcases may, for example, be advantageously maintained up to date. In some implementations, an update method may, for example, be automatic. For example, a sensor(s) (e.g., camera capture) may scan a location of showcases and update associated product location(s) and addresses (e.g., coordinates). Other details, such as product details (e.g., name, SKU, UPC) may, for example, be retrieved from product servers. Accordingly, various embodiments may advantageously provide a location of each product within a navigational framework of a physical location (e.g., store, aisle, showcase, sub-showcase).

In an illustrative example, a SLT(s), an attribute(s), and/or an AOM(s) may, for example, be assigned to a specific coordinate(s) in a navigational framework(s) of a physical location. For example, a specific coordinate(s) may be reserved for picture displays (e.g., corresponding to a wall in an 'art' section). Only SLT(s) associated with picture displays may, for example, be accepted for association with corresponding showcase IDs and/or coordinates within the physical location (e.g., associated by an RID).

Figure 18B:
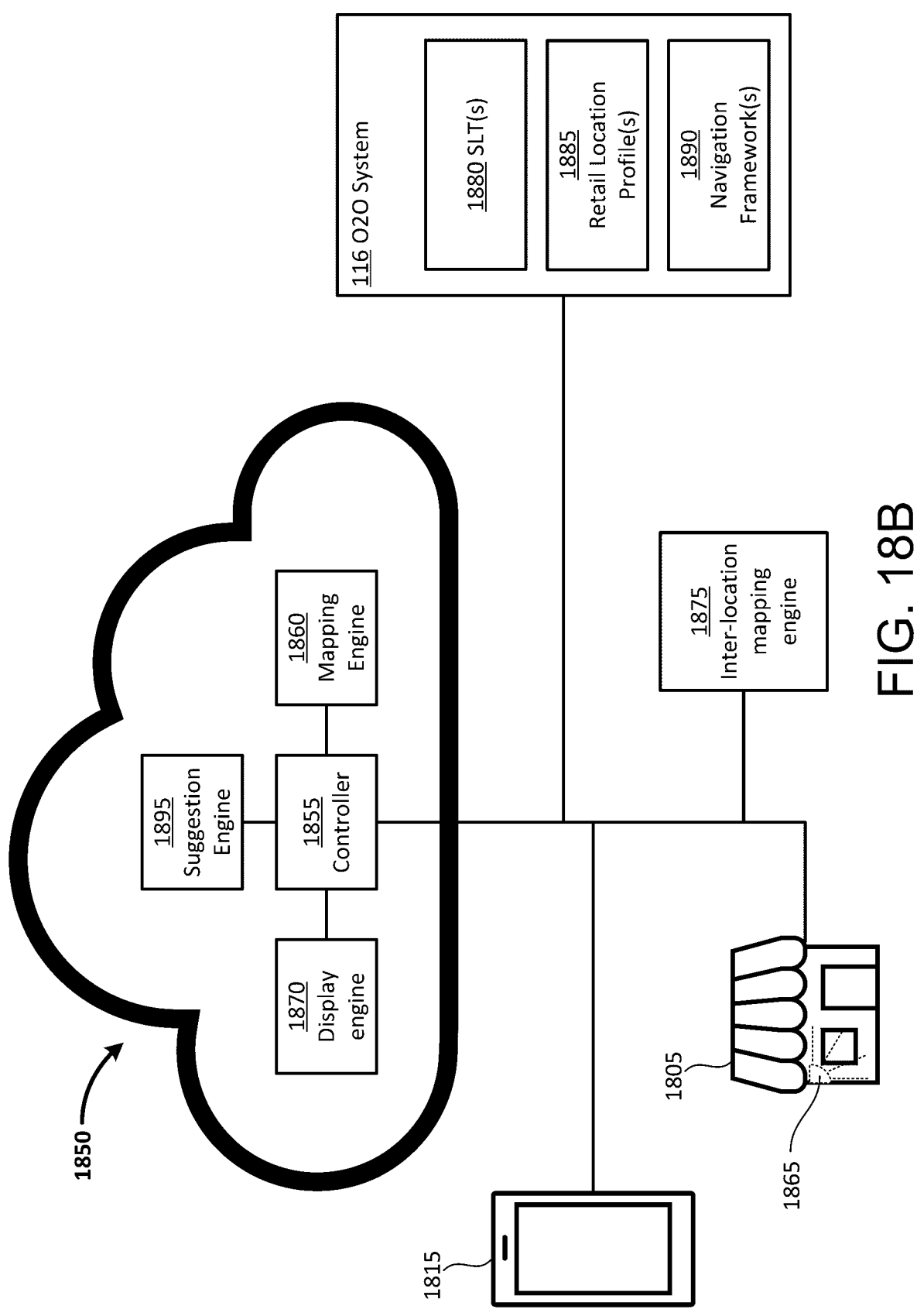
FIG. 18B is a block diagram depicting an exemplary user navigation guide system (UNGS).

Each grid associated with a SLT and/or AOM may, for example, be further assigned with attributes (e.g., automatically, manually) even if the showcase is still vacant. For example, a grid on the wall of the showcase from grid1: shelf6 to grid1:shelf15 may, for example, be reserved for picture frames (e.g., and nothing else). FIG. 18B is a block diagram depicting an exemplary user navigation guide system (UNGS). In the depicted example, a UNGS 1850 (e.g., a cloud system, as depicted) includes a controller 1855 coupled to a mapping engine 1860. As an illustrative example, the controller 1855 may receive mapping data from the mapping engine 1860 in response to a request for mapping from the device 1815. In the depicted example, the controller 1855 is operably coupled to a device (not shown) (e.g., computer, controller, communication hub of a network) of the physical retail location 1805. For example, the controller 1855 may be operably coupled to receive signal(s) from and/or in response to a sensor(s) 1865 at the physical retail location 1805. In some implementations, the sensor(s) 1865 may, for example, detect a user and/or user device (e.g., device 1815) within the physical retail location 1805. For example, the sensor(s) 1865 may detect a position of the user (e.g., relative to a navigation framework(s)). In some implementations, the sensor(s) 1865 may, for example, detect movement and/or interaction of a user(s). In some implementations, the sensor(s) 1865 may, for example, include the sensor module(s) 925 disclosed at least with reference to FIGS. 8-9 (e.g., first sensor 815, second sensor 820, first input member 825, second input member 830, communication module 845). As an illustrative example, the sensor(s) 1865 may include and/or be in communication with near field communication receiver(s) and/or transceiver(s) (e.g., Bluetooth, Zigbee, RFID) and/or Wi-Fi type receiver(s) and/or transceiver(s). In some implementations, by way of example and not limitation, the sensor(s) 1865 may detect an attribute(s) of a showcase, display, and/or item within the physical retail location 1805. The mapping engine 1860 may, for example, generate navigation data based on input from the sensor(s) 1865.

The controller 1855 is operably coupled to a display engine 1870. The controller 1855 may, for example, provide the mapping data from the mapping engine 1860 to the display engine 1870. The display engine 1870 may, for example, generate a display signal(s) corresponding to a navigation display. The controller 1855 may, for example, transmit the control signal(s) to the device 1815 such that a navigation display (e.g., inter-location navigation display 1810, intra-location navigation display 1830) may be displayed on the device 1815 in response to the signal from the device 1815 corresponding to a user requesting a navigation display(s).

In the depicted example, the controller 1855 is coupled in communication with an inter-location mapping engine 1875. The inter-location mapping engine 1875 may, for example, include and/or be coupled to a street navigation system (e.g., mapping software, mapping platform). In the depicted example, the inter-location mapping engine 1875 may, for example, send a current location of the sensor(s) 1865 and/or a target destination (e.g., the physical retail location 1805) to the controller 1855 (e.g., for use by the inter-location mapping engine 1875). The inter-location mapping engine 1875 may, for example, provide navigation information to the mapping engine 1860 and/or to the device 1815 (e.g., through the controller 1855, directly). For example, the device 1815 may display the inter-location navigation display 1810 to the user in response to signal(s) from the inter-location mapping engine 1875 (e.g., directly, through the mapping engine 1860, through the controller 1855, directly to the device 1815).

In the depicted example, the mapping engine 1860 is coupled, through the controller 1855, in communication with the O2O Management System 116. As depicted, the O2O Management System 116 includes SLT(s) 1880 and retail location profile(s) 1885. For example, the SLT(s) 1880 may be a part of and/or include the showcase template datastore 980 (e.g., as disclosed at least with reference to FIG. 9). The profile(s) 1885 may, for example, include and/or be a part of the showcase datastore 985 (e.g., including retail spot data). The SLT(s) 1880, the profile(s) 1885, and/or the navigation framework(s) 1890 may, for example, be included in the database 120 (e.g., as disclosed at least with reference to FIG. 1).

For example, the framework(s) 1890 may include the first navigation framework 1835 and/or second navigation framework 1840. The first navigation framework 1835 and/or second navigation framework 1840 may, by way of example and not limitation, be associated with the physical retail location 1805 in at least one of the profile(s) 1885 (e.g., corresponding to the physical retail location 1805). The SLT(s) 1880 may, for example, include SLTs corresponding to displays (e.g., showcases) within the physical retail location 1805. For example, at least one of the SLTs may correspond to the physical showcase 1825. The mapping engine 1860 may, for example, retrieve mapping data (e.g., SLT, navigation framework, product location, product information, retail display layout, nearby items) from the O2O Management System 116 (e.g., from the SLT(s) 1880 data store, the profile(s) 1885 data store, and/or the framework(s) 1890 data store) via the controller 1855. The mapping engine 1860 may, for example, generate navigation data (e.g., navigational information to guide the user to the target product 1820). The display engine 1870 may, in response to the navigation data from the mapping engine 1860, for example, generate a display signal(s) for transmittal to the device 1815 for display to the user (e.g., of the intra-location navigation display 1830).

In the depicted example, the UNGS 1850 includes a suggestion engine 1895 operably coupled in communication with the controller 1855. The suggestion engine 1895 may operate on data (e.g., retrieved from the O2O Management System 116) to generate suggested actions (e.g., purchase, review, report, rate, comment, 'take a picture', like, share, select AOM, assign AOM, apply AOM) and/or items (e.g., similar products, nearby products, "other customers purchase"). The display engine 1870 may, for example, generate a display at least partially based on suggestion data received from the suggestion engine 1895 (e.g., as disclosed at least with reference to FIG. 18A, step 1965 of FIG. 19, and/or FIG. 20).

As an illustrative example, the controller 1855 may, for example, interact with the inter-location mapping engine 1875 via an API. In some implementations, by way of example and not limitation, the inter-location mapping engine 1875 may, for example, be in communication with (e.g., directly) the sensor(s) 1865 (e.g., in addition to or instead of connecting to the mapping engine 1860).

Figure 19:
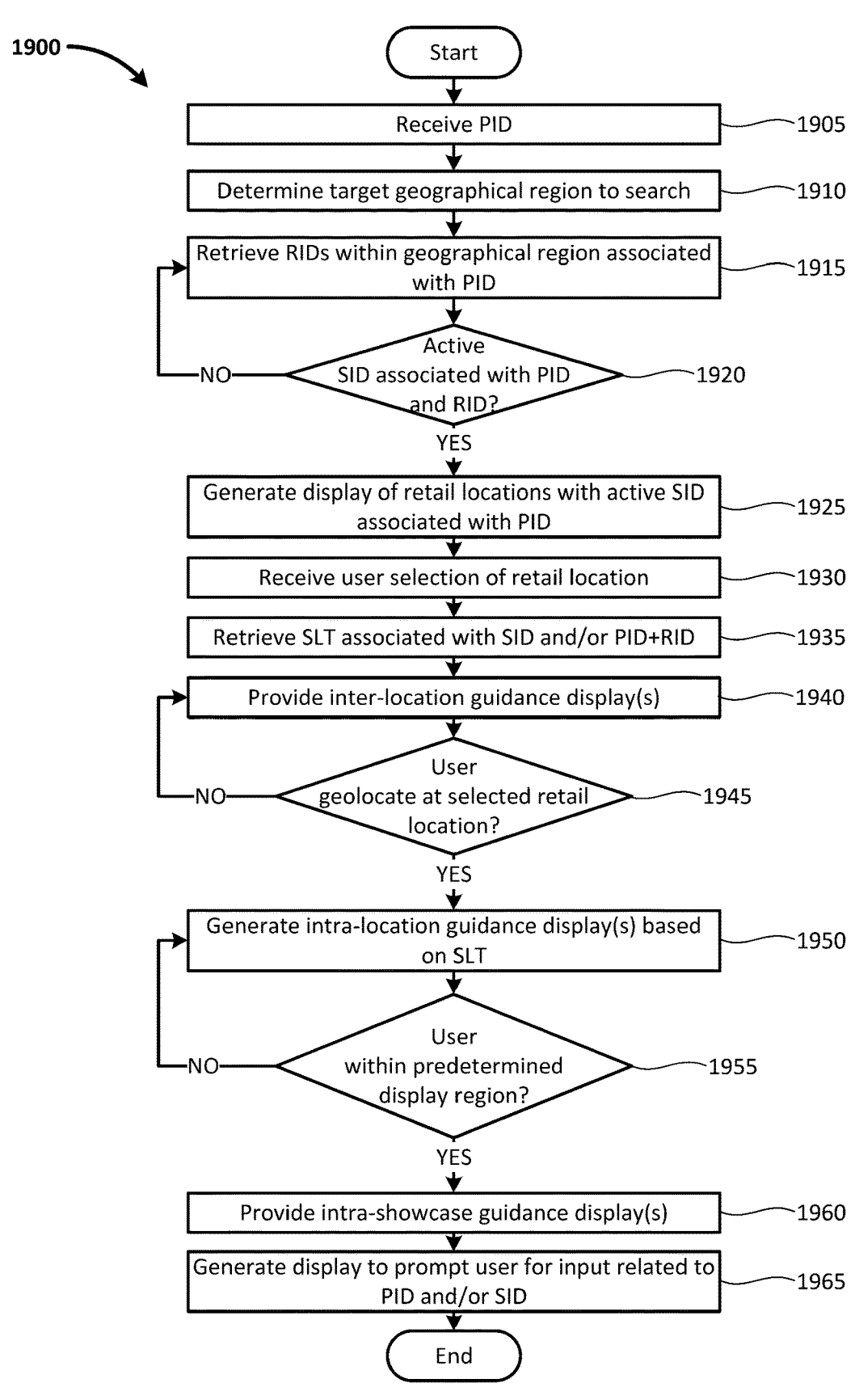
FIG. 19 is a flowchart depicting an exemplary method for providing user navigation guidance to a physical showcase.

FIG. 19 is a flowchart depicting an exemplary method for providing user navigation guidance to a physical showcase. A method 1900 begins by receiving a signal corresponding to a PID in a step 1905. The method 1900 may, by way of example and not limitation, be performed by a controller 1855 of the UNGS 1850 as disclosed at least with reference to FIG. 18B. The PID may, for example, be received in response to a user selecting a corresponding item in an online retail interface (e.g., online storefront) and selecting an indicium to find (a sample of) the physical product nearby (e.g., 'take me there' button, 'See this nearby' button).

A target geographical region to search is determined in a step 1910. For example, the target geographical region may be determined based on a current location of the user and/or a travel radius preference of the user. The current location of the user may, for example, be determined based on user input and/or automatically determined based on current user location (e.g., GPS, IP address).

RIDs within the geographical region that are associated with the PID a retrieved in a step 1915. It is determined, in the decision point 1920 whether at least one active SID is associated with the PID for each of the retrieved RIDs (e.g., does the RID have a sample available for the product?). If not, then the method 1900 returns to the step 1915. If yes, then a display of retail locations with an active SID associated with the PID is generated in a step 1925.

A selection of a preferred retail location is received from the user in a step 1930. An SLT associated with the SID associated with the RID selected and/or an SID associated with both the PID and RID is retrieved in a step 1935.

An inter-location guidance display is provided in a step 1940 (e.g., a link to open a map for the address, a dynamic display such as inter-location navigation display 1810 in FIG. 18A). Once it is determined, in a decision point 1945, that a current geolocation of the user corresponds to arrival at the selected retail location, then an intra-location guidance display(s) is generated in a step 1950 (e.g., as disclosed at least with reference to intra-location navigation display 1830 and first navigation framework 1835 of FIG. 18A). The intra-location guidance display(s) is generated, in the depicted example, based on the SLT associated with the SID and/or the RID and PID. Once it is determined, in a decision point 1955, that the user has arrived within a predetermined display region (e.g., in sight of the physical showcase), then an intra-showcase guidance display(s) is generated (e.g., the intra-location navigation display 1830 as depicted in FIG. 18A, the second navigation framework 1840 as disclosed at least with reference to FIG. 18A).

The step 1950 may, for example, use predetermined coordinates of the showcase within the retail location (e.g., corresponding to the first navigation framework 1835). Coordinates may, for example, be associated with the SLT (e.g., in a metadata structure, in a database). The 1960 may, for example, use predetermined coordinates (e.g., corresponding to the second navigation framework 1840) of the product within the showcase (e.g., the actual product within the showcase, a specific showcase associated with the SID within the larger showcase).

Once the user has arrived (e.g., determined by change in motion based on geolocation, confirmation from the user of arrival, predetermined time of display of the intra-showcase guidance display), then a display is generated in a step 1965 prompt a user for input related to the PID and/or SID, and the method 1900 ends.

Figure 20:
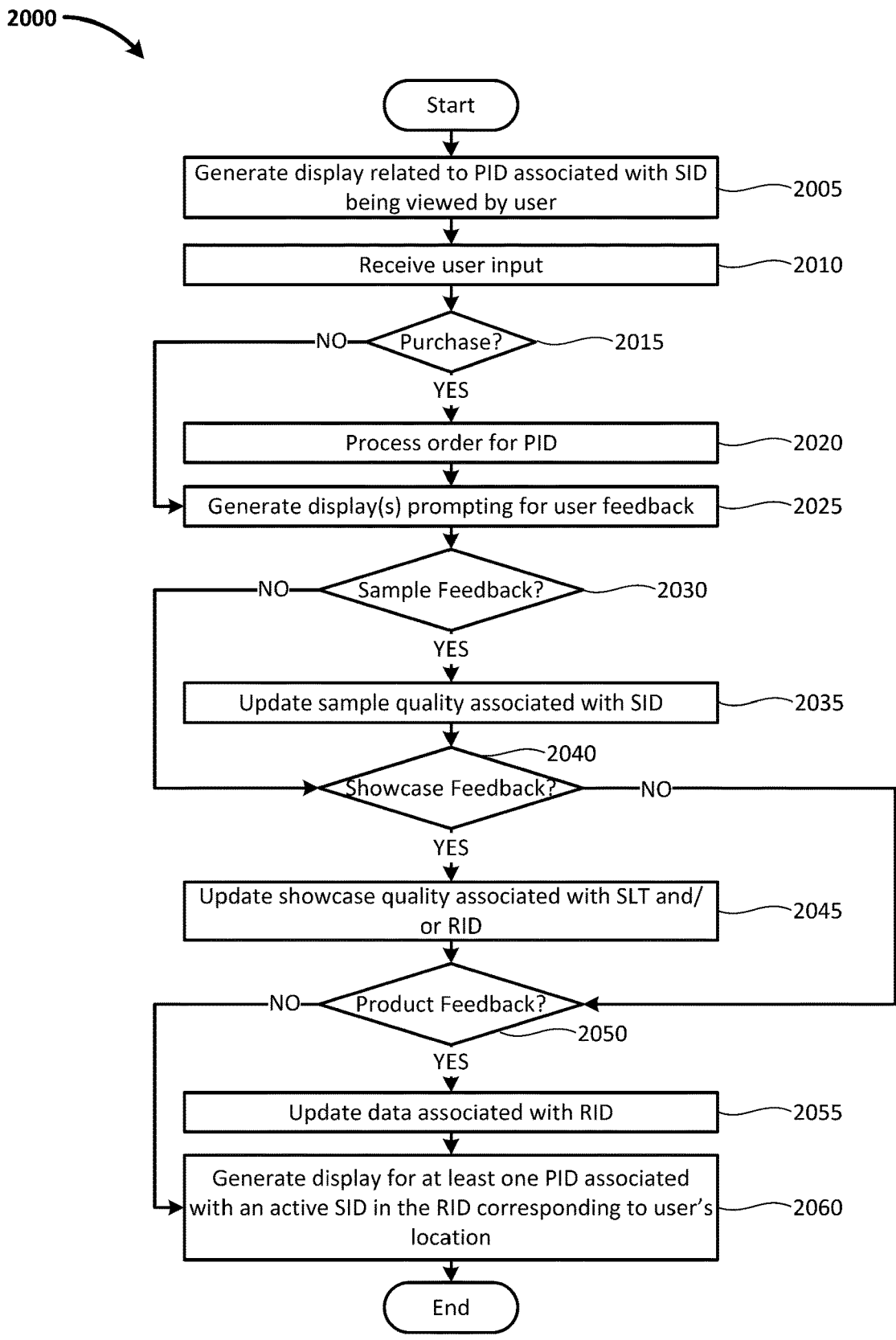
FIG. 20 is a flowchart depicting an exemplary method for interacting with the user after guiding a user to a physical showcase.

FIG. 20 is a flowchart depicting an exemplary method for interacting with the user after guiding a user to a physical showcase. In a method 2000, a display is generated, in a step 2005, related to the PID associated with an SID being viewed by the user (e.g., as disclosed at least with reference to the method 1900 of FIG. 19). The display may, for example, provide additional information about the product. The display may, for example, prompt for purchasing the product. The display may, for example, show related products. The display may, for example, prompt for user feedback. The display may, for example, include a side display providing additional objects related to the PID. For example, the additional objects may be determined based on a machine-learning model(s) automatically (re) trained based on buying patterns from other customers. For example, a target PID may correspond to a pair of sport shoes of a Brand A. The machine-learning model(s) may, for example, generate a suggestion signal, as a function of buying behavior of the customer (e.g., past buying habits) and/or other customers (e.g., current buying trends, past buying habits associated with the product and/or related attributes). The model may, for example, be configured to include in the suggestion signal competitive offerings (e.g., sport shoes of Brand B and Brand C). The model may, for example, be configured to include in the suggestion signal related products (e.g., accessories, such as sport socks Brand X, Brand Y, and/or Brand Z). In some implementations, the model may, for example, be configured to include in the suggestion signal related items (e.g., a 6-pack of AAA batteries of Brand H and/or Brand I that are available in the retail facility), such as based on the customer's past behavior (e.g., shopping, browsing, text messaging, want lists, social media communication). The display may further be configured to include indicia offering a navigational display to location(s) associated with the corresponding PID(s).

User input is received in a step 2010. If it is determined in a decision point 2015 that the user input corresponds to a purchase of the product, then an order is processed for the PID in a step 2020 (e.g., such as disclosed at least with reference to FIGS. 4-6).

A display(s) is generated, in a step 2025, prompting the user for feedback. If it is determined that sample feedback is received, in a decision point 2030, then a sample quality associated with the SID is updated in a step 2035. If it is determined in a decision point 2040 that showcase feedback is received, then a showcase quality associated with the SLT and/or the RID is updated in a step 2045. If it is determined in a decision point 2050 that product feedback is received, then data associated with the RID is updated in a step 2055.

A display is generated, in a step 2060, for at least one PID associated with an active SID associated with the RID corresponding to the user's location, and the method 2000 ends. In some implementations, the display may include a display of at least one PID associated with an active SID associated with an RID nearby the user's location (e.g., within a user-defined shopping radius, within a machine-learning identified user shopping geolocation zone). In some implementations, by way of example and not limitation, the step 2060 may include suggesting other products (e.g., a suggested PID, suggested products, related products, other shoppers are buying, you might like). In some examples, the step 2060 may, for example, include displaying paid ads (e.g., based on product suggestions, buyer attributes, product attributes, other buyer behavior).

In some implementations, by way of example and not limitation, steps of the method 2000 may be performed in different orders and/or in parallel. For example, the user input may simultaneously include purchase, sample feedback, showcase feedback, product feedback, and/or other input. In some implementations, by way of example and not limitation, the type of input may be evaluated in parallel (e.g., the decision point 2015, the decision point 2030, the decision point 2040, and/or the decision point 2050) and/or associated steps may be performed in parallel.

In some implementations, for example, based on the user input, the method 2000 may jump directly to a decision point and/or step(s) corresponding to an appropriate input type. As an illustrative example, a user display may provide a user options for selection (e.g., input fields). The options may, for example, include: Purchase (e.g., YES/NO), Sample Feedback, Showcase Feedback, and/or Product Feedback.

Accordingly, various embodiments may, for example, advantageously update an RID, PID, SID, and/or SLT based on physical user interaction. Various implementation may advantageously, for example, correspond user reaction(s) in person with user reaction online (e.g., decision to view the product). Accordingly, various embodiments may, by way of example and not limitation, advantageously provide a technical solution to a technological problem of associating physical user interactions with online user interactions. Various implementation may, for example, advantageously solve a technical problem of testing a difference between user interaction in person to user interaction with a product online.

In some implementations, the method 2000 may, for example, be performed by one or more controllers (e.g., the server 112 of the O2O Management System 116 as disclosed at least with reference to FIG. 1, the controller 1855 of the UNGS 1850 as disclosed at least with reference to FIG. 18B).

Figure 21:
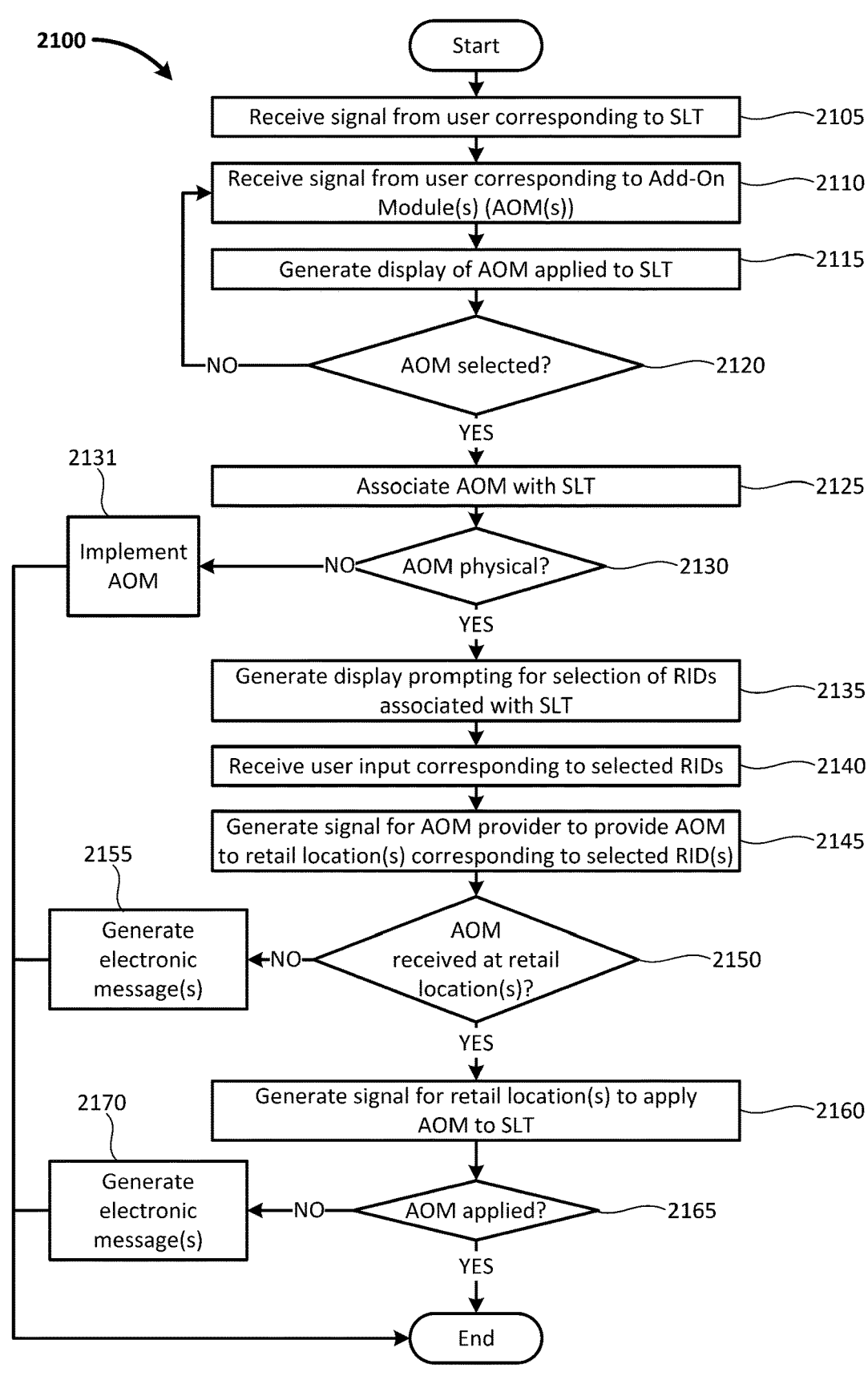
FIG. 21 is a flowchart depicting an exemplary method for applying add-on modules to virtual and/or physical show-cases.

FIG. 21 is a flowchart depicting an exemplary method for applying add-on modules to virtual and/or physical showcases. A method 2100 may, for example, be performed by a controller(s) (e.g., the server 112 of the O2O Management System 116 as disclosed at least with reference to FIG. 1). As depicted, the method 2100 begins when a signal is received, in a step 2105, corresponding to at least one SLT. A signal (e.g., a second signal, the same signal) is received from the user corresponding to one or more Add-On Module(s) (AOMs) in a step 2110. For example, the AOMs may be provided by a third party. The AOMs may, for example, be provided by the O2O Management System 116. In some implementations, the AOMs may, for example, be provided by a third party and displayed by the O2O Management System 116. For example, the signal received in the step 2110 may be generated by a user requesting AOMs matching user-defined criteria and/or eligible to be applied to the SLT. The signal may, for example, be generated by a user selecting a candidate AOM from a list of eligible AOMs.

In a step 2115, a display of the AOM is generated as applied to the SLT (e.g., a 'preview'). The display may, for example, show the AOM applied to a virtual view of the SLT. The display may, for example, depict a preview of the AOM applied to the SLT. In some implementations, a display may be generated predicting changes to metrics associated by applying the AOM (e.g., an advertising package AOM may be determined to have a potential to increase sales by 10%, a holiday display package AOM may be associated with a predicted increase of user interaction of 15%).

If the AOM is determined, in a decision point 2120, to be selected (e.g., confirmed), then the AOM is associated with the SLT (e.g., and an associated PID(s) and/or SID(s)) in a step 2125. Otherwise, the method 2100 returns to the step 2110.

If it is determined in a decision point 2130 that the AOM is not a physical modification (e.g., to the SLT), then the AOM (e.g., virtual AOM) is implemented in a step 2131. By way of example and not limitation, implementation may include generating a message to an AOM provider (e.g., that a subscription has been selected). In some examples, implementation may include connecting and/or configuring an application programming interface (API), applying and/or activating a payment gateway, providing access to and/or implementing source code and/or executables, or some combination thereof. In some implementations, the step 2131 may, for example, include generating a notification (e.g., electronic message). As an illustrative example, the step 2131 may, for example, include generating at least one trigger associated with the AOM and digitally attaching the AOM to a physical and/or virtual showcase (e.g., navigational framework coordinate(s), SLT(s), RID(s), PID(s), SID(s)). For example, the at least one trigger may cause a predetermined process and/or program to execute when a trigger event occurs associated with the physical and/or virtual showcase (e.g., a user interacts with a physical showcase, a user searches for a product, a user purchases a product).

Once the AOM is implemented in the step 2131, the method 2100 ends. Otherwise, in the depicted example, if the AOM is a physical modification, then a display is generated, in a step 2135, prompting for selection of RID(s) associated with the SLT. For example, the user may only want to apply a holiday décor AOM to selected locations (e.g., with historically high sales traffic during the upcoming event) but may not want to apply the AOM to every retail location in which a product is displayed. Input is received from the user, in a step 2140, corresponding to selected RIDs.

A signal is generated, in a step 2145, for the AOM provider to provide the AOM to the retail location(s) corresponding to the selected RID(s). For example, the signal may prompt the AOM provider to ship the AOM(s) to the retail location(s).

Once it is determined (e.g., by a message from the AOM provider, by tracking information, by a message from the retail location(s)), in a decision point 2150, that the AOM has been received at one or more of the selected retail location(s), then a signal is generated, in a step 2160 for the retail location(s) to apply the AOM(s) to the associated SLT(s). If it is determined, in the decision point 2150, that the AOM(s) has not been received at the retail location(s) (e.g., within a predetermined time), then an electronic message(s) is generated in a step 2155 (e.g., to the AOM provider, to the user who purchased the AOM, to the retail location(s), to a carrier contracting to deliver the AOM, to a warehouse responsible for shipping the AOM).

Once it is determined, in a decision point 2165, that the AOM has been applied, then the method 2100 ends. In some implementations, a notification(s) may, for example, be sent when the AOM is applied. In the depicted example, if it is determined, in the decision point 2165, that the AOM has not been applied (e.g., within a predetermined time frame, after receiving a confirmation of application from the retail location), then an electronic message(s) is generated in a step 2170 (e.g., to management for the retail location, to the user purchasing the AOM, to the AOM provider). In some implementations, by way of example and not limitation, it may be determined whether the AOM was applied based on showcase and/or sample monitoring (e.g., as disclosed at least with reference to FIGS. 8-12). In some implementations, by way of example and not limitation, it may be determined whether the AOM was applied based on shopper feedback. In some implementations, by way of example and not limitation, it may be determined whether the AOM was applied based on confirmation (e.g., an electronic message, a picture) received from the retail location(s).

In some implementations, the AOM may be searched by, previewed with, and/or associated with an RID, a SID, and/or a SLT (as depicted). For example, in some implementations, the AOM may be a discount code and/or advertising package (e.g., a popup modal in an online view) associated with a PID (e.g., irrespective of an SLT). In some implementations, the AOM may, by way of example and not limitation, including a programming module (e.g., a payment module). The AOM may, by way of example and not limitation, include connection and/or configuration module(s) (e.g., API connection, API instructions, API authorization code).

In some implementations, by way of example and not limitation, an AOM may be configured as a non-physical plug-in (e.g., programming, source code, data, API, online access). As an illustrative example, an AOM may be configured to, when active (e.g., applied), generate an online coupon code feature. In some implementations, an AOM may be configured to generate an email request for a customer satisfaction feedback module, for example. In some implementations, for example, an AOM may include a payment module configured to be activated when a PID of a showcase item is selected to enter a purchase process.

As an illustrative example, a merchant may sign up for a showcase in a 'bare bone' (basic) state. The basic state may include a basic package with no extra features and/or advanced module available. The basic package may, for example, only provide a basic payment system (e.g., allow an online payment method of transaction at a specific showcase, but not allow directly accepting credit cards or other checkout methods). In order to add desired features, the merchant may implement (e.g., subscribe to, purchase, activate) one or more AOM (e.g., non-physical source code implemented on a server(s)), such as a payment module including a credit cards payment module and/or an e-check module. With the new non-physical AOM, credit cards payment module on top of the basic payment module, the showcase may, for example, advantageously accept payments using any of multiple credit card companies.

As an illustrative example, a merchant may purchase an AOM (e.g., non-physical) coupon code generator. The AOM may be attached to a coordinate of a grid location in a navigational framework (e.g., corresponding to an SLT and/or physical showcase associated with the merchant and/or an associated product). In some examples, whatever item placed (e.g., shelved, hung) at that coordinate grid location may be covered by a coupon code (e.g., $50 OFF).

In some examples, an AOM may, for example, be implemented by one or more different methods. For example, staff (e.g., of the O2O Management System 116, a merchant, a user (merchant), a retail location) may select one or more navigation frameworks (e.g., at one or more different levels to associate with an AOM. In some examples, a user may attach an AOM to different layer of grids (e.g., [Layer1(X, Y,Z), Layer2(X,Y,Z), Layer3(r,θ,φ)]). In some examples, a user may narrow a selection for association with an AOM to a specific range (e.g., grid1:shelf6 to grid1:shelf15) to select a position for an AOM (e.g., physical, non-physical) placement. As an illustrative example, an O2O management team may select [Layer1(X,Y,Z),Layer2(X,Y,Z),Layer3(r,θ,φ)] for complimentary automatic discount (e.g., implemented as a non-physical AOM) in management fees for showcases at the above location during a specific holiday (e.g., Memorial Day in the USA). As a further illustrative example, the team may further, for example, select corresponding flag decorations (e.g., implemented as a physical AOM) for application to the selected showcases.

As an illustrative example, a user (e.g., merchant) may select a specific range (e.g., grid1:shelf6 to grid1:shelf15) for adding a celebration decoration (e.g., implemented as a physical AOM) and/or adding a non-physical AOM (e.g., by purchasing an automated customer appreciation mailing list generator). The illustrative mailing list generator may, by way of example and not limitation, be implemented as a non-physical AOM electronically attached to the above grid1:shelf6 to grid1:shelf15. The attachment may, for example, be implemented as metadata associating an AOM object (e.g., in a datastore) defining the AOM with an RID, SLT, or some combination thereof (e.g., stored in the same and/or a separate datastore). In this illustrative example, any item that falls within this grid position may be configured to trigger the allocated AOM(s) (physical and/or non-physical).

Various embodiments may advantageously provide customization of virtual and/or physical retail display environments. For example, a merchant may advantageously enable (e.g., subscribe to, purchase, activate) predetermined 'plugins' of functionality (e.g., a 'sweepstakes' module to automatically manage a (predetermined) sweepstakes promotion). AOMs may, for example, be digital (e.g., digital displays, digital shopping features, digital management features). AOMs may, for example, be physical (e.g., showcase décor, monitoring equipment such as the indicator module 870, display equipment such as the display 865). Various embodiments may advantageously provide a technical solution to a technological problem of enabling a remote merchant to manage and/or enhance sales activity and/or customer experience interacting with digital (e.g., virtual) and/or physical product displays.

Although various embodiments have been described with reference to the figures, other embodiments are possible. For example, a quality criterion may be time based (e.g., minimum amount of engagement time of a user). A quality criterion may, for example, be determined by one or more machine learning and/or artificial intelligence algorithms. For example, an algorithm may associate a specific type of sample and/or category of product with one or more criteria (e.g., based on training data). A criterion (e.g., a threshold) may be automatically adjusted, for example, based on a product category, based on a retail facility (e.g., average number of shoppers, shopper behavioral patterns), or some combination thereof. In some embodiments a criterion may, for example, be based on a datasheet (e.g., uploading thresholds from a spreadsheet).

In some embodiments, criterion may be based on interactions with users. Interactions may, by way of example and not limitation, include transactions, complaints, gestures, motions, behavior, touching, picking up a sample, talking, or some combination thereof.

In various embodiments, although an exemplary system has been described with reference to the figures, other implementations may be deployed in other industrial, scientific, medical, commercial, and/or residential applications.

In some embodiments, sample quality data may, for example, be collected at a point of purchase. For example, a customer may take a sample to a point of purchase to place an order (e.g., initiate a drop-shipping order). In some embodiments a point of purchase may, for example, include a customer using a (portable) computing device (e.g., smartphone) to capture at least one image of the sample (e.g., including a barcode) to initiate an order. Sample attributes may be collected during the scanning process. In some embodiments, for example, at least one image of the sample may be collected. For example, image(s) of the sample captured during the purchase process may be analyzed (e.g., by the image analysis module 965). Accordingly, various embodiments may generate and/or analyze a sample quality profile corresponding to a sample purchase. Various embodiments may advantageously monitor sample quality in response to customer purchase using a sample(s).

For example, in some embodiments, a method (e.g., such as disclosed at least with reference to FIG. 10) may include receiving a signal from a point of purchase such as in the step 1005. A sample quality profile may be generated (e.g., such as in the step 1045) in response to the data collected during the purchase step. The purchase step may, by way of example and not limitation, occur at a showcase (e.g., a customer taking a picture of a sample in the showcase). The purchase step may, for example, occur at a point of purchase external to the showcase (e.g., the sample may be carried to a register, the sample may be carried to a purchase counter). If a replacement criterion (e.g., a threshold) is reached (e.g., such as in the decision point 1050), a sample issuance signal may be generated associated with the sample (e.g., as in steps 1055 and 1060). Accordingly, a replacement sample may, for example, be shipped in response to a determination that a replacement threshold has been reached based on sample quality data captured at a point of purchase.

In various embodiments, one or more entities may, for example, take on different roles. In some embodiments, a role of retail spot provider, merchant, and/or product provider may, for example, be interchanged and/or combined. In an illustrative example, a merchant and a product provider may be a single entity. In some examples, a retail spot provider may be a same entity as a merchant and/or product provider (e.g., different individuals of a single company, same individual). In some embodiments, for example, a single entity may, for example, act as a retail spot provider, merchant, and/or product provider. Such embodiments may, for example, advantageously enable one or more entities to manage samples, retail displays, and/or retail operations across one or more internal facilities.

Various embodiments may, by way of example and not limitation, include one or more blockchains. A blockchain may, for example, be public (e.g., distributed). A blockchain may, for example, be private (e.g., managed by one or more central entities). In some embodiments, a product(s) may, for example, be registered on a blockchain (e.g., associated with a PID and/or a unique identifier such as a serial number). In some embodiments a sample may be registered on the blockchain. An SID associated with the sample (e.g., such as disclosed at least with reference to the depicted exemplary method 1000 and/or the depicted exemplary method 1100 of FIGS. 10-11) may, for example, be recorded on a blockchain. A controller (e.g., control circuit 915, processor 940, microprocessor 112A) may check a product (e.g., identified by a PID) against the blockchain. If the product is associated with a registered SID, the controller may not complete a sales transaction and/or may initiate a reimbursement transaction to a provider of the sample). Accordingly, various embodiments may advantageously track use of samples. Some embodiments may advantageously prevent free samples from being sold by unscrupulous entities (e.g., without reimbursing the sample provider).

In various embodiments, a sales ranking(s) may be maintained for one or more products. Increased sales transactions may correspond to a higher sales rank. For example, the product(s) may be ranked within at least one category.

In some embodiments one or more showcases may be (automatically) ranked. For example, a showcase may be ranked against other showcases. The showcases may, for example, be ranked within one or more categories. Categories may, by way of example and not limitation, be determined by showcase and/or product attributes. For example, attributes may include location, price, product type, physical showcase type (e.g., open space, shelf, floor display, wall display), or some combination thereof.

In some embodiments, ranking of showcases may be based on overall sales results. For example, a ranking may be based on a score of sample-generated revenue (e.g., number and/or value of units sold from one or more particular samples in the showcase). A ranking may, for example, be based on popularity of the showcase (e.g., based on a number of visitors and/or physical interaction with sample(s) in the showcase, such as disclosed at least with reference to FIGS. 8-10). A ranking may, for example, be based on an appearance of the showcase (e.g., based on a design of the showcase and/or product, overall attributes in appearance, appearance score based on third party review). Some embodiments may include a ranking(s) by audience (e.g., merchant feedback, shopper feedback, physical retail location personnel feedback, product provider feedback). Some embodiments may include a ranking by physical interaction.

In various embodiments, a score of all showcases evaluated may be compared and associated rank numbers assigned. In an exemplary illustration, in a score based at least partially on sales associated with a given sample (e.g., SID #2455), a baby gear showcase (e.g., RID #131) may generate sales of $35,000 per month. A baby gear showcase (e.g., RID #215) may generate $10,000 per month. In a ranking system RID #131 may be assigned first place, and RID #215 may be assigned second place.

In various embodiments, a ranking may be based on multiple attributes. For example, a ranking may be based at least partially a sales rank of a particular sample from third party ecommerce results. A reputable and/or strong credibility third party sales rank score of each product may, for example, be included in a scoring algorithm. The third-party sales rank score may, for example, be retrieved from one or more sources (e.g., other commerce platforms, sales aggregation source).

In an exemplary illustration, a score for sample sales for the baby gear showcase RID #131 may generates sales of $35,000 per month, and the baby gear showcase RID #215 may generate $10,000 per month. A score for one or more other attributes (i.e., appearance, user feedback, each product sales rank from other third party) the baby gear showcase RID #131 may be given a score of 2.5/5.0 per time frame. The baby gear showcase RID #215 may be given another attributes score of 5.0/5.0 per time frame. A sales ranking assigned as a function of the sales score and other attributes score (e.g., sum, weighted sum, weighted average) may assign the baby gear showcase RID #215 as FIRST rank and the baby gear showcase RID #131 as SECOND rank. For example, even though the RID #215 may generate less sales than the RID #131, other attributes may rank the RID #215 first. Such embodiments may, for example, advantageously reduce reliance on market size (e.g., RID #215 may have better results for the market, even though it is not currently generating the most sales). Such embodiments may, for example, advantageously more accurately predict future performance (e.g., RID #215 may be poised to surpass #131 in sales due to the better appearance, better interaction rate, or some combination thereof).

In various embodiments, showcases may, by way of example and not limitation, be compared. For example, a display may be generated comparing multiple showcases. The showcase may, for example, be user selected for comparison. In some embodiments the showcases may be automatically selected for comparison based on one or more attributes. In an exemplary illustration, five ornament showcases may each have four ornament samples. Each showcase may, for example, be designed with a different theme. The system may, for example, allow an audience to compare showcases (e.g., on a computing device such as a personal computer, mobile app). Comparison may, for example, be performed based on one or more attributes. Attributes may include, for example, size, weight, other (reputable) third party sales rank (e.g., on another commerce platform), appearance, or some combination thereof. Comparison may, for example, be in terms of overall sales generated. Accordingly, various embodiments may advantageously allow users to compare showcases. Users may, for example, include merchants, product providers, retail providers, warehouses, or some combination thereof.

Various embodiments may, for example, be configured to generate a display based on a showcase layout template and/or sample quality profile. For example, a display may be generated for a user to visualize how a showcase and/or sample should look. A staff member (e.g., of a retail facility)

may, for example, carry a portable display (e.g., portable computing device such as smartphone, tablet, laptop). The staff member may, for example, enter an RID associated with a showcase. The staff member may, for example, enter an SID and/or PID associated with sample(s) in the showcase. For example, the staff member may scan a code on the showcase to enter the RID. The staff member may scan a code on the sample(s) to enter the SID(s) and/or PID(s). In some embodiments the staff member may bring the portable display in proximity to the showcase and/or sample(s) to communicate via RFID and/or NFC to receive an associated code. A showcase layout template (SLT) and/or sample quality profile (SQP) associated with the RID, SID(s), and/or PID(s) may be retrieved. A display may be generated in response to the SLT and/or SQP. The staff member may advantageously configure the showcase and/or associated sample(s) to match the display. The staff member may, for example, capture an image of the display to document the result (e.g., a properly configured showcase and/or sample(s)).

In some embodiments an interactive display may be generated. For example, the showcase may be operated into an active monitoring mode. In the monitoring mode, information as to a current state of the showcase and/or associated sample(s) may be retrieved (e.g., by the first sensor 815). The display may be updated (e.g., continuously, periodically) based on the information retrieved. For example, an indication(s) may be generated for the staff member to see an ongoing change in the actual showcase as compared to the SLT and/or SQP. In some embodiments an indication(s) of further required changes may be provided on the display (e.g., arrow(s) to indicate motion, overlay of the prescribed configuration on the actual current configuration). In some embodiments the interactive display may be generated based on input from the user. For example, the user may capture an image of the current showcase and/or sample configuration. A display may be generated accordingly. The user may make adjustments and capture another image. An updated display may be generated accordingly. Various embodiments may advantageously guide a user in configuring a showcase and/or sample(s). In some embodiments a notification(s) may be generated when a prescribed configuration is reached (e.g., the current state of the showcase and/or samples matches the SLT and/or SQP(s)).

In various embodiments, multiple control templates (e.g., SLTs, SLRTs) may be provided for a showcase. For example, an SLRT may be defined for a showcase. A status reference template (SRT) may be periodically generated corresponding to a current status of the showcase. For example, the SRT may be generated daily. In some embodiments the SRT may be generated weekly. In some embodiments the SRT may be generated quarterly. The status reference template may be compared to the SLRT. A first SRT may, for example, be generated based on an original product setup according to the SLRT, in various embodiments, one or more SRTs may deviate from the SLRT. One or more SRTs deviating from the SLRT may, for example, be reviewed for acceptance (e.g., automatically based on a machine learning model, manually, or some combination thereof). An approved SRT may, for example, be associated with the SLRT and/or the showcase. Future SRTs may, for example, be compared to the SLRT and/or previous approved SRTs. Deviation of future SRTs may, for example, be determined with respect to the SLRT and/or previous approved SRTs.

In some embodiments a machine learning model may be trained using the SLRT and previous approved SRTs. The machine learning model may be applied to a current configuration of the showcase and/or samples. The machine learning model may generate a suggestion of acceptability of the current configuration. For example, if the current configuration matches the SLRT and/or a previous approved SRT, the current configuration may be determined to be acceptable. If the current configuration does not match an SLRT or previous approved SRT, but the model generates a suggestion of acceptability, the configuration may be submitted for review. In some embodiments, if the suggestion is above a predetermined confidence threshold, the suggestion may be automatically approved. Various embodiments may advantageously reduce false alarms. For example, an original SLRT may define an angle of 45 degrees for a sample with respect to a reference plane. However, it may be determined, based on approved SRTs, that 30-53 degrees is acceptable. Such embodiments may, for example, advantageously generate a range of acceptable configurations without requiring manual input of the acceptable range(s). In some embodiments a reset input may be provided to restore a previous (e.g., master, original) SRLT and/or to remove one or more previously accepted SRTs.

in some embodiments a permitted user for an SLRT and/or a reviewer of acceptability with respect to a current configuration may be a third party. For example, a responsible party (e.g., a merchant) for a showcase display may delegate routine monitoring to a third party. Some such embodiments may, for example, provide appropriate messages and/or notifications to the third party based on preferences of the responsible party.

In some examples, a 'criterion' may include one or more criterion. A criterion may, for example, include a threshold. A criterion may, for example, include a dynamic threshold. A criterion may, for example, include a predetermined threshold. A criterion may, for example, include a weighting. In some implementations, a criterion may, for example, include a negative criterion. For example, a predetermined criterion may include not meeting a specific target (e.g., 'meet a predetermined criterion' may be configured to be satisfied when a limit is not met).

In various embodiments, some bypass circuits implementations may be controlled in response to signals from analog or digital components, which may be discrete, integrated, or a combination of each. Some embodiments may include programmed, programmable devices, or some combination thereof (e.g., PLAs, PLDs, ASICs, microcontroller, microprocessor), and may include one or more data stores (e.g., cell, register, block, page) that provide single or multi-level digital data storage capability, and which may be volatile, non-volatile, or some combination thereof. Some control functions may be implemented in hardware, software, firmware, or a combination of any of them.

Computer program products may contain a set of instructions that, when executed by a processor device, cause the processor to perform prescribed functions. These functions may be performed in conjunction with controlled devices in operable communication with the processor. Computer program products, which may include software, may be stored in a data store tangibly embedded on a storage medium, such as an electronic, magnetic, or rotating storage device, and may be fixed or removable (e.g., hard disk, floppy disk, thumb drive, CD, DVD).

Although an example of a system, which may be portable, has been described with reference to the above figures, other implementations may be deployed in other processing applications, such as desktop and networked environments.

Temporary auxiliary energy inputs may be received, for example, from chargeable or single use batteries, which may enable use in portable or remote applications. Some embodiments may operate with other DC voltage sources, such as a 9V (nominal) battery, for example. Alternating current (AC) inputs, which may be provided, for example from a 50/60 Hz power port, or from a portable electric generator, may be received via a rectifier and appropriate scaling. Provision for AC (e.g., sine wave, square wave, triangular wave) inputs may include a line frequency transformer to provide voltage step-up, voltage step-down, and/or isolation.

Although particular features of an architecture have been described, other features may be incorporated to improve performance. For example, caching (e.g., L1, L2, . . . ) techniques may be used. Random access memory may be included, for example, to provide scratch pad memory and or to load executable code or parameter information stored for use during runtime operations. Other hardware and software may be provided to perform operations, such as network or other communications using one or more protocols, wireless (e.g., infrared) communications, stored operational energy and power supplies (e.g., batteries), switching and/or linear power supply circuits, software maintenance (e.g., self-test, upgrades), and the like. One or more communication interfaces may be provided in support of data storage and related operations.

Some systems may be implemented as a computer system that can be used with various implementations. For example, various implementations may include digital circuitry, analog circuitry, computer hardware, firmware, software, or combinations thereof. Apparatus can be implemented in a computer program product tangibly embodied in an information carrier, e.g., in a machine-readable storage device, for execution by a programmable processor; and methods can be performed by a programmable processor executing a program of instructions to perform functions of various embodiments by operating on input data and generating an output. Various embodiments can be implemented advantageously in one or more computer programs that are executable on a programmable system including at least one programmable processor coupled to receive data and instructions from, and to transmit data and instructions to, a data storage system, at least one input device, and/or at least one output device. A computer program is a set of instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other unit suitable for use in a computing environment.

Suitable processors for the execution of a program of instructions include, by way of example, both general and special purpose microprocessors, which may include a single processor or one of multiple processors of any kind of computer. Generally, a processor will receive instructions and data from a read-only memory or a random-access memory or both. The essential elements of a computer are a processor for executing instructions and one or more memories for storing instructions and data. Generally, a computer will also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including, by way of example, semiconductor memory devices, such as EPROM, EEPROM, and flash memory devices; magnetic disks, such as internal hard disks and removable disks; magneto-optical disks; and CD-ROM and DVD-ROM disks. The processor and the memory can be supplemented by, or incorporated in, ASICs (application-specific integrated circuits).

In some implementations, each system may be programmed with the same or similar information and/or initialized with substantially identical information stored in volatile and/or non-volatile memory. For example, one data interface may be configured to perform auto configuration, auto download, and/or auto update functions when coupled to an appropriate host device, such as a desktop computer or a server.

In some implementations, one or more user-interface features may be custom configured to perform specific functions. Various embodiments may be implemented in a computer system that includes a graphical user interface and/or an Internet browser. To provide for interaction with a user, some implementations may be implemented on a computer having a display device, such as a CRT (cathode ray tube) or LCD (liquid crystal display) monitor for displaying information to the user, a keyboard, and a pointing device, such as a mouse or a trackball by which the user can provide input to the computer.

In various implementations, the system may communicate using suitable communication methods, equipment, and techniques. For example, the system may communicate with compatible devices (e.g., devices capable of transferring data to and/or from the system) using point-to-point communication in which a message is transported directly from the source to the receiver over a dedicated physical link (e.g., fiber optic link, point-to-point wiring, daisy-chain). The components of the system may exchange information by any form or medium of analog or digital data communication, including packet-based messages on a communication network. Examples of communication networks include, e.g., a LAN (local area network), a WAN (wide area network), MAN (metropolitan area network), wireless and/or optical networks, the computers and networks forming the Internet, or some combination thereof. Other implementations may transport messages by broadcasting to all or substantially all devices that are coupled together by a communication network, for example, by using omni-directional radio frequency (RF) signals. Still other implementations may transport messages characterized by high directivity, such as RF signals transmitted using directional (i.e., narrow beam) antennas or infrared signals that may optionally be used with focusing optics. Still other implementations are possible using appropriate interfaces and protocols such as, by way of example and not intended to be limiting, USB 2.0, Firewire, ATA/IDE, RS-232, RS-422, RS-485, 802.11 a/b/g, Wi-Fi, Ethernet, IrDA, FDDI (fiber distributed data interface), token-ring networks, multiplexing techniques based on frequency, time, or code division, or some combination thereof. Some implementations may optionally incorporate features such as error checking and correction (ECC) for data integrity, or security measures, such as encryption (e.g., WEP) and password protection.

In various embodiments, the computer system may include Internet of Things (IoT) devices. IoT devices may include objects embedded with electronics, software, sensors, actuators, and network connectivity which enable these objects to collect and exchange data. IoT devices may be in-use with wired or wireless devices by sending data through an interface to another device. IoT devices may collect useful data and then autonomously flow the data between other devices.

Various examples of modules may be implemented using circuitry, including various electronic hardware. By way of example and not limitation, the hardware may include transistors, resistors, capacitors, switches, integrated circuits, other modules, or some combination thereof. In various examples, the modules may include analog logic, digital logic, discrete components, traces and/or memory circuits fabricated on a silicon substrate including various integrated circuits (e.g., FPGAs, ASICs), or some combination thereof. In some embodiments, the module(s) may involve execution of preprogrammed instructions, software executed by a processor, or some combination thereof. For example, various modules may involve both hardware and software.

In an exemplary aspect, a computer system may include a processor; and, a memory operably coupled to the processor and including computer readable instructions that, when executed by the processor, cause the processor to perform operations to dynamically manage a public display space, the operations comprising. The operations may include, in response to receiving a signal from a user device identifying at least one portion of a physical retail location as a target for application of a predetermined add-on module (AOM) selected from at least one datastore of available AOMs, perform AOM preview operations. The AOM preview operations may include retrieve at least one showcase layout template (SLT) associated with the at least one portion of the physical retail location. The AOM preview operations may include retrieve, by the processor, an AOM object defining attributes of the AOM. The AOM preview operations may include generate, based on the AOM object and the at least one SLT, a preview signal configured to cause the user device to display a visual preview of the at least one SLT with the predetermined AOM applied. The operations may include, in response to receiving a confirmation signal from the user device, generate an association between the at least one SLT and the AOM object. The operations may include generate an application signal configured to cause the predetermined AOM to be applied to the at least one SLT.

The operations may include determine, based on the AOM object, whether the predetermined AOM is a virtual AOM. In response to determining the predetermined AOM is a virtual AOM, the application signal may cause predetermined AOM instructions to be automatically executed in response to at least one predetermined trigger associated with the at least one SLT.

The operations may include determine, based on the AOM object, whether the predetermined AOM is a physical AOM. In response to determining the predetermined AOM is a physical AOM, the application signal may cause physical implementation operations to be performed. The physical implementation operations may include generate an implementation signal configured to cause an AOM provider to physically provide the predetermined AOM to at least one retail location, each at least one retail location corresponding to a predetermined retail identifier (RID). The physical implementation operations may include determine, from a selection signal received from the user device, the at least one retail location to be associated with the predetermined AOM. The physical implementation operations may include generate an application signal for each at least one retail location as a function of the AOM object and the at least one SLT. The physical implementation operations may include, when a confirmation signal is not received from each of the at least one retail location confirming that the AOM has been received and applied, then generate an error signal to notify at least one predetermined user that the predetermined AOM has not been physically applied to the at least one retail location from which no confirmation signal has been received.

The predetermined AOM may include a digital display. The predetermined AOM may include a dynamic display in at least one showcase at the at least one retail location. The predetermined AOM may include a popup notification when a shopping user accesses a digital display corresponding to the at least one SLT.

The predetermined AOM may include a digital process. The predetermined AOM may include digital advertising.

The predetermined AOM may include a physical modification to at least one physical showcase corresponding to the at least one SLT. The predetermined AOM may include décor. The predetermined AOM may include hardware.

In an exemplary aspect, a computer-implemented method may be performed by at least one processor to dynamically manage quality of a sample in a public display space. The method may include generate a sample quality profile in response to a sample update signal originating from a physical location corresponding to a unique retail identifier (RID), the sample update signal corresponding to a unique first sample identifier (SID1) associated with a unique sample of a product identified by a product identifier (PID) and matched with the RID. The sample update signal may include data from at least one sensor configured to detect at least one physical attribute corresponding to the sample such that the data corresponds to the at least one physical attribute. The sample quality profile may correlate the data corresponding to the at least one physical attribute with at least one metric of sample quality. The method may include retrieve, from a product attributes data store, at least one predetermined minimum quality criterion corresponding to at least one of the PID, the SID1, and the RID. The method may include compare the at least one metric of sample quality to the at least one predetermined minimum quality criterion. The method may include, based upon the comparison, if the at least one metric of sample quality does not meet the at least one predetermined minimum quality criterion, then generate a sample request signal corresponding to a request for a new sample.

In an exemplary aspect, a computer program product may include a program of instructions tangibly embodied on a computer readable medium. When the instructions are executed on a processor, the processor may cause operations to be performed to dynamically manage quality of a sample in a public display space. The operations may include generate a sample quality profile in response to a sample update signal originating from a physical location corresponding to a unique retail identifier (RID), the sample update signal corresponding to a unique first sample identifier (SID1) associated with a unique sample of a product identified by a product identifier (PID) and matched with the RID. The sample update signal may include data from at least one sensor configured to detect at least one physical attribute corresponding to the sample such that the data corresponds to the at least one physical attribute. The sample quality profile correlates the data corresponding to the at least one physical attribute with at least one metric of sample quality. The operations may include retrieve, from a product attributes data store, at least one predetermined minimum quality criterion corresponding to at least one of the PID, the SID1, and the RID. The operations may include compare the at least one metric of sample quality to the at least one predetermined minimum quality criterion. The operations may include based upon the comparison, if the at least one metric of sample quality does not meet the at least one predetermined minimum quality criterion, then generate a sample request signal corresponding to a request for a new sample. The operations may include, in response to the sample request signal, generate a new sample product identifier (SID2) unique from the SID1 and corresponding to the PID and the RID, the SID2 associated with a new product representing the PID to be transported to the physical location associated with the RID for display in place of the sample corresponding to the SID1.

The at least one sensor may include a camera. The operations may further include image analysis operations.

The operations may further include generate a sample display profile in response to a second sample update signal originating from the physical location corresponding to the RID and corresponding to the SID2. The second sample update signal may include new data from at least one second sensor configured to detect at least one second physical attribute corresponding to the new sample such that the new data corresponds to the at least one second physical attribute.

The at least one second sensor may be the at least one sensor. The at least one second physical attribute may be the at least one physical attribute.

In an exemplary aspect, a computer system may include a processor, and a memory operably coupled to the processor and including computer readable instructions that, when executed by the processor, cause the processor to perform operations to dynamically manage quality of a sample in a public display space. The operations may include generate a sample quality profile in response to a sample update signal originating from a physical location corresponding to a unique retail identifier (RID), the sample update signal corresponding to a unique first sample identifier (SID1) associated with a unique sample of a product identified by a product identifier (PID) and matched with the RID. The sample update signal may include data from at least one sensor configured to detect at least one physical attribute corresponding to the sample such that the data corresponds to the at least one physical attribute. The sample quality profile may correlate the data corresponding to the at least one physical attribute with at least one metric of sample quality. The operations may include retrieve, from a product attributes data store, at least one predetermined minimum quality criterion corresponding to at least one of the PID, the SID1, and the RID. The operations may include compare the at least one metric of sample quality to the at least one predetermined minimum quality criterion. The operations may include, based upon the comparison, if the at least one metric of sample quality does not meet the at least one predetermined minimum quality criterion, then generate a sample request signal corresponding to a request for a new sample.

The physical location may include a product showcase configured to receive the unique sample for display. The physical location may include a point of purchase.

The operations may include, in response to the sample request signal, generate a new sample product identifier (SID2) unique from the SID1 and corresponding to the PID and the RID, the SID2 associated with a new product representing the PID to be transported to the physical location associated with the RID for display in place of the sample corresponding to the SID1.

The operations may include determine, in response to a second sample update signal originating from a second physical location corresponding to a second unique retail identifier (RID2) and associated with the SID2, whether the RID2 corresponds to the RID. The operations may include if the RID2 does not correspond to the RID, then generate an electronic message indicating that the sample corresponding to the SID2 has been conveyed to a wrong physical location.

The operations may include generate a sample display profile in response to a second sample update signal originating from the physical location corresponding to the RID and corresponding to the SID1. The second sample update signal may include new data from at least one second sensor configured to detect at least one second physical attribute corresponding to the new sample such that the new data corresponds to the at least one second physical attribute. The at least one second sensor may be the at least one sensor. The at least one second physical attribute may be the at least one physical attribute. The at least one second physical attribute may include presence of the new sample in the physical location.

The new sample may require assembly before being displayed. The at least one second physical attribute may include a plurality of spatial representations of the new sample. The operations may include generate a sample geometry profile based on the plurality of spatial representations. The operations may include retrieve a product geometry profile corresponding to the PID. The operations may include determine of the sample geometry profile matches the product geometry profile. The operations may include, if the sample geometry profile does not match the product geometry profile, generate at least one electronic message indicating that the new sample may have been incorrectly assembled.

The at least one sensor may include a camera. The operations may include image analysis operations. The camera may be operated during a purchase event to capture at least one image of an identifier corresponding to the unique sample, the at least one image further including at least a portion of the unique sample. The image analysis operations may be configured such that a metric of sample quality is generated from the at least one image. The at least one metric of sample quality may include customers viewing the sample. The at least one predetermined minimum quality criterion may include a minimum level of customers viewing the sample. The image analysis operations may include determine a viewing angle of a user. The image analysis operations may include determine if the viewing angle corresponds to the user viewing the sample. The image analysis operations may include, if the viewing angle corresponds to the user viewing the sample, then increase the metric of customers viewing the sample. The at least one metric of sample quality may include sentiment of customers viewing the sample. The at least one predetermined minimum quality criterion may include a minimum level of customers viewing the sample with positive sentiment. The image analysis operations may further include determine if a sentiment of the user is positive when the viewing angle corresponds to the user viewing the sample. The image analysis operations may further include, if the sentiment of the user when the viewing angle corresponds to the user viewing the sample is positive, increase the metric of customers viewing the sample with positive sentiment.

The at least one sensor may include a motion sensor and the at least one physical attribute comprises motion of the sample. The at least one predetermined minimum quality criterion may include a minimum motion per unit time.

In an exemplary aspect, a computer system may include a processor, and a memory operably coupled to the processor and including computer readable instructions that, when executed by the processor, cause the processor to perform operations to dynamically manage a sample in a public display space. The operations may include generate a sample quality profile in response to a sample update signal originating from a physical location corresponding to a unique retail identifier (RID). The sample update signal may correspond to a unique first sample identifier (SID1) associated with a unique sample of a product identified by a product identifier (PID) and matched with the RID. The sample update signal may include data from at least one sensor configured to detect at least one physical attribute corresponding to the sample such that the data corresponds to the at least one physical attribute. The sample quality profile may correlate the data corresponding to the at least one physical attribute with at least one metric of sample quality. The operations may include retrieve, from a product attributes data store. At least one predetermined minimum quality criterion may correspond to at least one of the PID, the SID1, and the RID. The operations may include compare the at least one metric of sample quality to the at least one predetermined minimum quality criterion. The operations may include, based upon the comparison, if the at least one metric of sample quality does not meet the at least one predetermined minimum quality criterion, then generate a maintenance signal configured to generate a display corresponding to the at least one predetermined minimum quality criterion and the at least one physical attribute.

The display may include a visual representation of the sample corresponding to the at least one sensor. The display may include a visual representation corresponding to the at least one predetermined minimum quality criterion of the at least one physical attribute. The operations may include retrieve a showcase layout template (SLT) corresponding to the RID. The operations may include compare the SLT to at least one physical showcase attribute of the public display space. The at least one physical showcase attribute may be represented in the sample update signal. The operations may include generate, in response to determining that the at least one physical showcase attribute does not match the SLT, a showcase maintenance signal configured to generate a second display. The second display may comprise a visual representation of the at least one physical showcase attribute of the public display space based on the sample update signal. The second display may include a visual representation of the at least one physical showcase attribute based on the SLT. The second display may be included in the first display.

The operations may include retrieve a showcase layout template (SLT) corresponding to the RID. The operations may include compare the SLT to at least one physical showcase attribute of the public display space. The at least one physical showcase attribute may be represented in the sample update signal. The operations may include generate, in response to determining, based on the comparison, that a foreign object is present in the public display space, a removal signal configured to generate a notification. The notification may include an indication of an identity of the public display space and an indication of the foreign object.

In an illustrative aspect, a computer system may include a processor and a memory operably coupled to the processor and including computer readable instructions that, when executed by the processor, cause the processor to perform operations to dynamically manage a sample in a public display space. The operations may include generate a sample quality profile in response to a sample update signal originating from a physical location corresponding to a unique retail identifier (RID). The sample update signal may correspond to a unique first sample identifier (SID1) associated with a unique sample of a product identified by a product identifier (PID) and matched with the RID. The sample update signal may include data corresponding to at least one physical attribute of the sample. The sample quality profile may correlate the data corresponding to the at least one physical attribute with at least one metric of sample quality. The operations may include retrieve at least one predetermined quality criterion corresponding to at least one of the PID, the SID1, and the RID. The operations may include compare the at least one metric of sample quality to the at least one predetermined quality criterion. The operations may include, based upon the comparison, if the at least one metric of sample quality does not correspond to the at least one predetermined quality criterion, then generate an electronic message.

In an exemplary aspect, a computer system may include a processor; and, a memory operably coupled to the processor and including computer readable instructions that, when executed by the processor, cause the processor to perform operations to dynamically manage a sample in a public display space. The operations may include generate a sample quality profile in response to a sample update signal originating from a physical location corresponding to a unique retail identifier (RID), the sample update signal corresponding to a unique first sample identifier (SID1) associated with a unique sample of a product identified by a product identifier (PID) and matched with the RID. The sample update signal may include data corresponding to at least one physical attribute of the sample. The sample quality profile may correlate the data corresponding to the at least one physical attribute with at least one metric of sample quality. The operations may include retrieve at least one predetermined quality criterion corresponding to at least one of the PID, the SID1, and the RID. The operations may include compare the at least one metric of sample quality to the at least one predetermined quality criterion. The operations may include, based upon the comparison, if the at least one metric of sample quality does not correspond to the at least one predetermined quality criterion, then generate an electronic message.

In an exemplary aspect, a computer system may include a processor; and, a memory operably coupled to the processor and including computer readable instructions that, when executed by the processor, cause the processor to perform operations to dynamically manage a sample in a public display space. The operations may include receive a signal corresponding a request from a user for an available physical shared showcase, the signal further include an indication of a product identifier (PID). The operations may include, in response to receiving the signal, determine a first showcase layout template (SLT) having a predetermined association with a physical showcase associated with a physical location corresponding to a unique retail identifier (RID), the determination based at least on physical space available at the physical showcase for dimensions associated with the PID, and on an association of the PID with at least one second PID (PID2), the PID2 being already associated with the SLT based on physical presence of a corresponding physical product at the physical showcase. The operations may include generate, based on the SLT and the at least one PID2, a signal configured to cause a display to be provided to the user indicating at least one location available on the physical showcase for the PID. The operations may include, in response to receiving user input corresponding to a selection of a first location from the at least one location, generate a signal configured to cause an updated display to be provided to the user of the physical showcase including a visual display of the product in the first location within the physical showcase. The operations may include update the first SLT to include the PID and associate the first SLT with the RID.

The operations may include, in response to receiving a signal to issue a physical sample for display in the physical showcase, perform sample provision operations. The sample provision operations may include generate a new sample product identifier (SID) corresponding to the PID and the RID. The sample provision operations may include associate the SID with a new physical product representing the PID to be transported to the physical location associated with the RID for display according to the SLT.

Determine a first SLT may include determining a plurality of SLTs corresponding to multiple physical showcases. The operations may include generate a signal configured to cause a display to be generated to the user of the plurality of SLTs. The operations may include receive a signal corresponding to a selection, from the user, of the first SLT selected from the at least one SLT.

In an exemplary aspect, a computer system may include a processor; and, a memory operably coupled to the processor and including computer readable instructions that, when executed by the processor, cause the processor to perform operations to dynamically manage a sample in a public display space. The operations may include, in response to receiving a signal corresponding to input from a first user corresponding to a physical layout of a showcase, generate a showcase layout template (SLT) associated with the physical layout. The operations may include associate the SLT with a product identifier (PID) corresponding to a product to be displayed in a corresponding physical showcase. The operations may include associate the SLT with a retail identifier (RID) corresponding to a physical location for displaying the product associated with the SLT. The operations may include, in response to receiving a lock signal corresponding to the first user locking the SLT to further changes, generate a showcase layout reference template (SLRT) and associate the SLRT with at least one predetermined permission, the at least one predetermined permission including at least one association with an authorizing user permitted to authorize changes to the SLRT. The operations may include, in response to receiving, from a second user, a proposed change to the SLRT, determine if the second user is associated with the at least one predetermined permission. The operations may include, when the second user is not associated with the at least one predetermined permission, then generate an electronic message notifying the authorizing user of rejection of the proposed change.

The operations may include, when the second user is associated with the at least one predetermined permission, then generate an updated SLRT implementing the proposed change.

The operations may include, in response to receiving a signal corresponding to a current state of the physical showcase associated with the SLRT, then determine, based on the signal whether a current layout of the physical showcase matches a planned physical layout defined by the SLRT. The operations may include, when the current layout of the physical showcase does not match the planned physical layout defined by the SLRT, then generate an electronic message configured to notify at least one person to correct the physical showcase to match the SLRT.

In an exemplary aspect, a computer system may include a processor; and, a memory operably coupled to the processor and including computer readable instructions that, when executed by the processor, cause the processor to perform operations to dynamically manage a sample in a public display space. The operations may include, in response to receiving sales data corresponding to a product identifier (PID), the PID corresponding to a physical product, determine physical locations of sales corresponding to the PID. The operations may include determine at least one sales concentration region exceed a predetermined sales threshold, the at least one sales concentration region corresponding to a geographical region. The operations may include determine at least one retail identifier (RID) associated with a physical retail location within the at least one sales concentration region. The operations may include perform sample provision operations comprising. The operations may include generate a new sample product identifier (SID) corresponding to the PID and the RID. The operations may include associate the SID with a new physical product representing the PID to be transported to the physical location associated with the RID for physical display at the RID.

The operations may include determine whether an active SID is associated with the RID. The operations may include, when an active SID is associated with the RID, then determine whether a sample to sales ratio meets at least one predetermined criterion. The sample provision operations may be performed when the sample to sales ratio is in a first state in comparison to the at least one predetermined criterion.

The operations may include determine whether a physical sample corresponding to an active SID associated with the RID meets a predetermined sample quality criterion. The operations may include, when the physical sample is in a first state in comparison to the predetermined sample quality criterion, then perform the sample provision operations.

In an exemplary aspect, a computer system may include a processor; and, a memory operably coupled to the processor and including computer readable instructions that, when executed by the processor, cause the processor to perform operations to dynamically manage a sample in a public display space. The operations may include, in response to receiving a signal identifying a product identifier (PID) corresponding to a physical product a user wishes to physically interact with, determine, based on input from the user, a target geographical region. The operations may include retrieve a retail identifier (RID) associated with a physical retail facility associated with the PID and associated with an active sample identifier (SID) corresponding to a physical sample of the physical product on display at the physical retail facility. The operations may include generate a first display signal configured to generate a first navigational display for display to the user, the first display signal generated based on a current physical location of the user and a location of the physical retail facility. The operations may include, in response to a signal corresponding to arrival of the user at the physical retail facility, generate a second display signal configured to generate a second navigational display for display to the user, the second display signal generated based at least on coordinates associated with the SID in at least one navigational framework (NFW) associated with the RID.

The operations may include update the second display signal to generate an updated display based on a signal corresponding to a location of the user within the physical retail facility. The second display signal may be generated based on at least one showcase layout template (SLT) associated with the RID and the PID. The operations may include generate a third display signal configured to provide the user a prompt for input. The prompt for input may correspond to an offer to purchase a physical product associated with the PID. The prompt for input may correspond to a request for feedback on the physical sample associated with the SID. The prompt for input may correspond to a request for feedback on a showcase associated with a showcase layout template (SLT) associated with the RID and the PID. The prompt for input may correspond to a request for feedback on the physical product associated with the PID. The prompt for input may correspond to a suggestion to share at least one image of the physical product. The operations may include update, based on the at least one image, a quality metric of at least one of: the SID, and a showcase layout template (SLT) associated with the RID and the PID.

The operations may include generate a product suggestion corresponding to a second PID (PID2), the PID2 selected at least based on the location of the physical retail facility. The PID2 may be selected based on an association between the PID and the PID2. The PID2 may be selected based on an active sample associated with the PID2 being associated with the RID such that the user may physically interact with a second physical product associated with the PID2. The operations may include generate a third display signal configured to navigate the user to the PID2.

The second navigational display may include an intra-location navigation display.

A predetermined add-on module (AOM) may be associated, in a datastore, with the coordinates in the at least one NFW. At least one predetermined action may be associated with the predetermined AOM and the coordinates in the at least one NFW. The operations may include, in response to the signal corresponding to arrival of the user, execute the at least one predetermined action based on the predetermined AOM.

The at least one NFW may be associated, in a datastore, with at least one predetermined attribute of at least one of: at least one associated SLT, and at least one associated add-on module (AOM).

A number of implementations have been described. Nevertheless, it will be understood that various modifications may be made. For example, advantageous results may be achieved if the steps of the disclosed techniques were performed in a different sequence, or if components of the disclosed systems were combined in a different manner, or if the components were supplemented with other components. Accordingly, other implementations are contemplated within the scope of the following claims.

What is claimed is:

1. A computer system comprising:

a processor; and, a memory operably coupled to the processor and including computer readable instructions that, when executed by the processor, cause the processor to perform operations to provide dynamic visualization of allocation of a public display space, the operations comprising:

in response to receiving a signal corresponding to a request from a device of a user for available physical space associated with a physical retail facility corresponding to a unique retail identifier (RID), determine a showcase layout template (SLT) having a predetermined association with a physical location at the physical retail facility, the determination based at least on physical space available to associate with a physical showcase;

retrieve a navigational framework (NFW) associated with the physical location;

generate, based on the SLT and the NEW, and transmit to the device of the user, a signal configured to generate a visual display of the NEW corresponding to the physical location available; and, in response to receiving, from the device of the user, a signal indicating a selection of coordinates in the NEW corresponding to a selection by the user of at least a portion of the physical space available in the physical location, associate in at least one datastore the selected coordinates in the NEW, the user, the SLT, and the RID, the operations further comprising:

in response to receiving from the device of the user a signal identifying at least one portion of the selected physical space as a target for application of a predetermined add-on module (AOM) selected from at least one datastore of available AOMs, perform AOM preview operations comprising:

retrieve from a datastore at least one showcase layout template (SLT), comprising a data structure, associated with the at least one portion of the selected physical space;

retrieve, by the processor, an AOM object comprising a data structure defining attributes of the AOM; and, generate, based on the AOM object data structure and the at least one SLT data structure, a preview signal configured to cause the user device to display a visual preview of a physical change resulting from the at least one SLT with the predetermined AOM applied, wherein the preview signal comprises predicted changes to metrics associated by applying the predetermined AOM;

in response to receiving a confirmation signal from the user device, generate an association between the at least one SLT and the AOM object; and, generate an application signal configured to cause the predetermined AOM to be applied to the at least one SLT such that the physical change is generated in: the at least one portion of the selected physical location associated with the at least one SLT, a user display corresponding to the at least one portion of the selected physical location, or some combination thereof, wherein the predetermined AOM comprises a physical modification to at least one physical showcase corresponding to the at least one SLT, wherein the physical modification to the at least one physical showcase is configured to operate dynamically in response to a signal from a mobile device of a user in physical proximity to the at least one physical showcase.

2. The computer system of claim 1, wherein:

the signal from the device of the user, identifying at least one portion of the physical location as the target for application of the predetermined AOM, comprises a range of coordinates in a navigational framework (NFW) associated with the physical location, the range of coordinates associated with the at least one portion of the physical location, and the at least one SLT is retrieved based on a predetermined association with the range of coordinates in the NFW.

3. The computer system of claim 1, the operations further comprising:

determine, based on the AOM object, whether the predetermined AOM comprises a virtual AOM, wherein, in response to determining the predetermined AOM comprises a virtual AOM, the application signal causes predetermined AOM instructions to be automatically executed in response to at least one predetermined trigger associated with the at least one SLT.

4. The computer system of claim 1, the operations further comprising:

determine, based on the AOM object, whether the predetermined AOM comprises a physical AOM, wherein, in response to determining the predetermined AOM comprises a physical AOM, the application signal causes physical implementation operations to be performed, the physical implementation operations comprising:

generate an implementation signal configured to cause an AOM provider to physically provide the predetermined AOM to at least one retail location, each at least one retail location corresponding to a predetermined retail identifier (RID);

determine, from a selection signal received from the user device, the at least one retail location to be associated with the predetermined AOM;

generate an application signal for each at least one retail location as a function of the AOM object and the at least one SLT; and, when a confirmation signal is not received from each of the at least one retail location confirming that the AOM has been received and applied, then generate an error signal to notify at least one predetermined user that the predetermined AOM has not been physically applied to the at least one retail location from which no confirmation signal has been received.

5. The computer system of claim 4, wherein the predetermined AOM comprises a digital display comprising a dynamic display in at least one showcase at the at least one retail location, a popup notification when a shopping user accesses a digital display corresponding to the at least one SLT, or some combination thereof.

6. The computer system of claim 1, wherein the predetermined AOM comprises a digital process.

7. The computer system of claim 1, wherein the predetermined AOM comprises a digital advertising module.

8. The computer system of claim 1, wherein the predetermined AOM comprises decor, hardware, or some combination thereof.

9. A computer system comprising:

a processor; and, a memory operably coupled to the processor and including computer readable instructions that, when executed by the processor, cause the processor to perform operations to provide dynamic visualization of allocation of a public display space, the operations comprising:

in response to receiving a signal corresponding to a request from a device of a user for available physical space associated with a physical retail facility corresponding to a unique retail identifier (RID), determine a showcase layout template (SLT) having a predetermined association with a physical location at the physical retail facility, the determination based at least on physical space available to associate with a physical showcase;

retrieve a navigational framework (NFW) associated with the physical location;

generate, based on the SLT and the NEW, and transmit to the device of the user, a signal configured to generate a visual display of the NEW corresponding to the physical location available; and, in response to receiving, from the device of the user, a signal indicating a selection of coordinates in the NEW corresponding to a selection by the user of at least a portion of the physical space available in the physical location, associate in at least one datastore the selected coordinates in the NFW, the user, the SLT, and the RID, the operations further comprising:

in response to receiving a signal identifying a product identifier (PID) corresponding to a physical product a second user wishes to physically interact with and which is located in the selected physical space:

retrieve the retail identifier (RID) associated with the physical retail facility associated with the PID and associated with an active sample identifier (SID) corresponding to a physical sample of the physical product on display at the physical retail facility;

generate a first display signal configured to generate a first navigational display for display to the second user, the first display signal generated based on a current physical location of the user and a location of the physical retail facility; and, in response to a signal corresponding to arrival of the user at the physical retail facility, generate a second display signal configured to generate a second navigational display for display to the user, the second display signal generated based at least on coordinates associated with the SID in at least one navigational framework (NFW) associated with the RID;

update the second display signal to generate an updated display based on a signal corresponding to a location of the user within the physical retail facility; and, generate a product suggestion corresponding to a second PID (PID2), the PID2 selected at least based on:

the location of the physical retail facility, an association between the PID and the PID2, and an active sample associated with the PID2 being associated with the RID such that the second user may physically interact with a second physical product associated with the PID2; and, generate a third display signal configured to navigate the second user to the PID2; and generate a display signal configured to provide the user a prompt for input, wherein:

the prompt for input corresponds to a suggestion to share at least one image of the physical product, the operations further comprise update, based on the at least one image, a quality metric of: the SID, a showcase layout template (SLT) associated with the RID and the PID, or some combination thereof, and the quality metric is determined by applying image analysis to detect geospatial attributes of the physical sample associated with the SID, the physical showcase associated with the SLT, or some combination thereof.

10. The computer system of claim 9, wherein the second display signal is further generated based at least on the SLT associated with the RID, and which is associated with the PID.

11. The computer system of claim 9, wherein the prompt for input corresponds to an offer to purchase a physical product associated with the PID.

12. The computer system of claim 9, wherein the prompt for input corresponds to a request for feedback on:

the physical sample associated with the SID, the physical product associated with the PID, a showcase associated with a showcase layout template (SLT) associated with the RID and the PID, or some combination thereof.

13. The computer system of claim 9, wherein the second navigational display comprises an intra-location navigation display.

14. The computer system of claim 9, wherein:

a predetermined add-on module (AOM) is associated, in a datastore, with the coordinates in the at least one NFW, at least one predetermined action is associated with the predetermined AOM and the coordinates in the at least one NFW, and, the operations further comprise:

in response to the signal corresponding to arrival of the user, execute the at least one predetermined action based on the predetermined AOM.

15. The computer system of claim 9, wherein:

the at least one NFW is associated, in a datastore, with at least one predetermined attribute of: at least one associated SLT, at least one associated add-on module (AOM), or some combination thereof.

* * * * *